US011835986B2

(12) United States Patent
Kim

(10) Patent No.: US 11,835,986 B2
(45) Date of Patent: Dec. 5, 2023

(54) ELECTRONIC DEVICE FOR DISPLAYING EXECUTION SCREEN OF APPLICATION, AND OPERATION METHOD THEREOF

(71) Applicant: SAMSUNG ELECTRONICS CO., LTD., Suwon-si (KR)

(72) Inventor: Sangheon Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/097,851

(22) Filed: Jan. 17, 2023

(65) Prior Publication Data

US 2023/0152966 A1  May 18, 2023

Related U.S. Application Data

(63) Continuation of application No. PCT/KR2021/007723, filed on Jun. 21, 2021.

(30) Foreign Application Priority Data

Jul. 20, 2020 (KR) .......... 10-2020-0089841

(51) Int. Cl.
*G06F 3/04886* (2022.01)
*G06F 1/16* (2006.01)
*G06F 3/04842* (2022.01)

(52) U.S. Cl.
CPC ........ *G06F 3/04886* (2013.01); *G06F 1/1641* (2013.01); *G06F 1/1643* (2013.01);
(Continued)

(58) Field of Classification Search
CPC .... G06F 1/1641; G06F 1/1643; G06F 1/1652; G06F 1/1681; G06F 3/04842; G06F 3/04886; G06F 2203/04803
See application file for complete search history.

(56) References Cited

U.S. PATENT DOCUMENTS

| 2014/0062976 A1 | 3/2014 | Park et al. |
| 2016/0034047 A1 | 2/2016 | Lee et al. |

(Continued)

FOREIGN PATENT DOCUMENTS

| EP | 3890285 A1 * 10/2021 ........... G06F 1/1652 |
| KR | 10-2013-0054072 A   5/2013 |

(Continued)

OTHER PUBLICATIONS

Written Opinion (PCT/ISA/237) dated Sep. 9, 2021 by the International Searching Authority for International Patent Application No. PCT/KR2021/007723.

(Continued)

*Primary Examiner* — Michael Pervan
(74) *Attorney, Agent, or Firm* — Sughrue Mion, PLLC

(57) ABSTRACT

A foldable electronic device includes a first and a second housing having corresponding portions coupled to a hinge, a flexible display disposed on the first and second housings, and at least one processor configured to: based on an execution command of a first application and an angle between the first and second housings corresponding to a first angle range, display an execution screen of the first application comprising at least one first object, based on the angle between the first and second housings corresponding to a second angle range, display at least one second object, receive an input on a first touch area among at least one touch area, and based on the angle between the first and second housings corresponding to the first angle range, display an execution screen of a second application corresponding to the first touch area.

20 Claims, 44 Drawing Sheets

(52) U.S. Cl.
CPC .......... *G06F 1/1652* (2013.01); *G06F 1/1681* (2013.01); *G06F 3/04842* (2013.01); *G06F 2203/04803* (2013.01)

(56) References Cited

U.S. PATENT DOCUMENTS

| | | |
|---|---|---|
| 2016/0085319 A1 | 3/2016 | Kim et al. |
| 2016/0132074 A1 | 5/2016 | Kim et al. |
| 2016/0259514 A1 | 9/2016 | Sang et al. |
| 2017/0185289 A1 | 6/2017 | Kim et al. |
| 2017/0351351 A1 | 12/2017 | Kim et al. |
| 2020/0278720 A1 | 9/2020 | Kim et al. |

FOREIGN PATENT DOCUMENTS

| | | |
|---|---|---|
| KR | 10-2014-0031679 A | 3/2014 |
| KR | 10-2015-0095533 A | 8/2015 |
| KR | 10-2015-0111651 A | 10/2015 |
| KR | 10-2016-0055646 A | 5/2016 |
| KR | 10-2016-0057225 A | 5/2016 |
| KR | 10-2016-0108705 A | 9/2016 |
| KR | 10-2017-0077434 A | 7/2017 |
| KR | 10-2017-0079549 A | 7/2017 |
| KR | 10-2017-0100485 A | 9/2017 |
| KR | 10-2019-0031870 A | 3/2019 |
| KR | 10-2020-0077947 A | 7/2020 |

OTHER PUBLICATIONS

International Search Report (PCT/ISA/210) dated Sep. 9, 2021 by the International Searching Authority in International Patent Application No. PCT/KR2021/007723.

\* cited by examiner

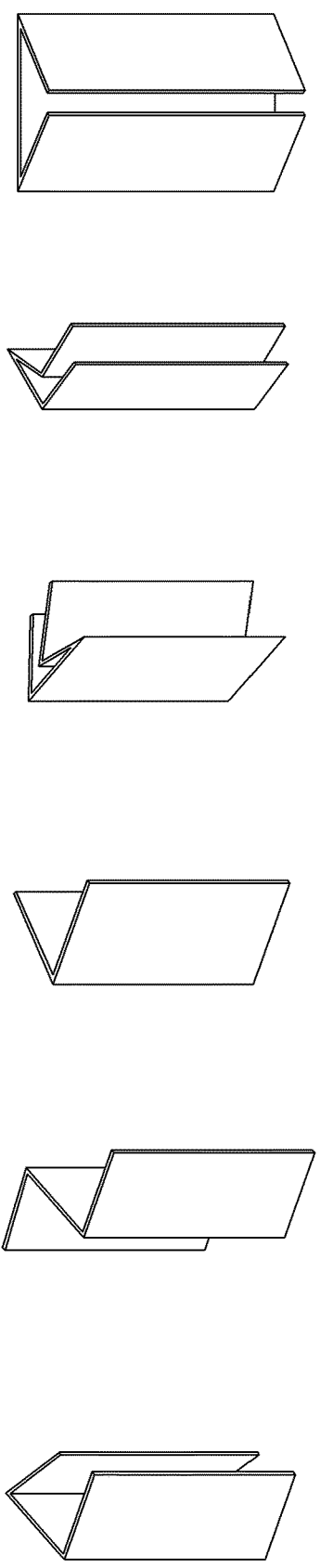
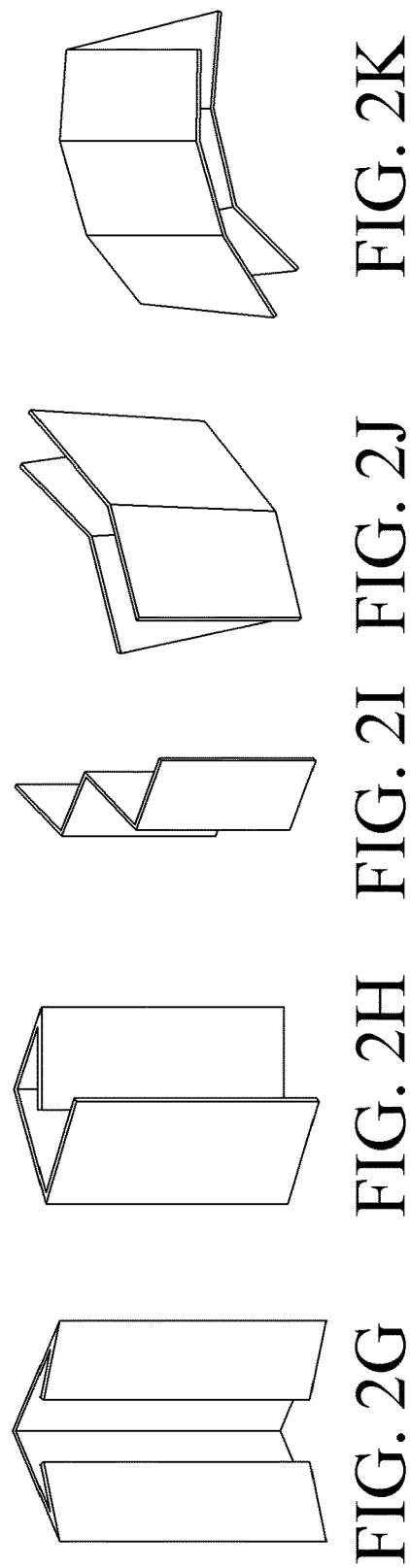

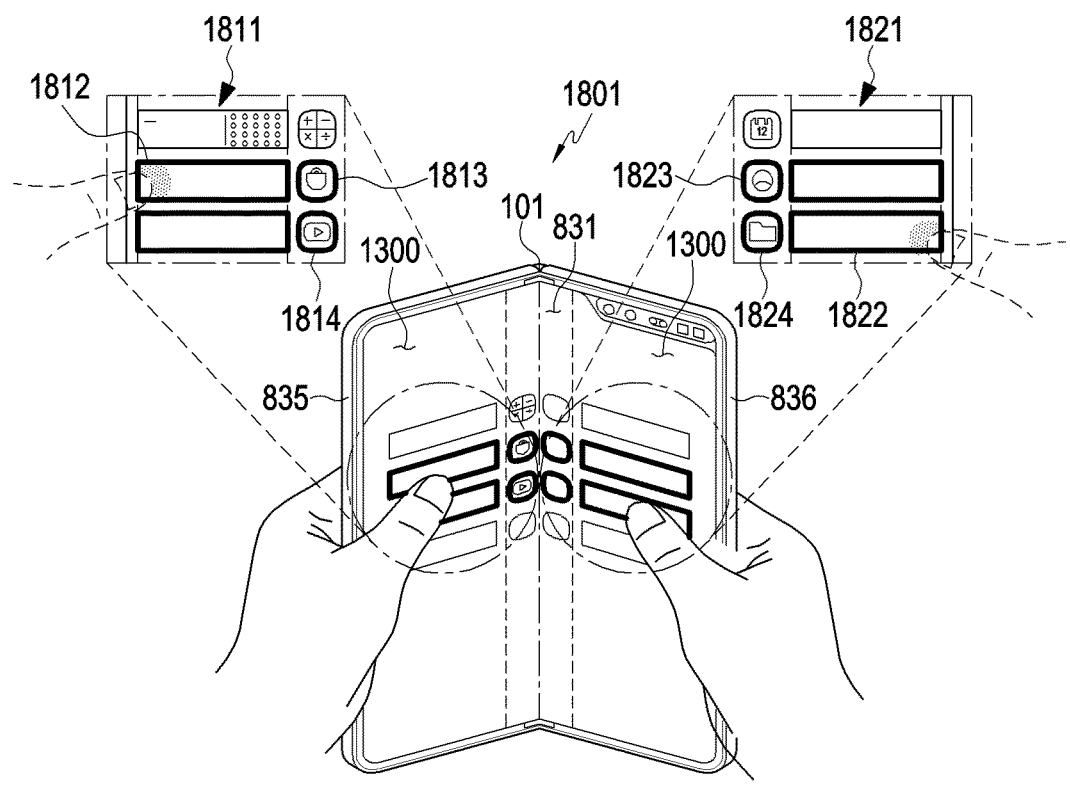
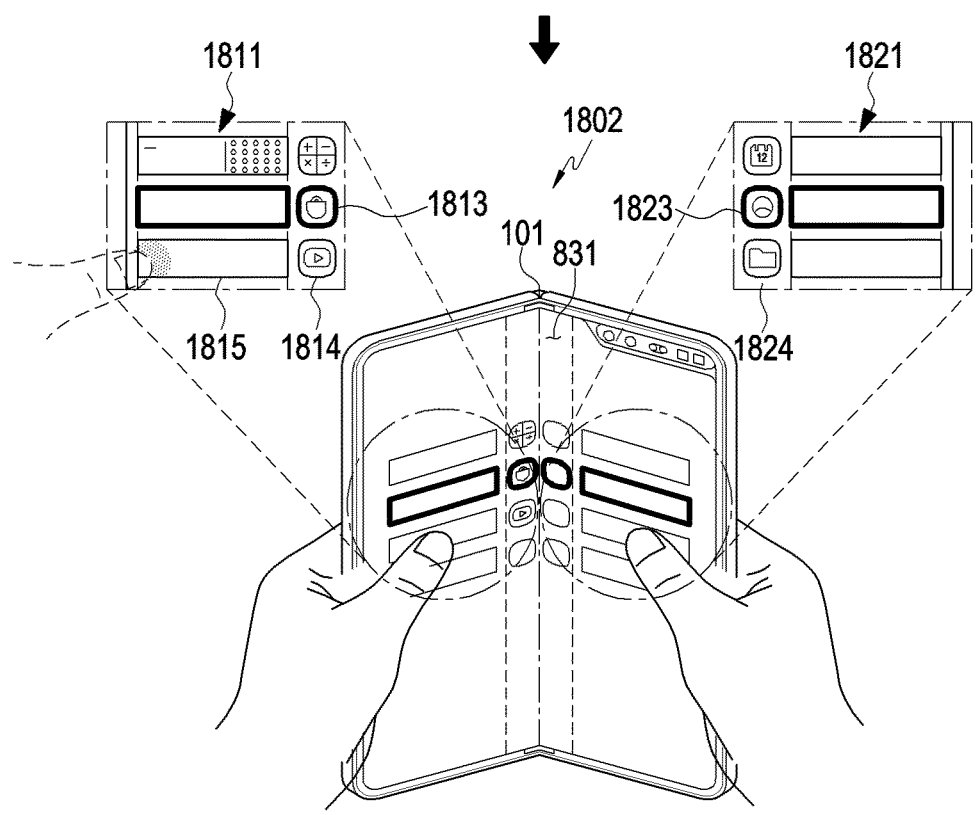
FIG. 18

ELECTRONIC DEVICE FOR DISPLAYING EXECUTION SCREEN OF APPLICATION, AND OPERATION METHOD THEREOF

CROSS-REFERENCE TO RELATED APPLICATIONS

This application is a continuation application of International Application No. PCT/KR2021/007723, filed on Jun. 21, 2021, which claims priority to Korean Patent Application 10-2020-0089841, filed on Jul. 20, 2020, in the Korean Intellectual Property Office, the disclosures of which are incorporated by reference herein in their entireties.

BACKGROUND

Field

The disclosure relates to electronic device for providing the execution screen of an application and a method of operating the same.

Description of Related Art

For many people in modern times, portable digital communication devices have become essential items. Consumers may want to receive a variety of high-quality services at anytime and anywhere by using portable digital communication devices.

In recent years, portable digital communication devices have been implemented in various types (or form factors) in order to improve convenience of use by consumers. Portable digital communication devices implemented in various types may be transformable by consumers and may continue to provide services even in a transformed state.

Therefore, in order to facilitate the use of services provided via portable digital communication devices, which are in a transformed state, it is necessary to implement a technology to provide information via the portable digital communication devices, which are in the transformed state, by configuring information in a form convenient for consumers to use.

A transformable (e.g., foldable) electronic device may include a plurality of housings and a flexible display disposed on the plurality of housings. When a transformable electronic device is folded while the transformable electronic device displays content (e.g., the execution screen of an application) on the flexible display (e.g., when the relative positions of the housings are changed by a user), the flexible display may be bent, and the transformable electronic device may continue to display the execution screen of the application on the bent flexible display. Accordingly, the content displayed on the transformable electronic device may be visually recognized by the user as being distorted. Alternatively, when the user interacts with the content (e.g., touching) displayed on a bent flexible display, an erroneous input on the content by a part of the user's body (e.g., a finger) holding a folded electronic device may be caused, which may cause the transformable electronic device to malfunction.

SUMMARY

Provided are an electronic device and a method of operating the same in which, when the shape of the electronic device (e.g., an angle between housings) is transformed, a content different from a content that has been displayed, is displayed at a position different from the position at which the content has been displayed, so that it is possible to solve the phenomenon in which the content is visually recognized as being distorted. Alternatively, provided are an electronic device and a method of operating the same that configure touch areas for using contents when the electronic device is in a transformed state, so that it is possible to prevent a user's erroneous input on contents, and malfunction of the electronic device may be prevented in advance.

According to an aspect of the disclosure, a foldable electronic device includes: a hinge; a first housing having a first portion coupled to the hinge; a second housing having a second portion coupled to the hinge; a flexible display disposed in the first housing and the second housing; and at least one processor configured to: based on identifying an execution command of a first application in a state in which an angle between the first housing and the second housing corresponds to a first angle range, display, on the flexible display, an execution screen of the first application including at least one first object associated with at least one application being executed; based on the angle between the first housing and the second housing corresponding to a second angle range, display, in a first area of the flexible display, at least one second object associated with the at least one application being executed, the at least one second object being different from the at least one first object; configure at least one touch area for selecting the at least one second object in a second area of the flexible display, the second area being different from the first area; receive an input on a first touch area among the at least one touch area; and based on the angle between the first housing and the second housing corresponding to the first angle range, display, on the flexible display, an execution screen of a second application corresponding to the first touch area.

The at least one first object may include at least one of at least one icon or at least one thumbnail associated with the at least one application.

The at least one touch area may include a second touch area corresponding to a first thumbnail and the first touch area corresponds to a first icon associated with the second application, and the at least one processor may be further configured to: select the second application based on receiving the input on the first touch area or the second touch area; and based on the angle between the first housing and the second housing corresponding to the first angle range, execute the selected second application in a foreground mode, and display the execution screen of the second application being executed in the foreground mode.

The at least one processor may be further configured to: obtain information related to the second application based on the receiving of the input on the first touch area; and display the information in at least a portion of the second area.

The at least one processor may be further configured to: identify a color associated with the at least one second object; and display the color on the at least one touch area corresponding to the at least one second object.

The at least one touch area may be spaced apart from an outer enclosure portion of the display.

The at least one processor may be further configured to adjust a size of the at least one second object based on the angle between the first housing and the second housing being changed from the first angle range to the second angle range while the at least one second object is displayed.

The at least one processor may be further configured to: identify a position associated with a user, wherein the position associated with the user includes at least one of a position of a touch by the user and a position of a line of sight of the user; and change the position of the at least one second object based on the position associated with the user.

The at least one processor may be further configured to: receive a first input on the first touch area; identify a touched second touch area among the at least one touch area as the received first input is moved on the first touch area; and select the second application corresponding to the first touch area and a third application corresponding to the touched second touch area.

The at least one processor may be further configured to deselect the second application based on identifying that the touched second touch area is re-touched as the first input is moved after the touched second touch area is touched.

The at least one processor may be further configured to: identify a change pattern of the angle between the first housing and the second housing; and based on the identified change pattern of the angle and the angle between the first housing and the second housing corresponding to the first angle range, display the execution screen of the first application and the execution screen of the second application.

The at least one processor may be further configured to, based on the identified change pattern being a first pattern, display the execution screen of the first application and the execution screen of the second application such that the execution screen of the first application and the execution screen of the second application do not overlap each other.

The at least one processor may be further configured to, based on the identified change pattern being a second pattern, while displaying one of the execution screen of the first application and the execution screen of the second application, display a remaining one of the execution screen of the first application and the execution screen of the second application on a pop-up window.

The at least one processor may be further configured to, based on an order of a first priority of the first application and a second priority of the second application, display the execution screen of the second application on the pop-up window while displaying the execution screen of the first application.

According to an aspect of the disclosure a method of operating a foldable electronic device, the method includes: based on identifying an execution command of a first application in a state in which an angle between a first housing of the foldable electronic device and a second housing of the foldable electronic device corresponds to a first angle range, displaying, on a flexible display disposed in the first housing and the second housing, an execution screen of the first application including at least one first object associated with at least one application being executed; based on the angle between the first housing and the second housing corresponding to a second angle range, displaying, in a first area of the flexible display, at least one second object associated with the at least one application being executed, the at least one second object being different from the at least one first object; configuring at least one touch area for selecting the at least one second object in a second area of the flexible display, the second area being different from the first area; receiving an input on a first touch area among the at least one touch area; and based on the angle between the first housing and the second housing corresponding to the first angle range, displaying, on the flexible display, an execution screen of a second application corresponding to the first touch area.

The at least one first object may include at least one of at least one icon and at least one thumbnail associated with the at least one application, the at least one touch area may include a second touch area corresponding to a first thumbnail and the first touch area corresponds to a first icon associated with the second application, and the method may further include: selecting the second application based on receiving the input on the first touch area or the second touch area; and based on the angle between the first housing and the second housing corresponding to the first angle range, executing the selected second application in a foreground mode, and displaying the execution screen of the second application being executed in the foreground mode.

The method may further include: obtaining information related to the second application based on the receiving of the input on the first touch area; and displaying the information in at least a portion of the second area.

The method may further include adjusting a size of the at least one second object based on the angle between the first housing and the second housing being changed from the first angle range to the second angle range while the at least one second object is displayed.

The method may further include: identifying a position associated with a user, wherein the position associated with the user includes at least one of a position of a touch by the user and a position of a line of sight of the user; and changing the position of the at least one second object based on the position associated with the user.

According to an aspect of the disclosure a foldable electronic device includes: a hinge; a first housing having a first portion coupled to the hinge; a second housing having a second portion coupled to the hinge; a flexible display disposed in the first housing and the second housing; and at least one processor configured to: display, based on an angle between the first housing and the second housing corresponding to a first angle range, the execution screen of a first application including at least one content on the flexible display; display, based on the angle between the first housing and the second housing corresponding to a second angle range, at least one content in a first area of the flexible display associated with the hinge; configure at least one touch area for selecting the at least one content in a second area different from the first area of the flexible display; receive an input on a first touch area from among the at least one touch area; select a first content corresponding to the first touch area; and display, based on the angle between the first housing and the second housing corresponding to the first angle range, the first content in an entire area of the flexible display.

Embodiments according to various aspects are not limited to the above-described aspects, and embodiments, which are not directly disclosed herein, may be clearly understood by a person ordinarily skilled in the art to which the present disclosure belongs, from the following description and the accompanying drawings.

According to one or more embodiments, an electronic device and a method of operating the same are provided, in which, when the shape of the electronic device (e.g., the angle between the housings) is changed, the content is transformed and the position at which the transformed content is displayed is moved, so a phenomenon in which the content is visually recognized in a distorted form may be solved.

According to one or more embodiments, an electronic device and a method of operating the same are provided, in which a user's erroneous input on the contents may be prevented and thus a malfunction of the electronic device may be prevented in advance by configuring touch areas for using contents in the state in which the shape of the electronic device is changed.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 2A, 2B, 2C, 2D, 2E, 2F, 2G, 2H, 2I, 2J, and 2K are views for describing various examples of an electronic device including at least two housing structure and a flexible display according to various embodiments;

FIG. 18 is a view for describing an example of another operation of selecting a plurality of touch areas of an electronic device based on a user input, according to various embodiments;

DETAILED DESCRIPTION

Figure 1:
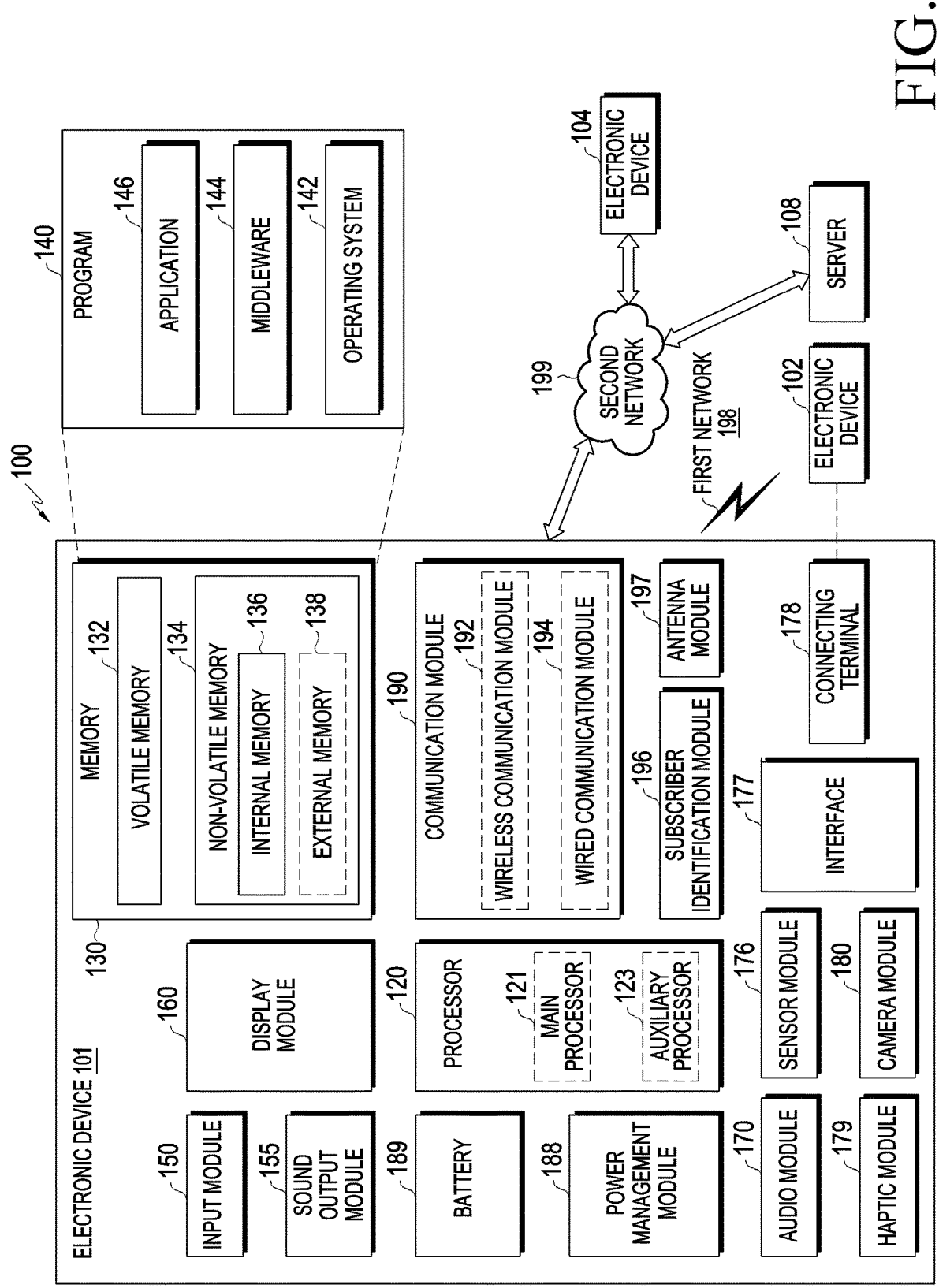
FIG. 1 is a block diagram of an electronic device, according to various embodiments in a network environment.

The following description with reference to the accompanying drawings is provided to assist in a comprehensive understanding of embodiments of the present disclosure defined by the claims and their equivalents. Various specific details are included to assist in understanding, but these details are considered to be exemplary only. Therefore, those of ordinary skill in the art will recognize that various changes and modifications of the embodiments described herein can be made without departing from the scope and spirit of the disclosure. In addition, descriptions of well-known functions and structures are omitted for clarity and conciseness.

With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," and "at least one of A or B," may include any one of, or all possible combinations of the items enumerated together in a corresponding one of the phrases. As used herein, such terms as "1st" and "2nd," or "first" and "second" may be used to simply distinguish a corresponding component from another, and do not limit the components in other aspects (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wired), wirelessly, or via a third element.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

FIGS. 2A, 2B, 2C, 2D, 2E, 2F, 2G, 2H, 2I, 2J, and 2K are views for describing various examples of an electronic device including at least two housing structure and a flexible display according to various embodiments.

According to various embodiments, an electronic device may include two or more housing structures and a flexible display, wherein a portion of each of the housing structures is connected to a hinge such that relative positions of the housing structures are changeable (or rotatable) according to the pivoting of the hinge.

According to various embodiments, the flexible display may be disposed on the two or more housing structures, and may be bent depending on the rotated states of the housing structures. The rotated states of the housing structures are described in more detail below.

According to various embodiments, various types of electronic devices may be formed depending on the two or more housing structures, the flexible display, and the rotated states of the housing structures. For example, as illustrated in FIGS. 2A, 2B, 2C, 2D, 2E, 2F, 2G, 2H, 2I, 2J, and 2K, the various types of electronic devices may include a type in which two areas are formed in an electronic device and/or a flexible display of the electronic device (e.g., a half-fold type as shown in FIG. 2C), a type in which three areas are formed in an electronic device and/or a flexible display of the electronic device (e.g., a tri-fold type as shown in FIG. 2A, a Z-fold type as shown in FIG. 2B, a single open gate-fold type as shown in FIG. 2F, a type in which four areas are formed in an electronic device and/or a flexible display of the electronic device (e.g., a double parallel reverse-fold type as shown in FIG. 2D, a double parallel-fold type as shown in FIG. 2E, a double gate-fold type as shown in FIG. 2G, a roll-fold as shown in FIG. 2H, an accordion-fold type as shown in FIG. 2I, a half-fold-then-half-fold type as shown in FIG. 2J), and a type in which a greater number of areas are formed in an electronic device and/or one or more flexible displays of the electronic device (e.g., a half-fold-then-tri-fold type as shown in FIG. 2K).

An electronic device may include housing structures, which are rotatably connected to each other, and a flexible display. The housing structures may be rotated to form a corresponding type of the electronic device. In some embodiments, in a case of an electronic device including two or more housings and two or more displays disposed on each of the housings, respective displays of the electronic device may form an angle relative to each other depending on the rotated states of the housings.

Hereinafter, an electronic device according to various embodiments and a method of operating the same are described by taking an electronic device including two housings and a flexible display as an example. Accordingly, the operation of switching the execution screen of an application of an electronic device (e.g., changing the size and/or position of objects and/or contents, and configuring touch areas) to be described below may also be applicable to a description of an electronic device including three or more housings and/or two or more flexible displays, without deviating from the scope of the present disclosure. That is, the present disclosure is not limited in this regard.

Although the electronic devices may be described as having a single display disposed on a plurality of housings, different displays may be provided on the plurality of housings. Accordingly, a description of an electronic device according to various embodiments as described below and a method of operating the same may also be applicable to a description of an electronic device including two or more housings and/or two or more displays, which may be disposed on the housings. For example, a description of an area of a flexible display corresponding to one housing may be applicable to a description of a display corresponding to one housing among a plurality of displays provided in an electronic device.

Hereinafter, an example of an electronic device 101 is described with reference to FIGS. 3A to 3C.

Figure 3A:
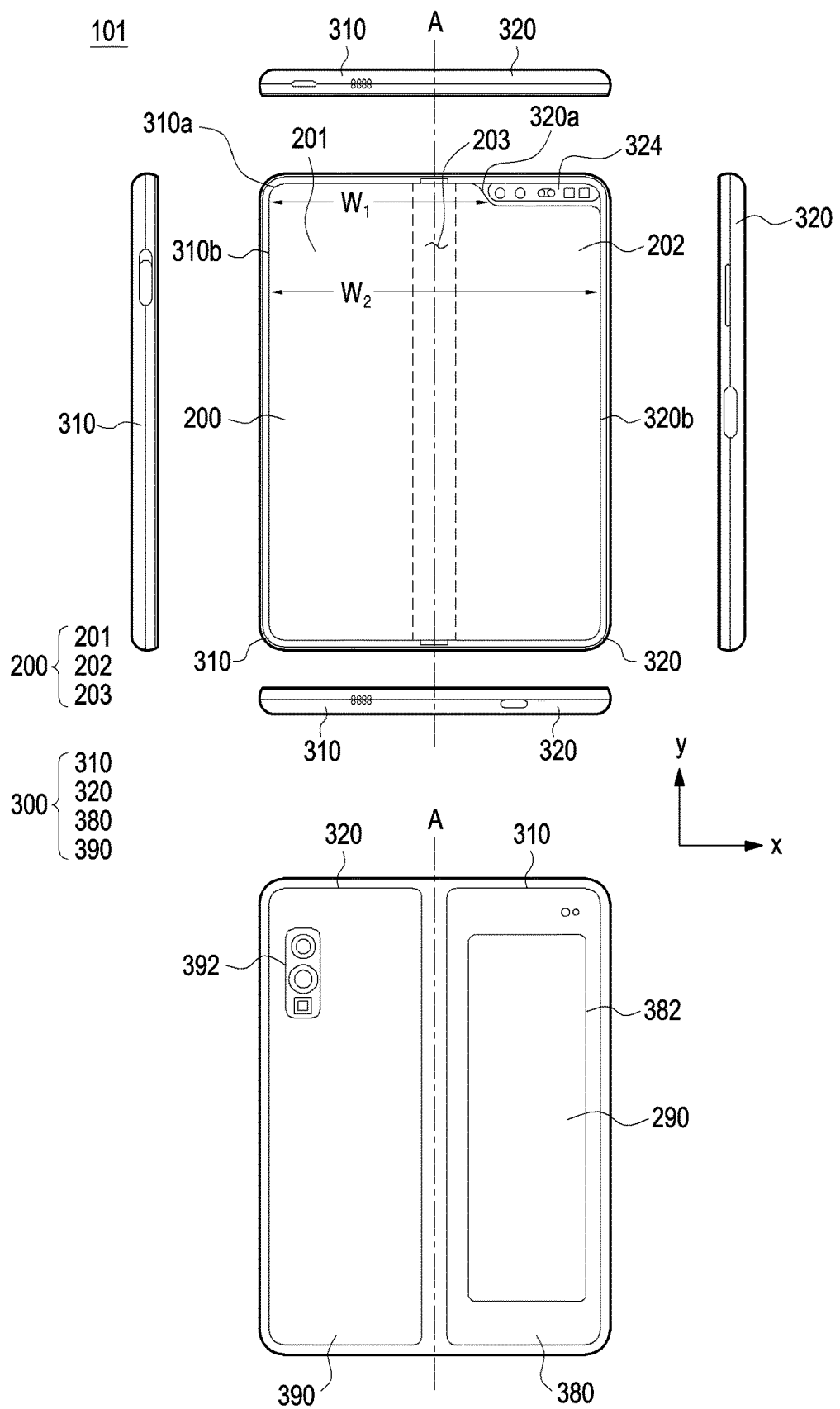
FIG. 3A is a view illustrating an electronic device, according to various embodiments in an unfolded state.

FIG. 3A is a view illustrating an electronic device 101 in an unfolded state, according to various embodiments. FIG. 3B is a view illustrating the electronic device 101 in a folded state, according to various embodiments. FIG. 3C is an exploded perspective view of the electronic device 101, according to various embodiments.

Figure 3B:
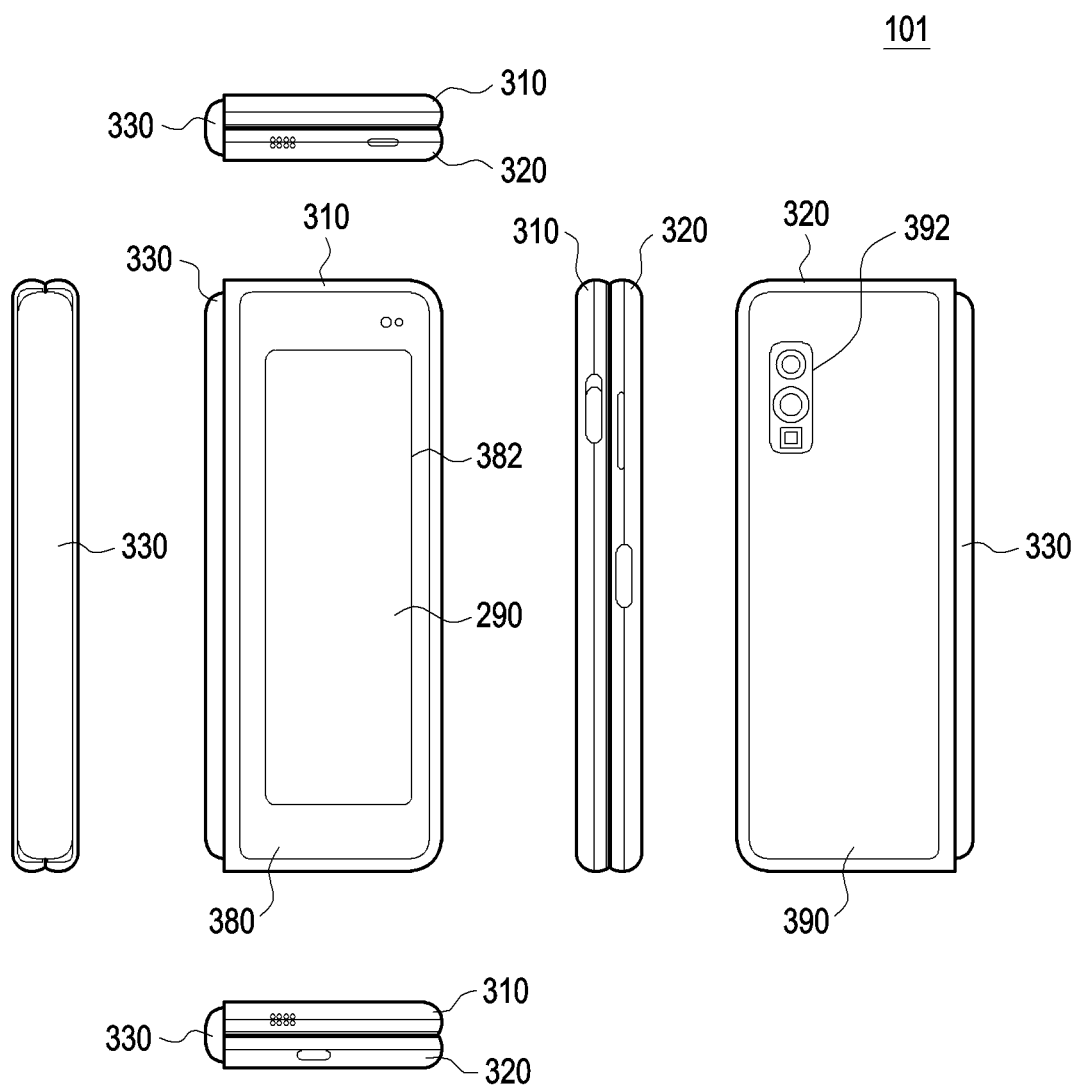
FIG. 3B is a view illustrating the electronic device, according to various embodiments in a folded state.

Referring to FIGS. 3A and 3B, in some embodiments, an electronic device 101 may include a foldable housing 300, a hinge cover 330 configured to cover the foldable portion of the foldable housing, and a flexible or foldable display 200 (hereinafter, display 200) disposed in a space defined by the foldable housing 300. Herein, the surface on which the display 200 is disposed may be referred to as a first surface or the front surface of the electronic device 101. In addition, the surface opposite the front surface may be referred to as a second surface and/or the rear surface of the electronic device 101. In addition, a surface surrounding the space between the front surface and the rear surface may be referred to as a third surface or the side surface of the electronic device 101.

In some embodiments, the foldable housing 300 may include a first housing structure 310, a second housing structure 320 including a sensor area 324, a first rear cover 380, and a second rear cover 390. The foldable housing 300 of the electronic device 101 is not limited to the shape and assembly illustrated in FIGS. 3A and 3B, and may be implemented by a combination and/or an assembly of other shapes and/or components. For example, in other embodiments, the first housing structure 310 and the first rear cover 380 may be configured integrally with each other, and the second housing structure 320 and the second rear cover 390 may be configured integrally with each other.

As shown in FIG. 3A, the first housing structure 310 and the second housing structure 320 may be disposed on opposite sides about a folding axis (e.g., the axis A), and may have generally symmetrical shapes about the folding axis A. As described below, the first housing structure 310 and the second housing structure 320 may have different angles or distances therebetween depending on whether the electronic device 101 is in the unfolded state, the folded state, or the intermediate state. In some embodiments, the second housing structure 320 may further include the sensor area 324 in which various sensors may be disposed. Alternatively or additionally, the first housing structure 310 and the second housing structure 320 may have mutually symmetrical shapes in other areas.

Continuing to refer to FIG. 3A, the first housing structure 310 and the second housing structure 320 may form together a recess that accommodates the display 200 therein. In some embodiments, the recess may have two or more different widths in a direction perpendicular to the folding axis A, due to the sensor area 324.

For example, the recess may have (1) a first width $W_1$ between a first portion 310a parallel to the folding axis A in the first housing structure 310 and a first portion 320a formed at an edge of the sensor area 324 in the second housing structure 320, and (2) a second width $W_2$ between a second portion 310b in the first housing structure 310 and a second portion 320b, which is parallel to the folding axis A but does not correspond to the sensor area 324, in the second housing structure 320. As such, the second width $W_2$ may be greater than the first width $W_1$. That is, the first portion 310a of the first housing structure 310 and the first portion 320a of the second housing structure 320, which are asymmetrical with each other, may form the first width $W_1$ of the recess, and the second portion 310b of the first housing structure 310 and the second portion 320b of the second housing structure 320, which are symmetrical to each other, may form the second width $W_2$ of the recess.

In an embodiment, the first portion 320a and the second portion 320b of the second housing structure 320 may be located at different distances from the folding axis A. That is, the widths of the recess are not limited to the illustrated example. In various embodiments, the recess may have multiple widths due to the shape of the sensor area 324 and due to the asymmetric portions of the first housing structure 310 and the second housing structure 320.

In an embodiment, at least a portion of the first housing structure 310 and at least a portion of the second housing structure 320 may be formed of a metal material or a non-metal material having a rigidity of a level selected in order to support the display 200.

According to an embodiment, the sensor area 324 may have a predetermined area adjacent to one corner of the second housing structure 320. However, the arrangement, shape, and size of the sensor area 324 are not limited in this regard. For example, in other embodiments, the sensor area 324 may be disposed at another corner of the second housing structure 320 and/or in any area between the upper and lower end corners.

In an embodiment, components embedded in the electronic device 101 to perform various functions may be exposed to the front surface of the electronic device 101 through the sensor area 324 and/or one or more openings provided in the sensor area 324. The components may include various types of sensors. The sensors may include, but not be limited to, at least one of, for example, a front camera, a receiver, and a proximity sensor.

The first rear cover 380 may be disposed on one side of the folding axis in the rear surface of the electronic device, and may have, for example, a substantially rectangular periphery. The periphery may be enclosed by the first housing structure 310. Similarly, the second rear cover 390 may be disposed at the other side of the folding axis on the rear surface of the electronic device, and the periphery of the second rear cover 390 may be enclosed by the second housing structure 320.

Continuing to refer to FIGS. 3A and 3B, the first rear cover 380 and the second rear cover 390 may have substantially symmetrical shapes about the folding axis (the axis A). However, in some embodiments, the electronic device 101 may include a first rear cover 380 and a second rear cover 390 having various shapes that may not necessarily be mutually symmetrical shapes. In other embodiments, the first rear cover 380 may be configured integrally with the first housing structure 310, and the second rear cover 390 may be configured integrally with the second housing structure 320.

In an embodiment, the first rear cover 380, the second rear cover 390, the first housing structure 310, and the second housing structure 320 may define a space in which various components (e.g., a printed circuit board and/or a battery) of the electronic device 101 may be disposed. In an embodiment, one or more components may be disposed and/or visually exposed on the rear surface of the electronic device 101. For example, at least a portion of a sub-display 410 may be visually exposed through a first rear area 382 of the first rear cover 380. In other embodiments, one or more components and/or sensors may be visually exposed through the second rear area 392 of the second rear cover 390. The one or more components and/or sensors may include, but not be limited to, a proximity sensor and/or a rear camera.

Referring to FIG. 3B, the hinge cover 330 may be disposed between the first housing structure 310 and the second housing structure 320 to cover internal components (e.g., the hinge structure). For example, the hinge cover 330 may be covered by a portion of the first housing structure 310 and a portion of the second housing structure 320 and/or exposed to the outside depending on whether the electronic device 101 is in the unfolded state (e.g., flat state) or in the folded state.

For example, as shown in FIG. 3A, when the electronic device 101 is in the unfolded state, the hinge cover 330 may not be exposed by being covered by the first housing structure 310 and the second housing structure 320. Alternatively or additionally, as shown in FIG. 3B, when the electronic device 101 is in the folded state (e.g., the fully folded state), the hinge cover 330 may be exposed to the outside between the first housing structure 310 and the second housing structure 320. As an example, when the first housing structure 310 and the second housing structure 320 are in the intermediate state in which the first housing structure 310 and the second housing structure 320 are folded with a certain angle therebetween, the hinge cover 330 may be exposed to the outside between the first housing structure 310 and the second housing structure 320. However, the area exposed in this case may be smaller than that in the fully folded state. In some embodiments, the hinge cover 330 may include a curved surface.

The display 200 may be disposed in a space defined by the foldable housing 300. For example, the display 200 may be seated in the recess defined by the foldable housing 300, and may constitute a large portion of the front surface of the electronic device 101.

In some embodiments, the front surface of the electronic device 101 may include the display 200, and a portion of the first housing structure 310 and a portion of the second housing structure 320, which are adjacent to the display 200. Alternatively or additionally, the rear surface of the electronic device 101 may include the first rear cover 380, a portion of the first housing structure 310 adjacent to the first rear cover 380, the second rear cover 390, and a portion of the second housing structure 320 adjacent to the second rear cover 390.

The display 200 may be a display in which at least a partial area is deformable into a planar surface or a curved surface. In an embodiment, the display 200 may include a folding area 203, a first area 201 disposed on one side of the folding area 203 (e.g., the left side of the folding area 203 illustrated in FIG. 3A), and a second area 202 disposed on the other side of the folding area 203 (e.g., the right side of the folding area 203 illustrated in FIG. 3A).

The area division of the display 200 illustrated in FIG. 3A is exemplary, and the display 200 may be divided into multiple areas (e.g., four or more areas, or two areas) depending on the structure or functions thereof. For example, as shown in FIG. 3A, the areas of the display 200 may be divided by the folding area 203 or the folding axis (the axis A) extending parallel to the Y (e.g., vertical) axis. However, in other embodiments, the display 200 may be divided into areas based on another folding area (e.g., a folding area parallel to the X (e.g., horizontal) axis) or another folding axis (e.g., a folding axis parallel to the X axis).

The first area 201 and the second area 202 may have generally symmetrical shapes about the folding area 203. In some embodiments, the second area 202 may include a notch cut due to the presence of the sensor area 324, but may have a shape symmetrical to the first area 201 in areas other than the sensor area. That is, the first area 201 and the second area 202 may include portions having mutually symmetrical shapes and portions having mutually asymmetrical shapes.

Hereinafter, the operations of the first housing structure 310 and the second housing structure 320 and respective areas of the display 200 according to the states of the electronic device 101 (e.g., the unfolded state (or flat state) and the folded state) are described.

According to an embodiment, when the electronic device 101 is in the unfolded state (flat state) (e.g., FIG. 3A), the first housing structure 310 and the second housing structure 320 may be disposed to form an angle of 180 degrees therebetween and to face the same direction. The surface of the first area 201 and the surface of the second area 202 of the display 200 may form 180 degrees relative to each other and may face the same direction (e.g., the front direction of the electronic device). The folding area 203 may form the same plane as the first area 201 and the second area 202.

In an embodiment, when the electronic device 101 is in the folded state (e.g., FIG. 3B), the first housing structure 310 and the second housing structure 320 may be disposed to face each other. The surface of the first area 201 and the surface of the second area 202 of the display 200 may face each other while forming a narrow angle (e.g., an angle between 0 degrees and 10 degrees) relative to each other. At least a portion of the folding area 203 may be configured as a curved surface having a predetermined curvature.

According to an embodiment, when the electronic device 101 is in the intermediate state (e.g., FIG. 2C), the first housing structure 310 and the second housing structure 320 may be disposed with a certain angle therebetween. The surface of the first area 201 and the surface of the second area 202 of the display 200 may form an angle larger than that in the folded state and smaller than that in the unfolded state. At least a portion of the folding area 203 may have a curved surface having a predetermined curvature, and the curvature in the intermediate state may be smaller than that in the folded state.

Figure 3C:
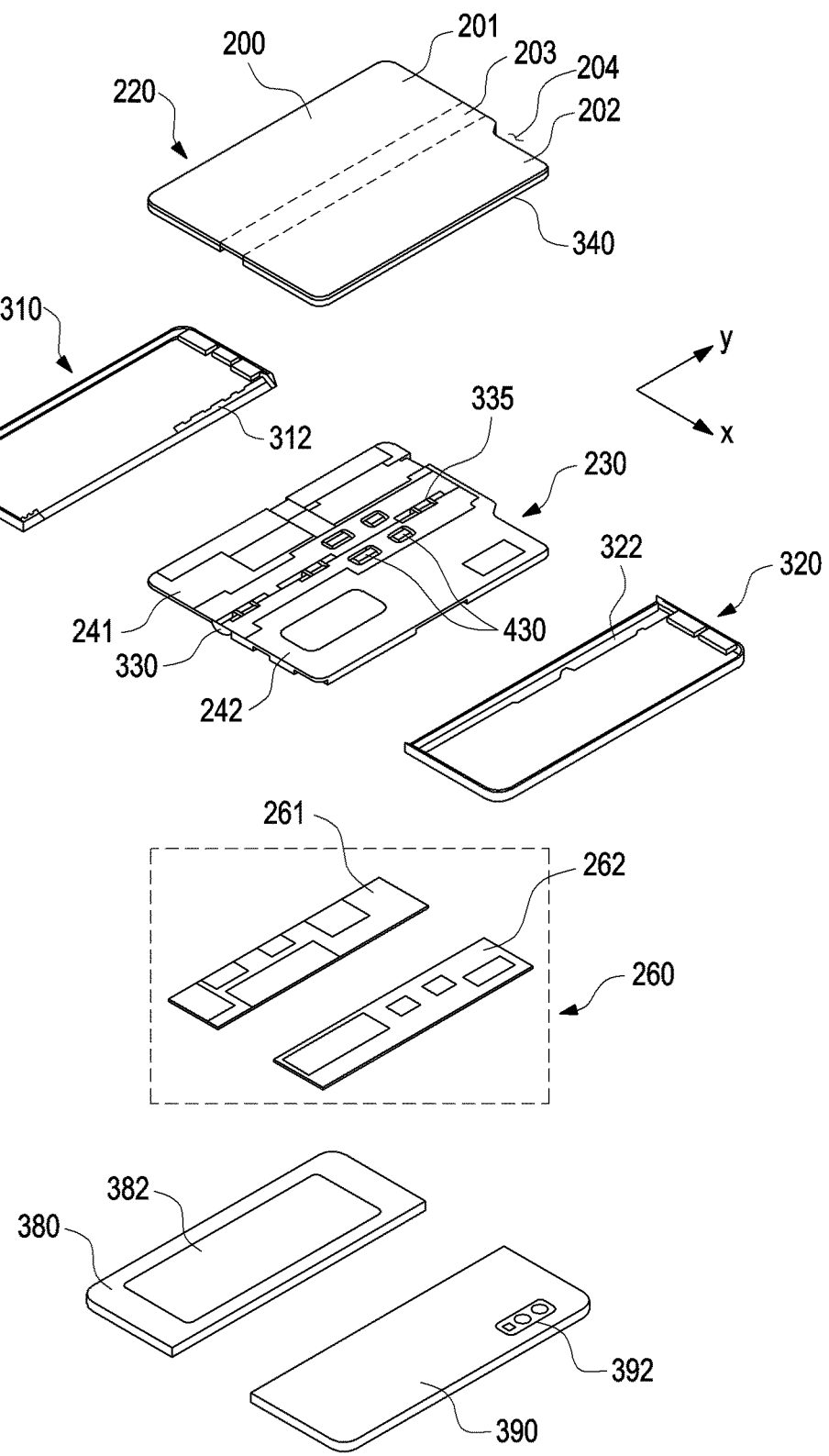
FIG. 3C is an exploded perspective view of an electronic device, according to various embodiments.

Referring to FIG. 3C, in an embodiment, the electronic device 101 may include a display unit 220, a bracket assembly 230, a board unit 260, a first housing structure 310, a second housing structure 320, a first rear cover 380, and a second rear cover 390. Herein, the display unit 220 may be referred to as a display module and/or a display assembly.

The display unit 220 may include a display 200 and at least one plate or layer 340 on which the display 200 is seated. In an embodiment, the plate 340 may be disposed between the display 200 and the bracket assembly 230. The display 200 may be disposed on at least a portion of one surface (e.g., the top surface with reference to FIG. 3C) of the plate 340. The plate 340 may be formed in a shape corresponding to that of the display panel 200. For example, a partial area of the plate 340 may be formed in a shape corresponding to the notch 205 in the display 200.

The bracket assembly 230 may include a first bracket 241, a second bracket 242, a hinge structure disposed between the first bracket 241 and the second bracket 242, a hinge cover 330 configured to cover the hinge structure when the hinge structure is viewed from the outside, and a wiring member 335 (e.g., a flexible printed circuit board (FPCB)) extending across the first and second brackets 241 and 242.

In an embodiment, the bracket assembly 230 may be disposed between the plate 340 and the board unit 260. For example, the first bracket 241 may be disposed between the first area 201 of the display 200 and a first board 261. The second bracket 242 may be disposed between the second area 202 and the second board 262 of the display 200.

In an embodiment, at least a portion of the wiring member 335 and at least a portion of the hinge structure may be disposed inside the bracket assembly 230. The wiring member 335 may be disposed in a direction across the first bracket 241 and the second bracket 242 (e.g., the x-axis direction). The wiring member 335 may be disposed in a direction (e.g., the x-axis direction) perpendicular to the folding axis (e.g., the y axis or the folding axis A in FIG. 3A) of the folding area 203 of the electronic device 101.

As described above, the board unit 260 may include the first board 261 disposed on the first bracket 241 side and the second board 262 disposed on the second bracket 242 side. The first board 261 and the second board 262 may be disposed in a space defined by the bracket assembly 230, the first housing structure 310, the second housing structure 320, the first rear cover 380, and the second rear cover 390. Components for implementing various functions of the electronic device 101 may be mounted on the first board 261 and the second board 262.

The first housing structure 310 and the second housing structure 320 may be assembled to each other so as to be coupled to the opposite sides of the bracket assembly 230 in the state in which the display unit 220 is coupled to the bracket assembly 230. As described below, the first housing structure 310 and the second housing structure 320 may be coupled to the bracket assembly 230 by sliding on the opposite sides of the bracket assembly 230.

In an embodiment, the first housing structure 310 may include a first rotation support surface 312, and the second housing structure 320 may include a second rotation support surface 322, which corresponds to the first rotation support surface 312. The first rotation support surface 312 and the second rotation support surface 322 may include curved surfaces corresponding to the curved surface included in the hinge cover 330.

In an embodiment, when the electronic device 101 is in the unfolded state (e.g., the electronic device in FIG. 3A), the first rotation support surface 312 and the second rotation support surface 322 may cover the hinge cover 330 so that the hinge cover 330 may not be exposed or may be only minimally exposed to the rear surface of the electronic device 101. Alternatively or additionally, when the electronic device 101 is in the folded state (e.g., the electronic device in FIG. 3B), the first rotation support surface 312 and the second rotation support surface 322 may rotate about the curved surface included in the hinge cover 330 so that the hinge cover 330 may be exposed to the rear surface of the electronic device 101 as much as possible.

Hereinafter, another example of an electronic device 101 is described with reference to FIGS. 4A to 4C.

Figure 4A:
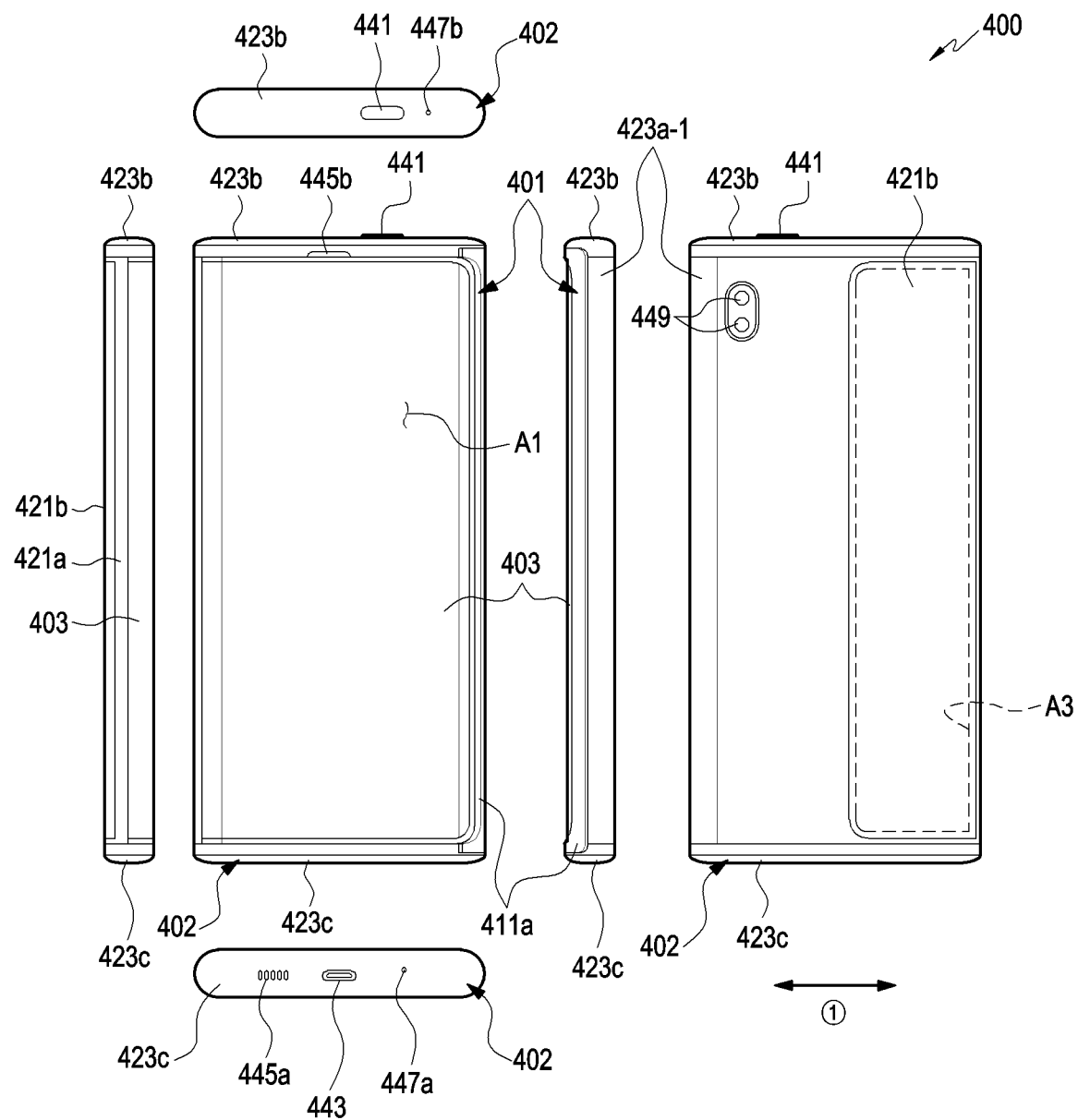
FIG. 4A is a view illustrating an example of an electronic device in the state in which a portion of a flexible display is accommodated in a second structure, according to various embodiments.

FIG. 4A is a view illustrating an electronic device 101 according to various embodiments disclosed herein, in the state in which a portion (e.g., a second area A2) of a flexible display 403 is accommodated in a second structure 402. FIG. 4B is a view illustrating the electronic device 101 according to various embodiments disclosed herein in the state in which a largest portion of the flexible display 403 is exposed to the outside of the second structure 402.

Figure 4B:
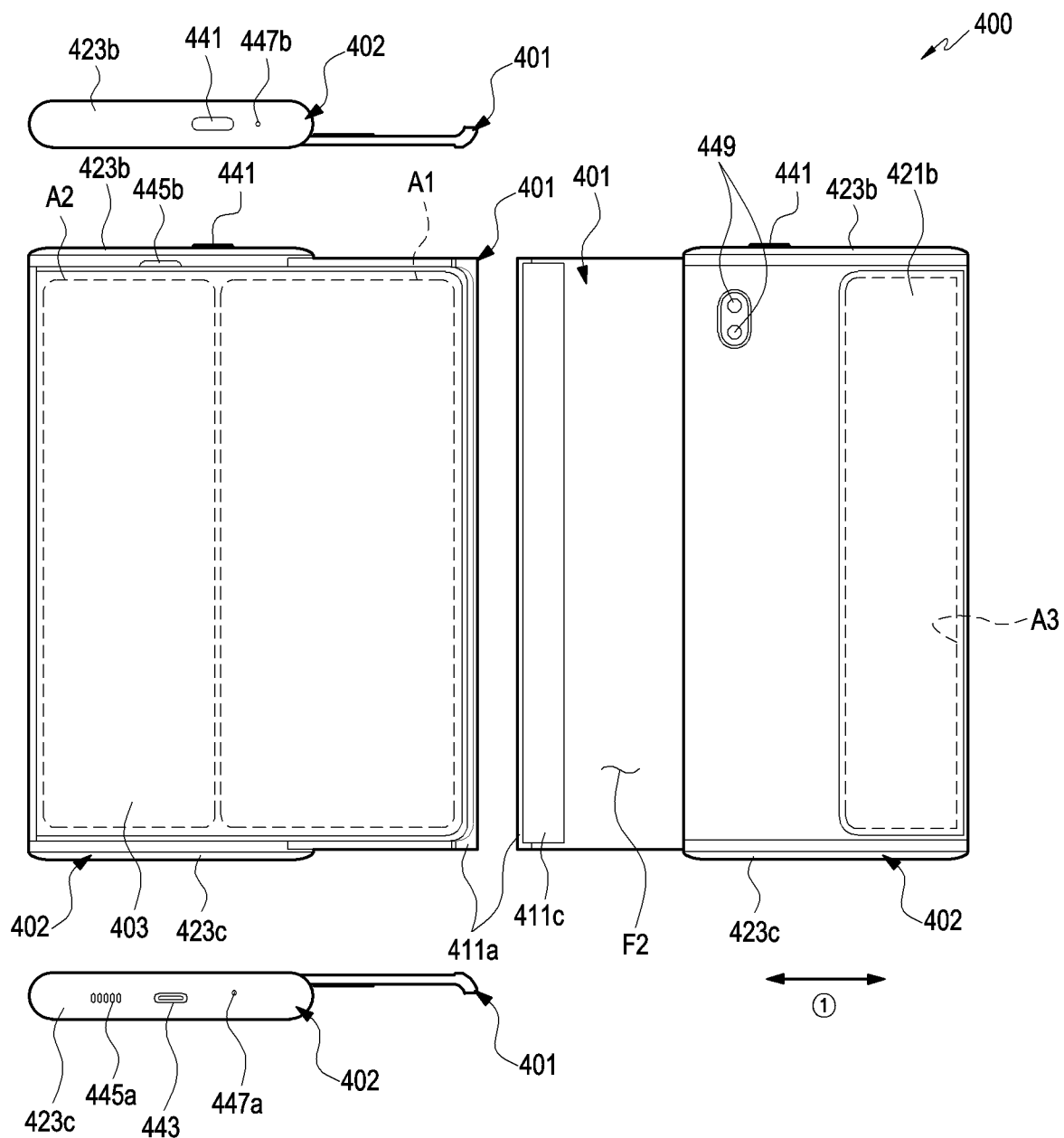
FIG. 4B is a view illustrating the electronic device in the state in which most of the flexible display is exposed to the outside of the second structure, according to various embodiments.

The state illustrated in FIG. 4A may be referred to as the state in which a first structure 401 is closed with respect to the second structure 402, and the state illustrated in FIG. 4B may be referred to as the state in which the first structure 401 is opened with respect to the second structure 402. According to an embodiment, the "closed state" or the "opened state" may be referred to as the state in which the electronic device is closed or the state in which the electronic device is opened, respectively.

Referring to FIGS. 4A and 4B, the electronic device 400 may include a first structure 401 and a second structure 402 disposed to be movable on the first structure 401. In some embodiments, the electronic device 400 may be interpreted as a structure in which the first structure 401 is disposed to be slidable on the second structure 402. According to an embodiment, the first structure 401 may be disposed to be reciprocable by a predetermined distance in the illustrated direction (e.g., the direction indicated by arrow ①) with respect to the second structure 402.

According to various embodiments, the first structure 401 may be referred to as, for example, a first housing, a slide unit, or a slide housing, and may be disposed to be reciprocable on the second structure 402. In an embodiment, the second structure 402 may be referred to as, for example, a second housing, a main unit, or a main housing, and may accommodate various electrical and electronic components such as a main circuit board or a battery. A portion of the display 403 (e.g., the first area A1) may be seated on the first structure 401. In some embodiments, when the first structure 401 moves (e.g., slides) with respect to the second structure 402, another portion of the display 403 (e.g., the second area A2) may be accommodated inside the second structure 402 (e.g., a slide-in operation) or exposed to the outside of the second structure 402 (e.g., a slide-out operation).

According to various embodiments, the first structure 401 may include a first plate 411a (e.g., a slide plate), and may include a first surface F1 (see FIG. 4C) including at least a portion of the first plate 411a and a second surface F2 facing away from the first surface F1. According to an embodiment, the second structure 402 may include a second plate 421a (e.g., a rear case), a first side wall 423a extending from the second plate 421a, a second side wall 423b extending from the first side wall 423a and the second plate 421a, a third side wall 423c extending from the first side wall 423a and the second plate 421a and parallel to the second side wall 423b, and/or a rear plate 421b (e.g., a rear window). In some embodiments, the second side wall 423b and the third side wall 423c may be perpendicular to the first side wall 423a. According to an embodiment, the second plate 421a, the first side wall 423a, the second side wall 423b, and the third side wall 423c may be opened on one side (e.g., the front surface) to accommodate (or surround) at least a portion of the first structure 401. For example, the first structure 401 may be coupled to the second structure 402 in a state of being at least partially surrounded and may be slidable in a direction parallel to the first surface F1 or the second surface F2 (e.g., the direction indicated by arrow ①) while being guided by the second structure 402.

According to various embodiments, the second side wall 423b or the third side wall 423c may be omitted. According to an embodiment, the second plate 421a, the first side wall 423a, the second side wall 423b, and/or the third side wall 423c may be configured as separate structures and combined or assembled to each other. The rear plate 421b may be coupled to surround at least a portion of the second plate 421a. In some embodiments, the rear plate 421b may be configured substantially integrally with the second plate 421a. According to an embodiment, the second plate 421a or the rear plate 421b may cover at least a portion of the flexible display 403. For example, the flexible display 403 may be at least partially accommodated inside the second structure 402, and the second plate 421a or the rear plate 421b may cover a portion of the flexible display 403 accommodated inside the second structure 402.

According to various embodiments, the first structure 401 may be movable to an opened state or a closed state relative to the second structure 402 in a first direction (e.g., direction ①) parallel to the second plate 421a (e.g., the rear case) and the second sidewall 423b so that the first structure 401 is located at a first distance from the first side wall 423a in the closed state and at a second distance, which may be greater than the first distance, from the first side wall 423a in the opened state. In some embodiments, in the closed state, the first structure 401 may be located to surround a portion of the first side wall 423a.

According to various embodiments, the electronic device 400 may include a display 403, a key input device 441, a connector hole 443, audio modules 445a, 445b, 447a, and 447b, or a camera module 449. The electronic device 101 may further include an indicator (e.g., an LED device) or various sensor modules.

According to various embodiments, the display 403 may include a first area A1 and a second area A2. In an embodiment, the first area A1 may extend substantially across at least a portion of the first surface F1 to be disposed on the first surface F1. The second area A2 may extend from the first area A1 and may be inserted or accommodated into the second structure 402 (e.g., a housing) according to the sliding movement of the first structure 401, or may be exposed to the outside of the second structure 402. As described below, the second area A2 may be moved while substantially being guided by a roller 451 (see FIG. 4C) mounted on the second structure 402 to be accommodated inside the second structure 402 or exposed to the outside of the second structure 402. For example, while the first structure 401 slides, a portion of the second area A2 may be deformed into a curved shape at a position corresponding to the roller 451.

According to various embodiments, when viewed from above the first plate 411a (e.g., the slide plate), if the first structure 401 moves from the closed state to the opened state, the second area A2 may define a substantially flat surface with the first area A1 while being gradually exposed to the outside of the second structure 402. The display 403 may be coupled to or disposed adjacent to a touch detection circuit, a pressure sensor capable of measuring touch intensity (pressure), and/or a digitizer configured to detect a magnetic field-type stylus pen. In an embodiment, the second area A2 may be at least partially accommodated inside the second structure 402, and a portion of the second area A2 may also be exposed to the outside of the second structure 402 even in the state illustrated in FIG. 4A (e.g., closed state). In some embodiments, irrespective of the closed state or the opened state, a portion of the exposed second area A2 may be located on the roller 451, and at a position corresponding to the roller 451, a portion of the second area A2 may maintain a curved shape.

The key input device 441 may be disposed on the second side wall 423b or the third side wall 423c of the second structure 402. Depending on the external appearance and/or use state, the electronic device 101 may be designed such that the key input device 441 is omitted and/or an additional key input device is included. For example, the electronic device 101 may include another key input device, such as a home key button or a touch pad disposed around the home key button. In other embodiments, at least some of the key input devices 441 may be located in one area of the first structure 401.

According to various embodiments, the connector hole 443 may be omitted in some embodiments, and may accommodate a connector (e.g., a USB connector) for transmitting and receiving power and/or data to and from an external electronic device. The electronic device 101 may include a plurality of connector holes 443, and some of the connector holes 443 may function as connector holes for transmitting and receiving audio signals to and from an external electronic device. As shown in FIG. 4A, the connector hole 443 may be disposed in the third side wall 423c, but the disclosure is not limited thereto. The connector hole 443 or a connector hole may be disposed in the first side wall 423a or the second side wall 423b.

According to various embodiments, the audio modules 445a, 445b, 447a, and 447b may include speaker holes 445a and 445b or microphone holes 447a and 447b. One of the speaker holes 445a and 445b may be provided as a receiver hole for a voice call, and another one may be provided as an external speaker hole. Each microphone hole 447a or 447b may include a microphone disposed therein so as to acquire external sound, and in some embodiments, may include a plurality of microphones disposed therein so as to detect the direction of sound. In some embodiments, the speaker holes 445a and 445b and the microphone holes 447a and 447b may be implemented as a single hole, or a speaker may be included without the speaker holes 445a and 445b (e.g., a piezo speaker). According to an embodiment, the speaker hole 445b may be disposed in the first structure 401 to be used as a receiver hole for a voice call, and the speaker hole 445a (e.g., an external speaker hole) or the microphone holes 447a and 447b may be disposed in the second structure 402 (e.g., one of the side surfaces 423a, 423b, and 423c).

The camera module 449 may be provided in the second structure 402 and may photograph a subject in a direction opposite to the first area A1 of the display 403. The electronic device 101 may include a plurality of camera modules 449. For example, the electronic device 101 may include, but not be limited to, a wide-angle camera, a telephoto camera, and/or a close-up camera. In some embodiments, the electronic device 100 may measure a distance to a subject by including an infrared projector and/or an infrared receiver. The camera module 449 may include one or more lenses, an image sensor, and/or an image signal processor. The electronic device 101 may further include a camera module (e.g., a front camera) for photographing a subject in a direction opposite to the first area A1 of the display 403. For example, the front camera may be disposed around the first area A1 or in an area overlapping the display 403, and when disposed in the area overlapping the display 403, the front camera may photograph a subject through the display 403.

According to various embodiments, an indicator of the electronic device 101 may be disposed on the first structure 401 or the second structure 402, and may provide state information of the electronic device 101 as a visual signal by including a light-emitting diode (LED). A sensor module of the electronic device 101 may generate an electrical signal or a data value corresponding to an internal operating state of the electronic device 101 or an external environmental state. The sensor module may include, but not be limited to, for example, a proximity sensor, a fingerprint sensor, and/or a biometric sensor (e.g., an iris/face recognition sensor and/or an HRM sensor). In other embodiments, the sensor module may further include, but not be limited to, at least one of, for example, a gesture sensor, a gyro sensor, an atmospheric pressure sensor, a magnetic sensor, an acceleration sensor, a grip sensor, a color sensor, an infrared (IR) sensor, a temperature sensor, a humidity sensor, and/or an illuminance sensor.

Figure 4C:
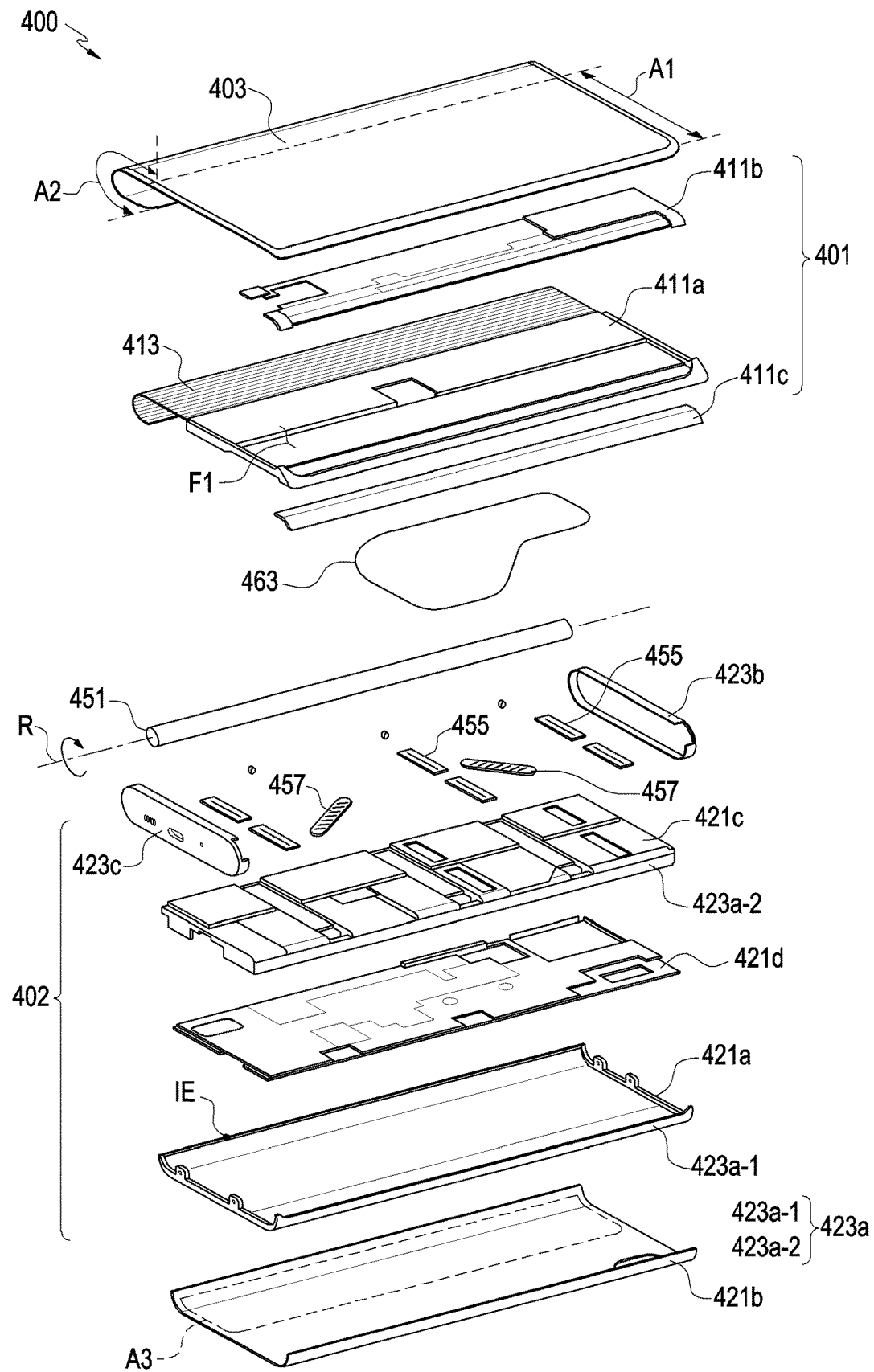
FIG. 4C is an exploded perspective view illustrating an electronic device, according to various embodiments.

FIG. 4C is an exploded perspective view illustrating an electronic device 400 according to various embodiments disclosed herein. The electronic device 400 of FIG. 4C may include or may be similar in many respects to at least one of the electronic device 101 described above in reference to FIGS. 3A, 3B, 3C, 4A, and 4B, and may include additional features not mentioned above.

Referring to FIG. 4C, the electronic device 400 may include a first structure 401, a second structure 402 (e.g., a housing), a display 403 (e.g., a flexible display), a guide member (e.g., a roller 451), a support sheet 463, and/or an articulated hinge structure 413. A portion of the display 403 (e.g., the second area A2) may be accommodated inside the second structure 402 while being guided by the roller 451.

According to various embodiments, the first structure 401 may include a first plate 411a (e.g., a slide plate), and a first bracket 411b and/or a second bracket 411c, which are mounted on the first plate 411a. The first structure 401, for example, the first plate 411a, the first bracket 411b, and/or the second bracket 411c may be made of a metal material and/or a non-metal material (e.g., polymer). The first plate 411a may be mounted on the second structure 402 (e.g., a housing) to be linearly reciprocable in one direction (e.g., the direction indicated by arrow ① in FIG. 1) while being guided by the second structure 402.

In an embodiment, the first bracket 411b may be coupled to the first plate 411a to define the first surface F1 of the first structure 401 together with the first plate 411a. The first area A1 of the display 403 may be substantially mounted on the first surface F1 to maintain a flat plate shape. The second bracket 411c may be coupled to the first plate 411a to define the second surface F2 of the first structure 401 together with the first plate 411a. According to an embodiment, the first bracket 411b and/or the second bracket 411c may be configured integrally with the first plate 411a. This may be appropriately designed in consideration of the assembly structure or manufacturing process of a manufactured product. The first structure 401 or the first plate 411a may be coupled to the second structure 402 to be slidable relative to the second structure 402.

According to various embodiments, the articulated hinge structure 413 may include a plurality of bars or rods 414 and may be connected to one end of the first structure 401. For example, as the first structure 401 slides, the articulated hinge structure 413 may move relative to the second structure 402, and in the closed state (e.g., the state illustrated in FIG. 4A), the first structure 401 may be substantially accommodated inside the second structure 402. In some embodiments, even in the closed state, a portion of the articulated hinge structure 413 may not be accommodated inside the second structure 402. For example, even in the closed state, a portion of the articulated hinge structure 413 may be located to correspond to the roller 451 outside the second structure 402. The plurality of rods 414 may linearly extend to be parallel to the rotation axis R of the roller 451, and may be arranged in a direction perpendicular to the rotation axis R, for example, the direction in which the first structure 401 slides.

According to various embodiments, each rod 414 may turn around another adjacent rod 414 while maintaining the state parallel to the other adjacent rod 414. Accordingly, as the first structure 401 slides, the plurality of bars 414 may be arranged in a form of a curved surface or a flat surface shape. For example, as the first structure 401 slides, the articulated hinge structure 413 may form a curved surface in a portion facing the roller 451, and the articulated hinge structure 413 may form a flat surface in a portion not facing the roller 451. In an embodiment, the second area A2 of the display 403 may be mounted or supported on the articulated hinge structure 413, and in the opened state (e.g., the state illustrated in FIG. 4B), the second area A2 of the display 103 may be exposed to the outside of the second structure 402 together with the first area A1. In the state in which the second area A2 is exposed to the outside of the second structure 402, the articulated hinge structure 413 may support or maintain the second area A2 in the flat state by forming a substantially flat surface.

According to various embodiments, the second structure 402 (e.g., a housing) may include a second plate 421a (e.g., a rear case), a printed circuit board, a rear plate 421b, a third plate (421c) (e.g., a front case), and a support member 421d. The second plate 421a (e.g., the rear case) may be disposed to face away from the first surface F1 of the first plate 411a and may substantially provide the external shape of the second structure 402 or the electronic device 101. In an embodiment, the second structure 402 may include a first side wall 423a extending from the second plate 421a, a second side wall 423b extending from the second plate 421a to be substantially perpendicular to the first side wall 423a, and a third side wall 423c extending from the second plate 421a to be substantially perpendicular to the first side wall 423a and parallel to the second side wall 423b. As shown in FIG. 4B, a structure in which the second side wall 423b and the third side wall 423c are manufactured as components separate from the second plate 421a and mounted on or assembled to the second plate 421a is exemplified. However, the second side wall 123b and the third side wall 123c may be manufactured integrally with the second plate 421a. The second structure 402 may accommodate an antenna for proximity wireless communication, an antenna for wireless charging, or an antenna for magnetic secure transmission (MST) in a space that does not overlap the articulated hinge structure 413.

According to various embodiments, the rear plate 421*b* may be coupled to the outer surface of the second plate 421*a*, and the rear plate 221*b* may be manufactured integrally with the second plate 421*a* depending on an embodiment. In an embodiment, the second plate 421*a* may be made of a metal or polymer material, and the rear plate 421*b* may be made of a material such as metal, glass, a synthetic resin, or ceramic to provide a decoration effect in the external appearance of the electronic device 101. According to an embodiment, the second plate 421*a* and/or the rear plate 421*b* may be made of a material that at least partially (e.g., in an auxiliary display area) transmits light. For example, in the state in which a portion of the display 403 (e.g., the second area A2) is accommodated in the second structure 402, the electronic device 101 may output visual information using a partial area of the display 403 accommodated inside the second structure 402. The auxiliary display area may provide the visual information output from the area accommodated inside the second structure 402 to the outside of the second structure 402.

According to various embodiments, the third plate 421*c* may be made of a metal or polymer material and may be coupled to the second plate 421*a* (e.g., the rear case), the first side wall 423*a*, the second side wall 423*b*, and/or the third side wall 423*c* to define an internal space of the second structure 402. According to an embodiment, the third plate 421*c* may be referred to as a "front case", and the first structure 401 (e.g., the first plate 411*a*) may slide in the state of substantially facing the third plate 421*c*. In some embodiments, the first side wall 423*a* may be configured by a combination of a first side wall portion 423*a*-1 extending from the second plate 421*a* and a second side wall portion 423*a*-2 disposed at a side edge of the third plate 421*c*. In other embodiments, the first side wall portion 423*a*-1 may be coupled to surround one side edge of the third plate 421*c* (e.g., the second side wall portion 423*a*-2), in which case, the first side wall portion 423*a*-1 itself may form the first side wall 423*a*.

According to various embodiments, the support member 421*d* may be disposed in the space between the second plate 421*a* and the third plate 421*c* and may have a flat plate shape made of a metal or polymer material. The support member 421*d* may provide an electromagnetic shielding structure in the internal space of the second structure 402 or may improve mechanical rigidity of the second structure 402. In an embodiment, when received inside the second structure 402, the articulated hinge structure 413 and/or a partial area (e.g., the second area A2) of the display 403 may be located in a space between the second plate 421*a* and the support member 421*d*.

According to various embodiments, a printed circuit board may be disposed in the space between the third plate 421*c* and the support member 421*d*. For example, the printed circuit board may be accommodated in a space separated, by the support member 421*d*, from the space in which the articulated hinge structure 413 and/or a partial area of the display 403 may be accommodated inside the second structure 402. On the printed circuit board, a processor, a memory, and/or an interface may be mounted. The processor may include, but not be limited to, at least one of, for example, a central processing unit, an application processor, a graphics processing unit, an image signal processor, a sensor hub processor, or a communication processor.

The memory may include, for example, a volatile memory or a nonvolatile memory.

The interface may include, but not be limited to, for example, a high-definition multimedia interface (HDMI), a universal serial bus (USB) interface, an SD card interface, and/or an audio interface. The interface may electrically and/or physically connect, for example, the electronic device 101 to an external electronic device, and may include a USB connector, an SD card, an MMC connector, and/or an audio connector.

According to various embodiments, the display 403 may be a flexible display based on an organic light-emitting diode and may be at least partially deformed into a curved shape while being generally maintained in a flat shape. In an embodiment, the first area A1 of the display 403 may be mounted on or attached to the first surface F1 of the first structure 401 to maintain a substantially flat plate shape. The second area A2 may extend from the first area A1 and may be supported on or attached to the articulated hinge structure 413. For example, the second area A2 may extend along the sliding direction of the first structure 401, may be accommodated inside the second structure 402 together with the articulated hinge structure 413, and may be deformed in an at least partially curved shape according to the deformation of the articulated hinge structure 413.

According to various embodiments, as the first structure 401 slides on the second structure 402, the area of the display 403 exposed to the outside may vary. The electronic device 101 (e.g., a processor) may change the area of the display 403 that is activated based on the area of the display 403 exposed to the outside. For example, in the opened state or at a position intermediate between the closed state and the opened state, the electronic device 101 may activate the area exposed to the outside of the second structure 402 in the total area of the display 403. In the closed state, the electronic device 101 may activate the first area A1 of the display 403 and deactivate the second area A2 of the display 403. In the closed state, when there is no user input for a predetermined period of time (e.g., 30 seconds, 2 minutes, and the like), the electronic device 101 may deactivate the entire area of the display 403. In some embodiments, in the state in which the entire area of the display 403 is deactivated, the electronic device 101 may provide visual information through an auxiliary display area (e.g., a portion of the second plate 421*a* and/or the rear plate 421*b* made of a material that transmits light) by activating a partial area of the display 403 as needed (e.g., providing a notification or a missed call/message arrival notification according to a user configuration).

According to various embodiments, in the opened state (e.g., the state illustrated in FIG. 4B), substantially the entire area (e.g., the first area A1 and the second area A2) of the display 403 may be exposed to the outside, and the first area A1 and the second area A2 may be disposed to define a plane. In an embodiment, even in the opened state, a portion (e.g., one end) of the second area A2 may be located to correspond to the roller 451, and the portion corresponding to the roller 451 in the second area A2 may be maintained in a curved shape. For example, in various embodiments, even if it is stated that "in the opened state, the second area A2 is disposed to define a plane", a portion of the second area A2 may be maintained in a curved shape. Similarly, although it is stated that "in the closed state, the articulated hinge structure 413 and/or the second area A2 are accommodated in the second structure 402", a portion of the articulated hinge structure 413 and/or the second area A2 may be located outside the second structure 402.

According to various embodiments, a guide member (e.g., the roller 451) may be rotatably mounted on the second structure 402 at a position adjacent to one side edge of the second structure 402 (e.g., the second plate 421a). For example, the roller 451 may be disposed adjacent to the edge of the second plate 421a parallel to the first side wall 423a (e.g., the portion IE). Another side wall may extend from an edge of the second plate 421a adjacent to the roller 451, and the side wall adjacent to the roller 451 may be substantially parallel to the first side wall 423a. As described above, the side wall of the second structure 402 adjacent to the roller 451 may be made of a material that transmits light, and a portion of the second area A2 may provide visual information through a portion of the second structure 402 in the state of being accommodated in the second structure 402.

According to various embodiments, one end of the roller 451 may be rotatably coupled to the second side wall 423b, and the other end may be rotatably coupled to the third side wall 423c. For example, the roller 451 may be mounted on the second structure 402 to be rotatable about a rotation axis R perpendicular to the slide direction of the first structure 401 (e.g., the direction indicated by arrow ① in FIG. 1 or FIG. 2). The rotation axis R may be disposed to be substantially parallel to the first side wall 423a, and may be located, for example, at one side edge of the second plate 421a far from the first side wall 423a. In some embodiments, the gap provided between the outer circumferential surface of the roller 451 and the inner surface of the edge of the second plate 421a may form an inlet through which the articulated hinge structure 413 or the display 403 enters the inside of the second structure 402.

According to various embodiments, when the display 403 is deformed into a curved shape, the roller 451 may suppress excessive deformation of the display 403 by maintaining the radius of curvature of the display 403 to a certain degree. Excessive deformation may refer to the display 403 being deformed to have an excessively small radius of curvature to the extent that pixels or signal wires included in the display 403 are damaged. For example, the display 403 may be moved or deformed while being guided by the roller 451 and may be protected from damage due to excessive deformation. In some embodiments, the roller 451 may rotate while the articulated hinge structure 413 or the display 403 is inserted into or extracted from the second structure 402. For example, by suppressing rubbing between the articulated hinge structure 413 (or the display 403) and the second structure 402, the articulated hinge structure 413 (or the display 403) may smoothly perform the insertion/extraction operation of the second structure 402.

According to various embodiments, the support sheet 463 may be made of a flexible and/or elastic material, for example, a material including an elastic body such as silicone or rubber, may be mounted on or attached to the roller 451, and may be selectively wound around the roller 451 as the roller 451 rotates. As shown in FIG. 4C, a plurality of (e.g., four) support sheets 463 may be arranged along the direction of the rotation axis R of the roller 451. For example, the plurality of support sheets 463 may be mounted on the roller 451 such that adjacent support sheets 463 are spaced apart from each other by a predetermined interval, and may extend in a direction perpendicular to the rotation axis R. In another embodiment, one support sheet may be mounted on or attached to roller 451. For example, one support sheet may have a size and shape corresponding to the area in which the support sheets 463 are disposed and the areas between the support sheets 463 in FIG. 3. In this way, the number, size, or shape of the support sheets 463 may be appropriately changed depending on an actually manufactured product. In some embodiments, the support sheet 463 may be rolled on the outer circumferential surface of the roller 451 as the roller 451 rotates or may be spread out from the roller 451 in a flat plate shape from the space between the display 403 and the third plate 421c. In another embodiment, the support sheet 463 may be referred to as a "support belt", an "auxiliary belt", a "support film", or an "auxiliary film".

According to various embodiments, an end of the support sheet 463 may be connected to the first structure 401 (e.g., the first plate 411a (e.g., a slide plate)), and the support sheet 463 may be rolled on the roller 451 in the closed state (e.g., the state illustrated in FIG. 4A). Accordingly, when the first plate 411a moves to the opened state (e.g., the state illustrated in FIG. 4B), the support sheet 463 may be gradually located between the second structure 402 (e.g., the third plate 421c) and the display 403 (e.g., the second area A2) or between the second structure 402 (e.g., the third plate 421c) and the articulated hinge structure 413. For example, at least a portion of the support sheet 463 may be located to face the articulated hinge structure 413, and may be selectively wound around the roller 451 according to the sliding movement of the first plate 411a. The support sheet 463 may be generally disposed to be in contact with the articulated hinge structure 413, but a portion rolled on the roller 451 may be substantially separated from the articulated hinge structure 413.

According to various embodiments, an arrangement gap between the surface of the display 403 and the inner surface of the edge of the second plate 421a may vary depending on the extent to which the support sheet 463 is wound around the roller 451. The smaller the arrangement gap, the easier it may be to prevent introduction of foreign matter. However, when the arrangement gap is excessively small, the display 403 may come into contact with or rub against the second plate 421a. When direct contact or rubbing occurs, the surface of the display 403 may be damaged or the sliding operation of the first structure 401 may be hindered.

According to various embodiments, in the closed state, since the support sheet 463 is wound around the roller 451, it may be possible to reduce the gap between the surface of the display 403 and the inner surface of the edge of the second plate 421a while maintaining the state in which the surface of the display 403 is not in contact with the second plate 421a. For example, by reducing the arrangement gap in the closed state, it may be possible to block the introduction of external foreign matter into the inside of the second structure 402. In an embodiment, as the first structure 401 (e.g., the first plate 411a or the slide plate) gradually moves to the opened state, the support sheet 463 may move away from the roller 451 to gradually move to the space between the second structure 402 (e.g., the second plate 421a or the third plate 421c) and the articulated hinge structure 413. For example, as the first structure 401 moves to the opened state, the arrangement gap gradually increases so that it may be possible to suppress direct rubbing or contact between the display 403 and another structure (e.g., the second plate 421a) and to prevent the surface of the display 403 from being damaged due to the rubbing or contact. In some embodiments, the thickness of the support sheet 463 may gradually increase from one end (e.g., the portion fixed to the roller 451) toward the other end (e.g., the portion fixed to the first plate 411a). By using the thickness profile of the support sheet 463, it may be possible to adjust the arrangement gap in the closed state and the opened state.

According to various embodiments, the electronic device 101 may include at least one elastic member made of a low-density elastic body, such as a sponge, or a brush. For example, the electronic device 101 may include a first elastic member mounted at one end of the display 403, and may further include a second elastic member mounted at the inner surface of an edge of the second plate 421*a* in some embodiments. The first elastic member may be substantially disposed in the internal space of the second structure 402, and in the opened state (e.g., the state illustrated in FIG. 4B), the first elastic member may be located to correspond to the edge of the second plate 421*a*. In an embodiment, the first elastic member may move in the internal space of the second structure 402 according to the sliding movement of the first structure 401. When the first structure 401 moves from the closed state to the opened state, the first elastic member may move toward the edge of the second plate 421*a*. When the first structure 401 reaches the opened state, the first elastic member may come into contact with the inner surface of the edge of the second plate 421*a*. For example, in the opened state, the first elastic member may seal the gap between the inner surface of the edge of the second plate 421*a* and the surface of the display 403. In other embodiments, when moving from the closed state to the opened state, the first elastic member may move while coming into contact with the second plate 421*a* (e.g., slide contact). For example, when foreign matter is introduced into the gap between the second area A2 and the second plate 421*a* in the closed state, the first elastic member may discharge the foreign matter to the outside of the second structure 402 while moving to the opened state.

According to various embodiments, the second elastic member may be attached to the inner surface at the edge of the second plate 421*a* and may be disposed to substantially face the inner surface of the display 403. In the closed state, the gap (e.g., the arrangement gap) between the surface of the display 403 and the inner surface of the edge of the second plate 421*a* may be substantially determined by the second elastic member. According to an embodiment, in the closed state, the second elastic member may substantially seal the arrangement gap by coming into contact with the surface of the display 403. According to an embodiment, the second elastic member may be made of a low-density elastic body, such as a sponge, or a brush, not to damage the surface of the display 403 even if the second elastic member comes into direct contact with the display 403. In other embodiments, the arrangement gap may increase as the first structure 401 gradually moves to the opened state. For example, the second area A2 of the display 403 may be gradually exposed to the outside of the second structure 402 without substantially coming into contact with or rubbing against the second elastic member. When the first structure 401 reaches the opened state, the first elastic member may come into contact with the second elastic member. For example, in the opened state, the first elastic member and the second elastic member may block the inflow of foreign matter by sealing the arrangement gap.

According to various embodiments, the electronic device 101 may further include guide rails 455 and/or actuating members 457. The guide rails 455 may be mounted on the second structure 402 (e.g., the third plate 421*c*) to guide the sliding movement of the first structure 401 (e.g., the first plate 411*a* or slide plate). The actuating members 457 may include a spring or a spring module that provides an elastic force in a direction to move opposite ends thereof away from each other. One end of the actuating members 457 may be pivotably supported by the second structure 402, and the other end may be pivotably supported by the first structure 401. When the first structure 401 slides, the opposite ends of the actuating members 457 may be located closest to each other at any one point between the closed state and the opened state (hereinafter, referred to as the "closest point"). For example, in the section between the closest point and the closed state, the actuating members 457 may provide an elastic force to the first structure 401 in a direction to move the first structure 401 toward the closed state and in the section between the closest point and the opened state, the actuating members 457 may provide an elastic force to the first structure 401 in a direction to move the first structure 401 toward the opened state.

In the following detailed description, the components, which can be easily understood through the preceding embodiments, may be denoted by the same reference numerals as the preceding embodiments or the reference numerals may be omitted, and the detailed description thereof may also be omitted. An electronic device (e.g., the electronic device 101 in FIGS. 4A to 4C) according to various embodiments disclosed herein may be implemented by selectively combining components of different embodiments, and components of one embodiment may be replaced by components of another embodiment. For example, it is noted that the disclosure is not limited to specific figures or embodiments.

Hereinafter, examples of software modules included in the electronic device 101 (e.g., the electronic device described with reference to FIGS. 1 through 4C) are described.

Figure 5:
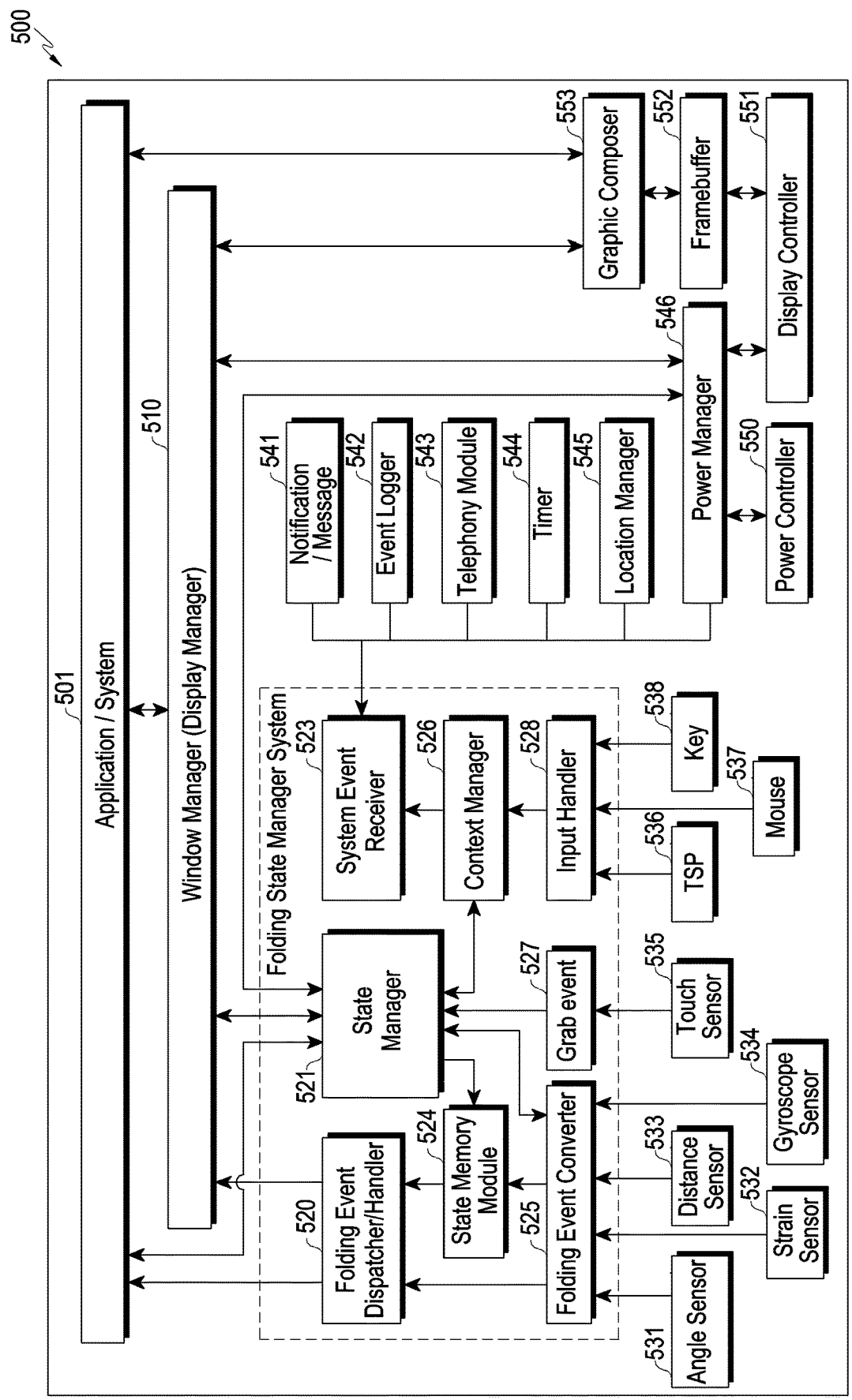
FIG. 5 is a view for describing an example of a configuration included in an electronic device, according to various embodiments.

FIG. 5 is a diagram for describing examples of components 500 included in the electronic device 101 according to various embodiments of the disclosure. According to various embodiments, without being limited to the software modules illustrated in FIG. 5, the electronic device 101 may include more or fewer software modules than the illustrated software modules.

According to various embodiments, at least some of the software modules may be implemented (e.g., executed) in software, firmware, hardware (e.g., a processor), or a combination of at least two or more thereof. For example, the software modules may be stored in the electronic device 101 (e.g., the memory 130) in the forms of programs, computer codes or instructions, routines, or processes capable of being executed by the processor 120 of the electronic device (e.g., the electronic devices described with reference to FIGS. 1 through 4C). When the software modules are executed by the processor 120, the software modules may cause the processor 120 to perform operations associated with the software modules.

According to various embodiments, the software modules may include an operating system that controls resources related to the electronic device 101 and/or various applications, which is running on the operating system. The operating system may include, but not be limited to, for example, Android™, iOS™, Windows™, Symbian™, Tizen™, and/or Bada™. At least some of the program modules 500 may be preloaded on the electronic device or downloaded from an external electronic device (e.g., a server).

According to various embodiments, a folding event converter 525 (or an event converter) may determine the folding state of the electronic device by analyzing raw data received from at least one sensor (e.g., an angle sensor 531, a strain sensor 532, a distance sensor 533, or a gyroscope sensor 534). Hereinafter, "folding" may be referred to as "bending", and a "folding event" may be referred to as a "folding gesture". According to an embodiment, a folded state may indicate an angle between a plurality of housings (e.g., the first housing structure 310 and the second housing structure 320) of the electronic device 101, or a predetermined angle range corresponding to the angle (or the folding angle) between the plurality of housings of the electronic device 101. For example, the predetermined angle range may include a first angle range (e.g., 180 degrees or more), a predetermined second angle range (e.g., greater than 0 degrees and less than 180 degrees), and a predetermined third angle range (e.g., 0 degrees). Examples of predetermined angle ranges are examples for helping understanding, and the disclosure is not limited thereto. According to various embodiments, the predetermined angle ranges may be configured and/or changed by a designer and/or a user. Alternatively or additionally, the folding state may indicate an angle change pattern, such as an increasing trend or a decreasing trend of the folding angle.

According to various embodiments, a state manager 521 may communicate with one or more other components (e.g., a folding event converter 525, a grab event manager 527, a context manager 526, or the like) and collect information related to the states of the electronic device, and may provide the collected information to one or more other components (e.g., a state memory module 524, an application 501, a window manager 510, or the like). The information related to the states of the electronic device may include at least one of folding state-related information, holding-related information, hovering input-related information, and a user's touch input-related information. According to various embodiments, a state memory module 524 may store information related to the states of the electronic device.

According to various embodiments, a folding event dispatcher 520 (or an event handler) may transmit related information, which is related to the folding state of the electronic device, to the window manager 510 or the application 501.

According to various embodiments, a notification/message manager 541 may provide a user with events (e.g., an arrival message, an appointment, a proximity notification, and the like). According to various embodiments, an event logger 542 may record the events and display the events in time order. According to various embodiments, a telephony module 543 may manage a voice/video call function of the electronic device. A timer 544 may provide a timer function. According to various embodiments, a location manager 545 may manage, for example, position information of the electronic device. According to various embodiments, a power manager 546 may be interlocked with, for example, a power controller 550 so as to manage the capacity or power of a battery and to provide power information required for the operation of the electronic device.

According to various embodiments, a system event receiver 523 may receive events from the notification/message manager 541, the event logger 542, the telephony module 543, the timer 544, or the power manager 546, and may transmit the events to a context manager 526. According to various embodiments, an input handler 528 may receive inputs from a TSP 536, a mouse 537, and/or a key 538, and may forward the inputs to the context manager 526. According to various embodiments, the context manager 526 may manage system services based on an input, a system event, a folding state, and the like.

According to various embodiments, the grab event manager 527 may receive information (e.g., a touch input area and/or a position) related to a holding state of the electronic device from a touch sensor 535, and may transmit the information to the state manager 521.

According to various embodiments, a display controller 551 may control turning on/off of a screen. A frame buffer 552 may store pixel values or pixel color values to be output to a display. A graphic composer 553 may generate a screen including various objects, such as items, images, and texts.

According to various embodiments, the window manager 510 may manage a graphical user interface (GUI) resource that is used in a screen.

According to various embodiments, the application 501 may include, but not be limited to, for example, a home application, a dialer application, a short messaging service/multimedia messaging service (SMS/MMS) application, an instant message (IM) application, a browser application, a camera application, an alarm application, a contact application, a voice dial application, an e-mail application, a calendar application, a media player application, an album application, a watch application, a health care (e.g., measurement of a quantity of motion, or blood sugar) application, and/or an environmental information (e.g., atmospheric pressure, humidity, or temperature information) providing application.

Hereinafter, another example of software modules included in the electronic device 101 according to various embodiments is described.

Figure 6:
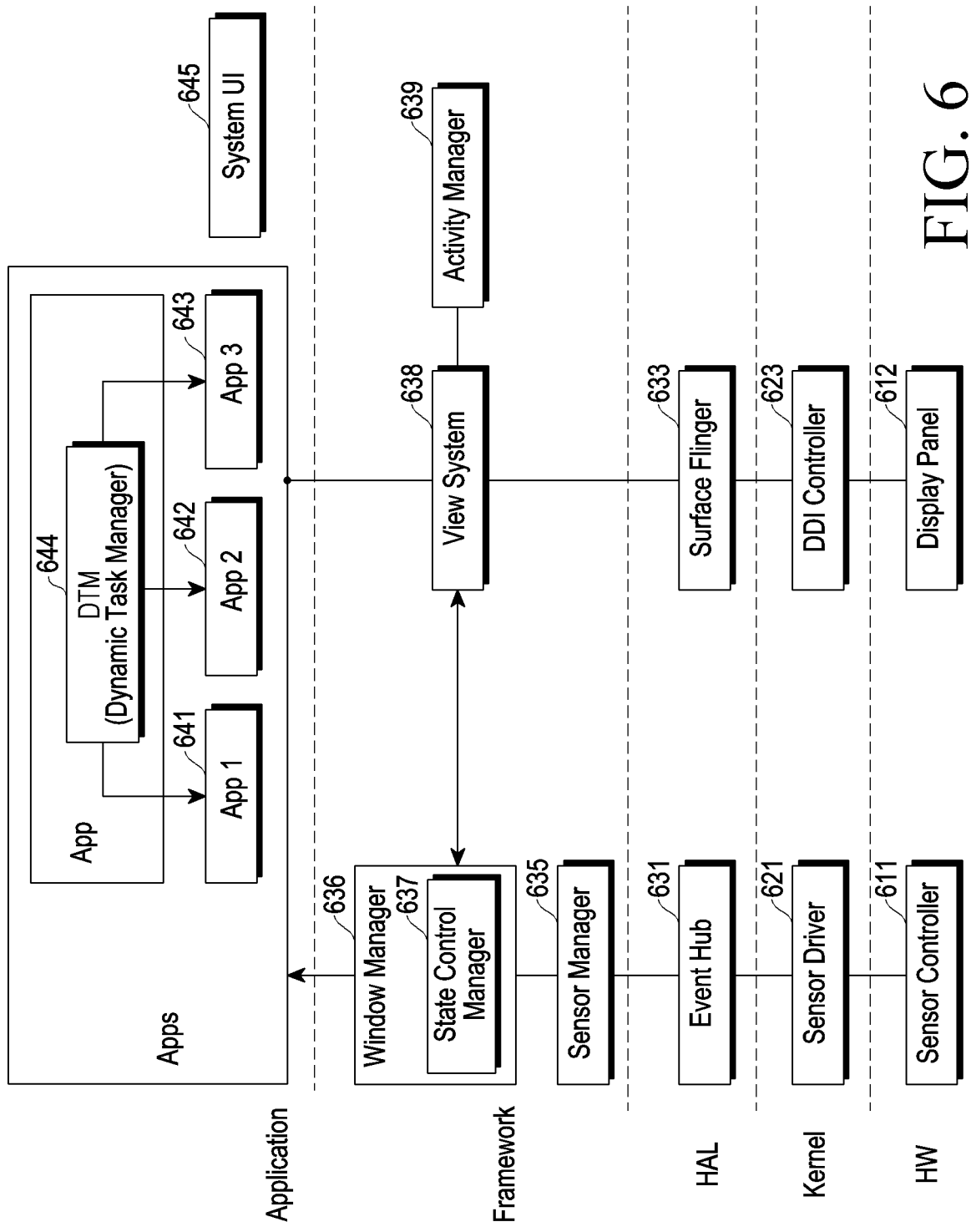
FIG. 6 is a view for describing examples of software modules included in an electronic device, according to various embodiments.

FIG. 6 is a view for describing examples of software modules included in an electronic device 101 according to various embodiments. Hereinafter, components for changing the execution screen of an application of the electronic device 101 are described with reference to FIG. 6.

According to various embodiments, the electronic device 101 may include a hardware layer (HW) including a sensor controller 611 and a display panel 612, a kernel layer (Kernel) including a sensor driver 621 and a DDI controller 623, a library layer (HAL) including an event hub 631 and a surface flinger 633, a frame work layer (Framework) including a sensor manager 636, a window manager 636, a view system 638, an activity manager 639, and a state control manager 637, and an application layer (Application) including first application 641, second application 642, and third application 643, and a dynamic task manager (DTM) 644. In some embodiments, the memory 130 may store the kernel layer, the library layer, the framework layer, and the application layer in the form of instructions so as to allow the processor to execute the operations of corresponding components when the layers are executed.

Hereinafter, the hardware layer (HW) and the kernel layer (Kernel) are described.

According to various embodiments, the sensor controller 611 may detect various states of the electronic device 101. A redundant description related to the sensor controller 611 is omitted. According to various embodiments, the sensor driver 621 may cause the sensor controller 611 to be driven.

According to various embodiments, the display panel 612 may include an application execution screen. A redundant description related to the display panel 612 is omitted. According to various embodiments, the display controller (DDI controller) 604 may correspond to a display drive circuit DDI.

Without being limited to the above description, the hardware layer (HW) and the kernel layer (Kernel) may be implemented in the same manner as a well-known technology, and thus other redundant descriptions are omitted.

Hereinafter, the library layer (HAL) is described.

According to various embodiments, the event hub 605 may allow collected events and data to be processed. For example, the event hub 631 may transmit the collected events and data from the sensor module 611 to the framework layer such that a service corresponding thereto can be provided.

According to various embodiments, the surface flinger 606 may synthesize multiple layers. The surface flinger 633 may provide data representing the multiple synthesized layers to the display controller 604.

Since the library layer (HAL) may be implemented in the same manner as well-known technology without being limited to the above description, other redundant descriptions are omitted.

Hereinafter, the framework layer (Framework) is described.

According to various embodiments, the sensor manager 607 may manage the events and data acquired by the sensor module 611.

According to various embodiments, the window manager 608 may perform operations such that the execution screen of an application is changed according to a change in angle.

For example, the window manager 636 may manage at least one predetermined application (or manage a list) that supports execution screen change. The window manager may identify at least one application that supports execution screen change among a plurality of applications, which are currently being executed, based on the list, and may control the at least one application to change the execution screen. For example, the window manager 636 may transmit an unfolding/folding event to the at least one application that supports execution screen change. The at least one application may provide an execution screen corresponding to the acquired unfolding/folding event, and the graphic composer 669 may provide data based on the received execution screen to the display driver. The wording "the window manager 636 or another manager controls an application" may include providing information on an event acquired by the window manager 636 or another manager to the application.

For example, the window manager 636 (e.g., the state control manager 637) may identify whether or not the state of the electronic device 101 is changed (e.g., changed from the opened mode to the half-folded mode) based on the data acquired with the sensor controller 611. In other words, the state control manager 637 may manage the current state of the electronic device 101.

Alternatively or additionally, for example, when a change in the state of the electronic device 101 (e.g., the change from the opened mode to the half-folded mode) is identified through the sensor module 611, the window manager 636 may transmit information corresponding to the changed state of the electronic device 101 to an application. For another example, when the change in the state of the electronic device 101 is identified, the window manager 608 may transmit information on a display area corresponding to the changed state of the electronic device 101 to a predetermined application that supports the change of an execution screen, among applications 612, which are being executed.

According to various embodiments, the view system 610 may be a program for drawing at least one layer based on the resolution of the display panel 612. In some embodiments, an application may draw at least one layer based on the resolution of a second display area of the display panel 612 by using the view system 638. The view may manage various execution screens displayed by the application and graphic elements included in the execution screens.

According to various embodiments, the activity manager 639 may acquire and manage various kinds of information related to the state of execution of an application (e.g., a foreground mode or a background mode).

Since the framework may be implemented in the same manner as well-known technology without being limited to the above description, other redundant descriptions are omitted.

Hereinafter, the application layer (Apps) is described.

According to various embodiments, the application layer may include various types of applications installed in the electronic device and a dynamic task manager (DTM).

As described above, the various types of applications 641, 642, and 643 may include, but not be limited to, for example, a home application, a dialer application, an SMS/MMS application, an IM application, a browser application, a camera application, an alarm application, a contact application, a voice dial application, an e-mail application, a calendar application, a media player application, an album application, a watch application, a health care (e.g., measurement of a quantity of motion, or blood sugar) application, or an environmental information (e.g., atmospheric pressure, humidity, or temperature information) providing application.

The dynamic task manager 644 is a type of recent application, and may provide information on applications executed in a background mode to the electronic device. The foreground mode refers to the state of an application executed in a process in a state that is controllable by a user, and the background mode refers to the state of an application that is executed in a process other than the foreground mode (e.g., a process in a state that is not controllable by the user). The dynamic task manager 644 may receive information on the folding state of the electronic device from the state control manager, and switch the execution screen based on the received information on the folding state. The execution screen switching may mean changing a visual attribute (e.g., shape, size, and/or color) of information (e.g., objects, and/or contents) included in the execution screen, and adjusting a position. The execution screen switching operation is described in further detail below.

Alternatively or additionally, the dynamic task manager 644 may perform control on an application, which is being executed in a background mode, so that a specific application is executed in the foreground mode. For example, when an object (e.g., an icon and/or a thumbnail) for one application displayed on the execution screen of the dynamic task manager 644 is selected, the dynamic task manager 644 may control the one application in the foreground mode. Hereinafter, the dynamic task manager 644 is described as a recent application, and the operations of the electronic device based on the recent application are described in further detail below.

Hereinafter, examples of the operations of the electronic device 101 according to various embodiments are described.

According to various embodiments, when the folding angle is changed, the electronic device 101 may display a plurality of objects included in the execution screen of the recent application (e.g., the DTM in FIG. 6) in a first area 831 (see FIG. 8), and may configure a plurality of touch areas for selecting the plurality of objects in a second area different from the first area 831. When a user input is identified on the plurality of touch areas, the electronic device 101 may select an application corresponding to a touch area selected by the user input. The electronic device 101 may display the execution screen of the application by executing the selected application in the foreground mode.

Figure 7:
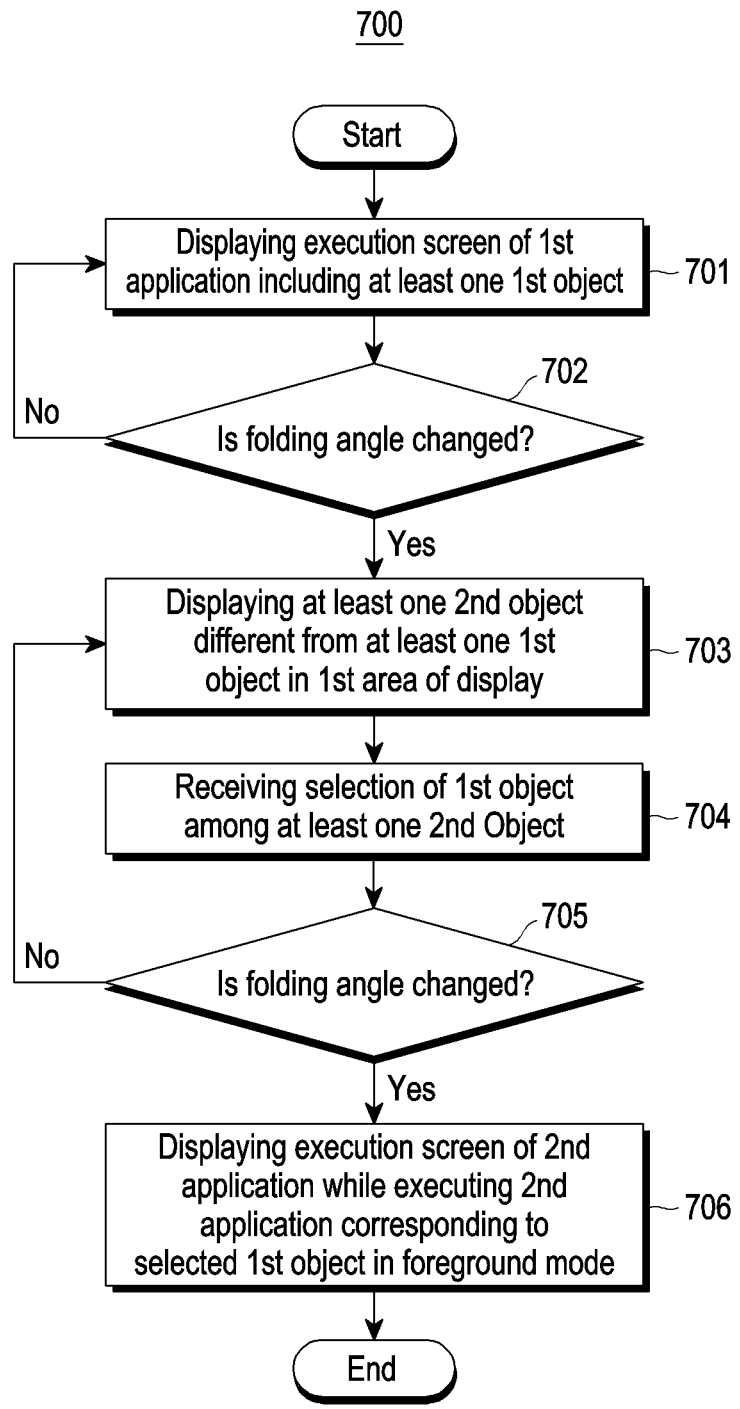
FIG. 7 is a flowchart for describing examples of operations of the electronic device 101, according to various embodiments.

FIG. 7 is a flowchart 700 for describing other examples of operations of the electronic device 101 according to various embodiments. According to various embodiments, the operations illustrated in FIG. 7 are not limited to the illustrated order, and may be performed in various orders. In addition, according to various embodiments, a greater or smaller number of operations compared to the operations illustrated in FIG. 7 may be performed. Hereinafter, the operations of FIG. 7 are described with reference to FIGS. 8 through 11B.

Figure 8:
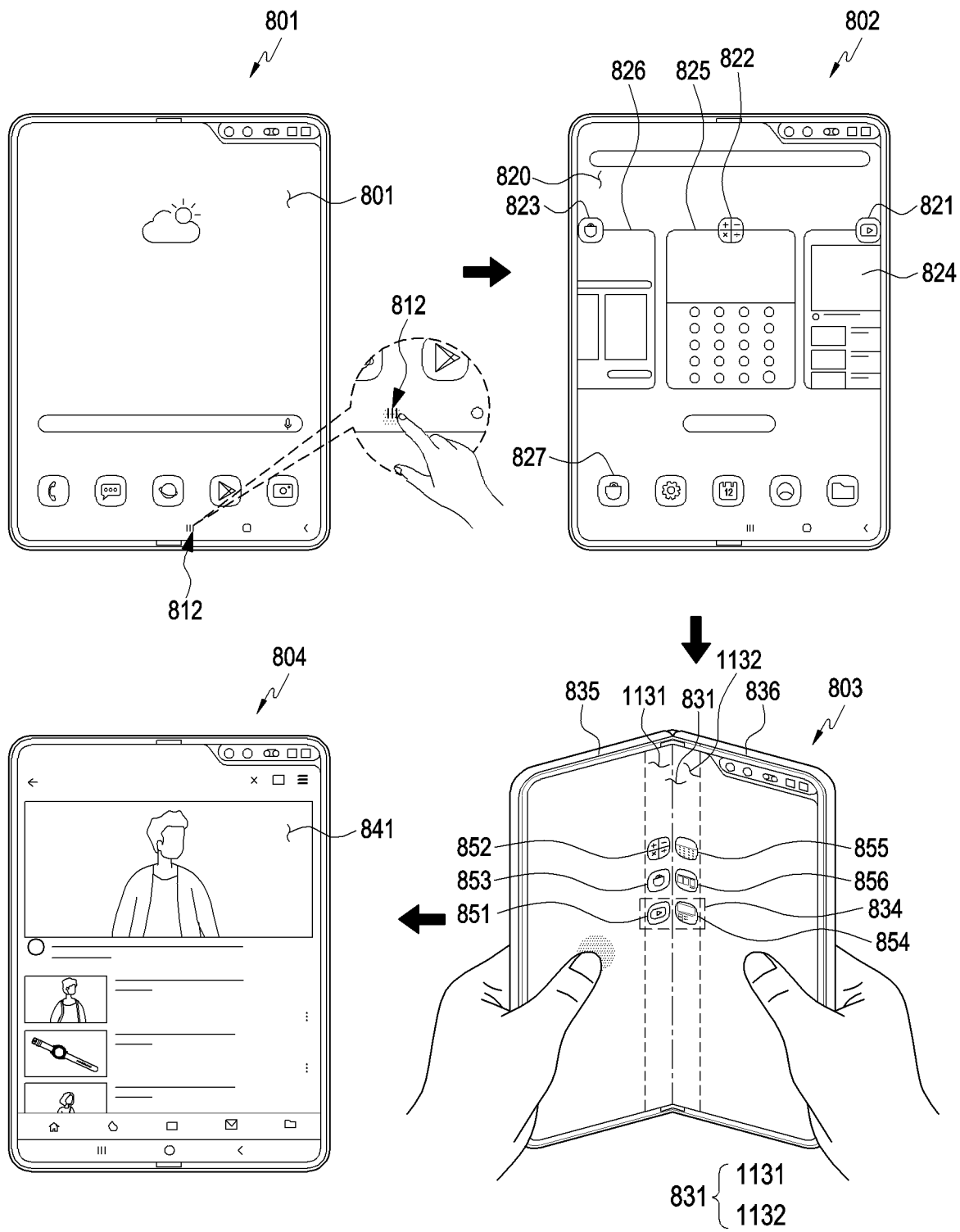
FIG. 8 is a view for describing examples of operations of switching and displaying the execution screen of a recent application of an electronic device and displaying the execution screen of an application selected based on the recent application, according to various embodiments.
Figure 9:
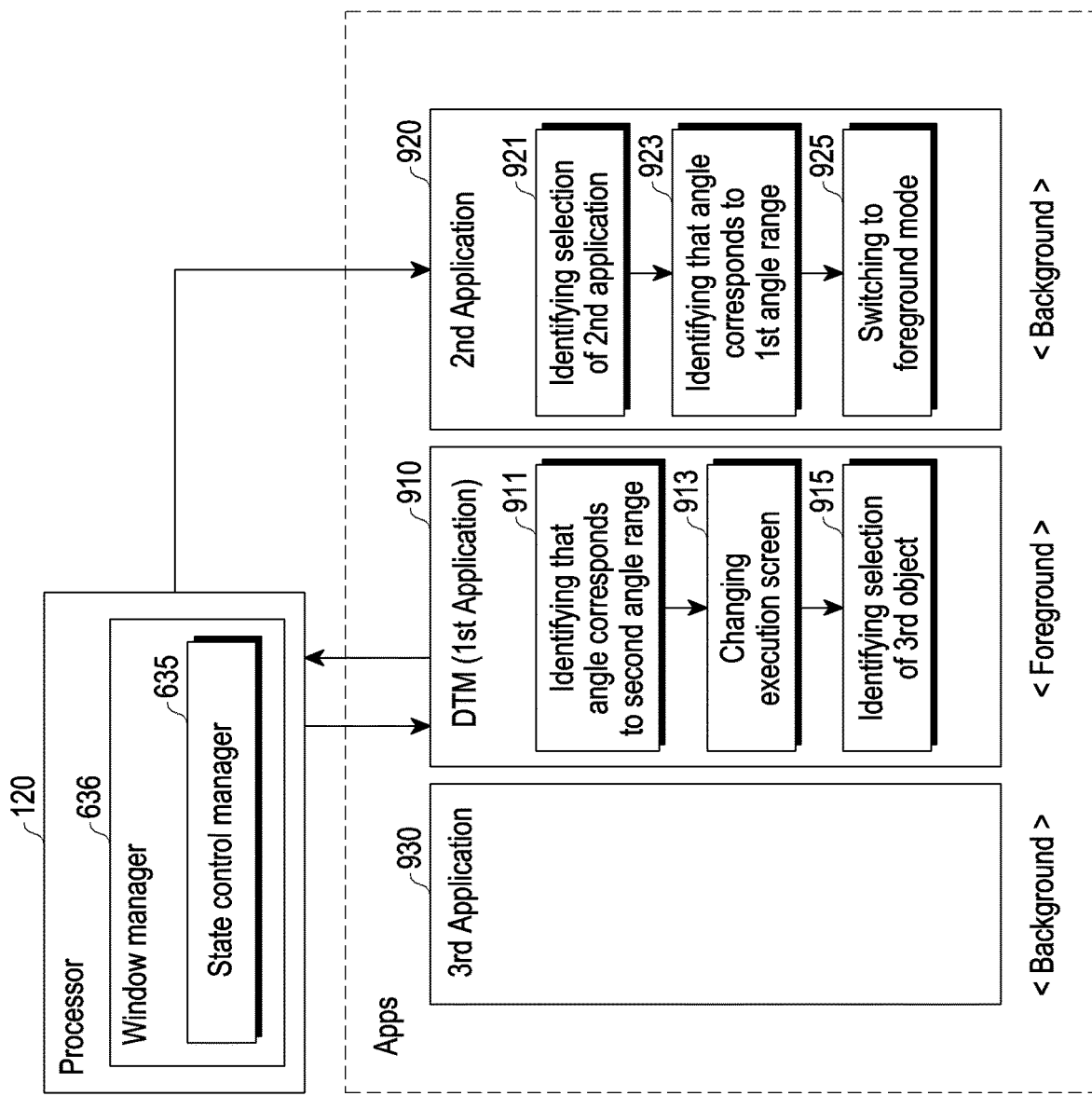
FIG. 9 is a view for describing operations of a processor and applications of an electronic device, according to various embodiments.
Figure 10:
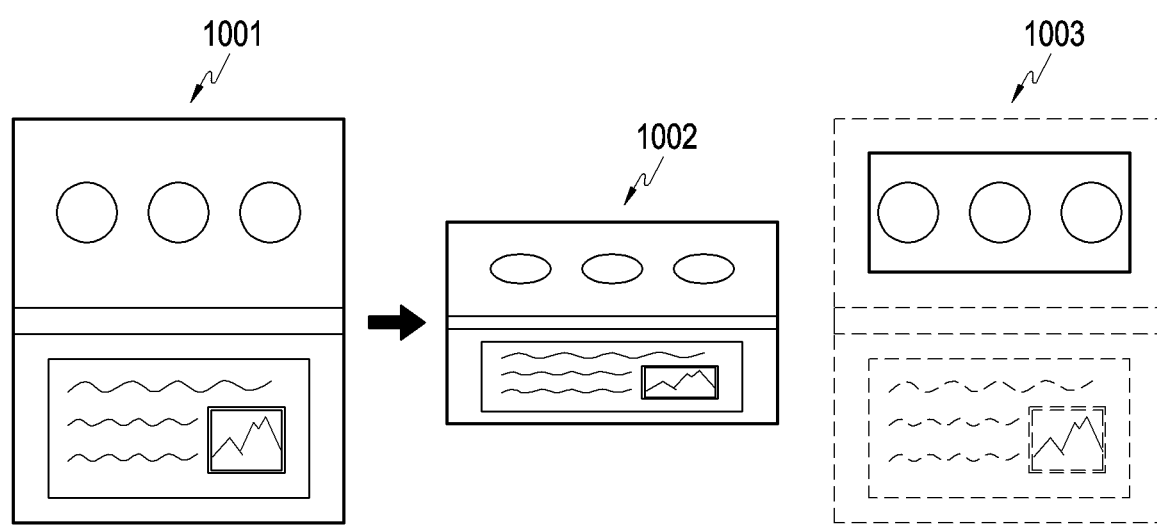
FIG. 10 is a view for describing an example of an operation of transforming an object of an electronic device, according to various embodiments.
Figure 11A:
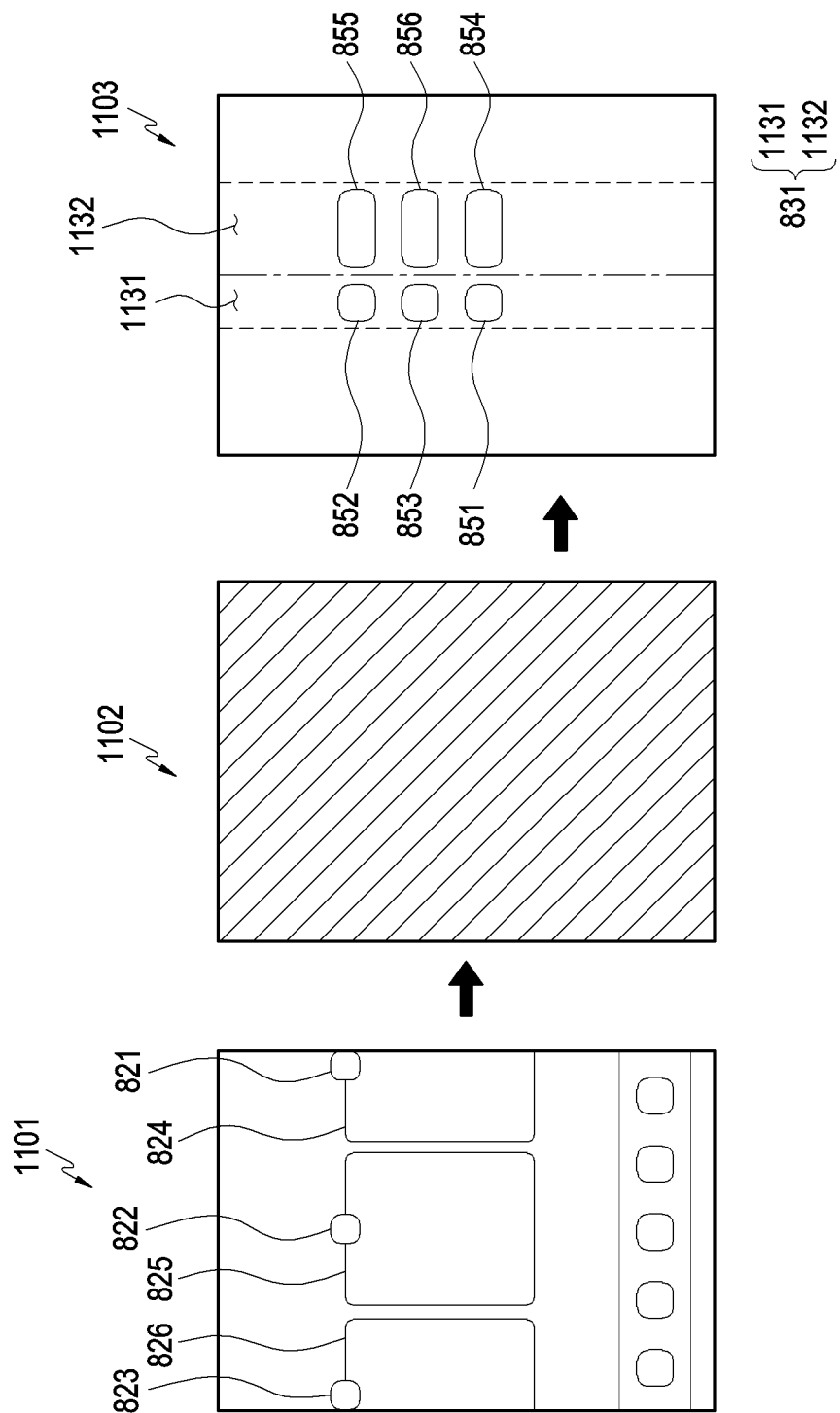
FIG. 11A is a view for describing an example of an operation of switching the execution screen of a recent application of an electronic device, according to various embodiments.
Figure 11B:
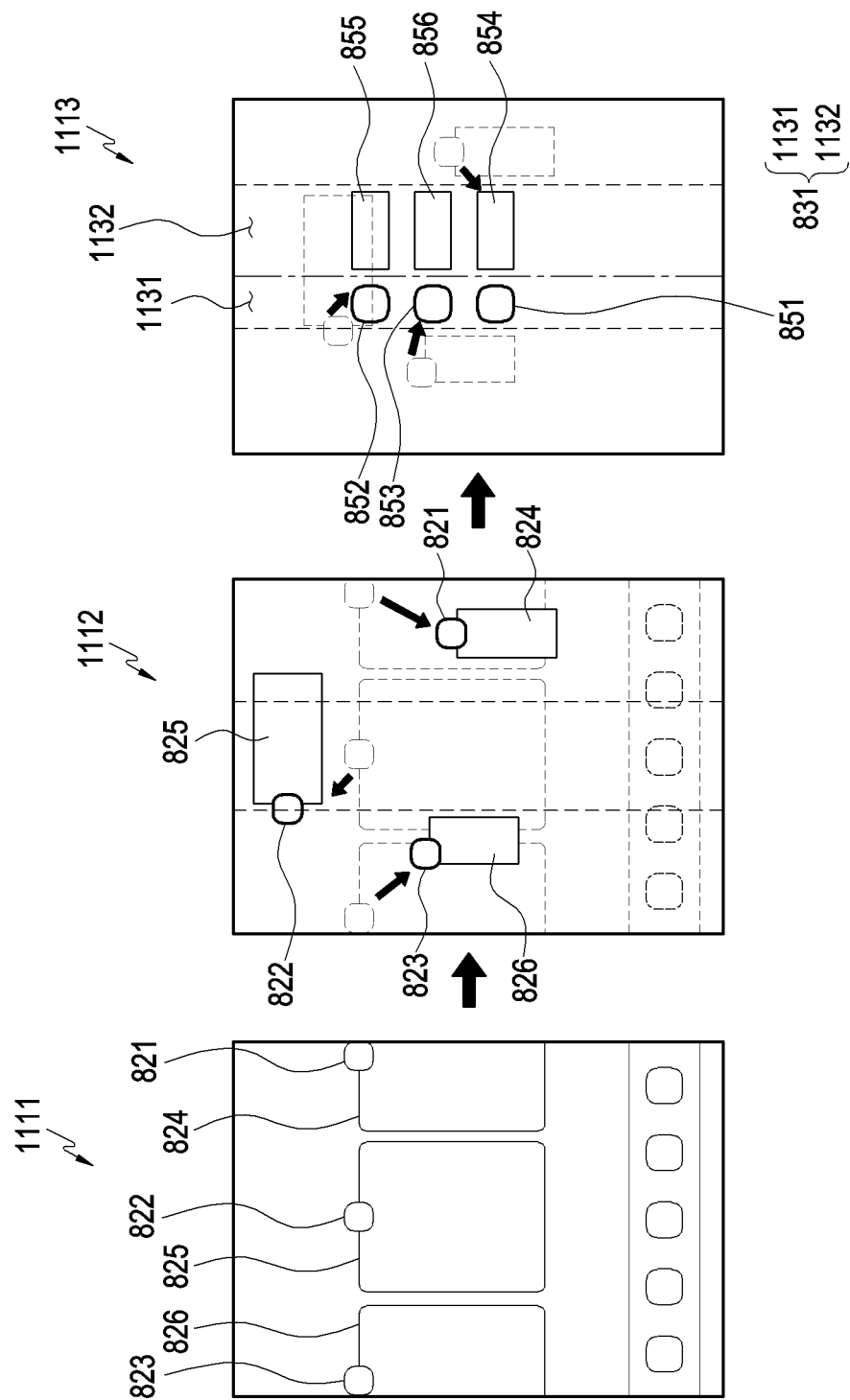
FIG. 11B is a view for describing another example of an operation of switching the execution screen of a recent application of an electronic device, according to various embodiments.

FIG. 8 is a view for describing examples of operations of switching and displaying the execution screen of a recent application of an electronic device 101 according to various embodiments to another execution screen, and displaying the execution screen of an application selected based on the recent application. FIG. 9 is a view for describing operations of a processor and applications of an electronic device 101 according to various embodiments. FIG. 10 is a view for describing an example of an operation of transforming an object (e.g., a thumbnail) of an electronic device 101 according to various embodiments. FIG. 11A is a view for describing an example of an operation of switching the execution screen of a recent application of an electronic device 101 according to various embodiments. FIG. 11B is a view for describing another example of an operation of switching the execution screen of a recent application of an electronic device 101 according to various embodiments.

According to various embodiments, the electronic device 101 may display the execution screen of a first application including at least one first object in operation 701. For example, as illustrated in 801 to 802 of FIG. 8, in the state in which the angle between housings (the first housing 835 and the second housing 836) is a first angle (e.g., 180 degrees), the electronic device 101 may detect an event for executing a first application (e.g., the DTM of FIG. 6 or a recent application) for providing information on an application, which is being executed in the background mode in the state, and may display the execution screen 820 of the first application (e.g., the recent application) based on event detection. For example, the event may include a user input for selecting an icon and/or an object (e.g., an object 812 displayed on a navigation bar as illustrated in 801 in FIG. 8) for executing the first application. For example, while displaying a specific screen (e.g., a home screen 811), the electronic device 101 may display an object 812 for executing a recent application at the lower end of a specific screen (e.g., the object 812 on the navigation bar), and may display the execution screen 820 of the recent application when the object 812 is selected. In addition, the event may include that an angle (or a folding angle) between the housings 835 and 836 is changed and included within a predetermined range. For example, when the folding angle is changed and included within a predetermined range, the electronic device 101 may perform operation 703 (e.g., an operation of transforming and displaying an object) together while displaying the execution screen of the first application (e.g., the recent application) together. At this time, the executed first application 910 may be switched to the foreground mode as illustrated in FIG. 9, and a third application 930 that has been originally executed in the foreground mode (e.g., an application for display a home screen) may be switched to the background mode. Hereinafter, the operation of the first application (e.g., a receive application) is described. For convenience of description, the first application is described by taking the recent application as an example, but is not limited thereto, and the electronic device 101 may display the execution screens of other types of applications (e.g., gallery, camera, and game applications). For example, as described below with reference to FIGS. 38 to 39, the electronic device 101 may perform the following operations with respect to contents included in the execution screens of various types of applications. There are no restrictions on commands for executing a recent application or other types of applications.

According to various embodiments, the recent application may acquire information about applications which are being executed in the background mode among a plurality of applications, on the electronic device 101, and may display at least one first object based on the acquired information. The foreground mode may refer to the state of an application that is executed in a process in a state that is controllable by a user, and the background mode may refer the state of an application that is executed in a process other than the foreground mode (e.g., a process in a state that is not controllable by the user). For example, as illustrated in 801 of FIG. 8, a partial area of the execution screen 820 of the recent application may include, as the at least one first object, icons 821, 822, and 823 representing applications which are being executed in the background mode and thumbnails 824, 825, and 826. The recent application may acquire information about the screens of applications which are being executed in the background mode (e.g., information about views, and information about a screen displayed while being executed in the foreground mode), and may display thumbnails 824, 825, and 826 based on the acquired information. In addition, the recent application may acquire information about icon images corresponding to the pre-stored applications which are being executed in the background mode, and may display the icons 821, 822, and 823 (e.g., display the icons 821, 822, and 823 to overlap partial areas of the thumbnails 824, 825, and 826) based on the acquired information. For example, the recent application may display various kinds of information in another partial area of the execution screen 820. As another example, the another partial area of the execution screen 820 of the recent application may include icons for executing recommended applications. Alternatively or additionally, an area other than the areas in which the above-described various kinds of information of the execution screen 820 of the recent application is displayed (e.g., the partial areas and the another partial area) may display a predetermined color (e.g., a color for background processing) or may be blurred. The execution screen 820 of the recent application illustrated in 801 of FIG. 8 is merely an example in the form of a carousel, and may be implemented in various forms (e.g., a stack, a list, a grid, a carousel, a slim list, and a vertical stack). The various forms are known forms, and descriptions related thereto are omitted.

According to various embodiments, when the folding angle is identified as being changed in operation 702, in operation 703, the electronic device 101 may display at least one second object different from the at least one first object (e.g., the icons 821, 822, and 823, and the thumbnails 824, 825, and 826 included in the execution screen 820 of the first application) in the first area 831 of the display. For example, as illustrated in 803 of FIG. 8, as the relative positions of the housings (e.g., the first housing 835 and the second housing 836) of the electronic device 101 are changed according to the pivoting of the hinge (or the housings are rotated about the hinge), the angle (or the folding angle) between the housings (e.g., first housing 835 and second housing 836) may be changed from a first angle (e.g., 180 degrees) to a second angle (e.g., 130 degrees). The processor 120 (e.g., the state control manager 635 of the window manager 636) of the electronic device 101 may acquire values detected by the sensors as the angle between the housings is changed, and may identify the folding state based on the values. The folding state may include at least one of whether the housings are in contact, a folding angle, or an angle range corresponding to the folding angle, as described above with reference to FIG. 5. As illustrated in FIG. 9, the processor (e.g., the state control manager 635 of the window manager 636) may transmit a value for notifying that the folding angle corresponds to (e.g., is included in) a second angle range (e.g., 120 to 160 degrees) to the recent application (e.g., the first application or the DTM) 910. The recent application 910 may identify that the folding angle corresponds to the second angle range (e.g., 120 degrees to 160 degrees) (operation 911), and may perform an operation of changing the execution screen (operation 913). The second angle range serving as a reference for starting the change of the execution screen may be a range preconfigured in the electronic device 101 and may be adjustable by the user or the electronic device 101. As illustrated in 803 of FIG. 8, the changed execution screen may include, in the first area 831, at least one second object (e.g., the icons 851, 852, and 853 and thumbnails 854, 855, and 856) different from the at least one previously displayed first object (e.g., the icons 821, 822, and 823 and the thumbnails 824, 825, and 826) previously displayed first object (e.g., icons 821, 822, 823 and thumbnails 824, 825, 826). The wording "different from" may refer to the visual attributes (e.g., at least one of shape, size, or color) of the first object and the second object being different from each other, but the contents (e.g., the images of icons or the images of thumbnails), which are included in the first object and the second object, respectively, correspond to (or are equal to) each other. In an execution screen change, the first area 831 in which the at least one second object is displayed may be an area corresponding to a hinge to which the housings are connected or an area in which a flexible display is bent as the folding angle is changed. Hereinafter, the at least one second object is further described.

First, the visual attributes of the at least one second object (e.g., the icons 851, 852, and 853 and thumbnails 854, 855, and 856) are further described.

According to various embodiments, the at least one second object (e.g., the icons 851, 852, and 853 and thumbnails 854, 855, and 856) displayed in the first area 831 may have a visual attribute different from the visual attribute of the at least one first object (e.g., 821, 822, 823, 824, 825, and 826) displayed when the angle corresponds to the first angle range. The visual attribute may include at least one of a shape or a size. For example, as illustrated in FIG. 10, the size of the second object (e.g., 1002 or 1003) (e.g., a thumbnail) may be smaller than the size of the first object 1001. For example, as illustrated in 1002 of FIG. 10, the electronic device 101 may reduce (e.g., re-sizes) the size of the first object (e.g., a thumbnail) to correspond to the size of a portion of the first area 831), and may display the second object (e.g., a thumbnail) in the first area 831. In addition, for example, as illustrated in 1003 of FIG. 10, the electronic device 101 may select (e.g., crop) only a partial area of the first object (e.g., a thumbnail) by a size corresponding to the size of a portion of the first area 831, and may display the cropped area as the second object (e.g., a thumbnail). The electronic device 101 may select (e.g., crop) a main portion in which a specific content in the first object such that an application may be easily identified by the user based on the second object. The specific content may be a content including an application name of a background application or a representative color.

According to various embodiments, one or more second objects (e.g., icons 851, 852, and 853 and thumbnails 854, 855, and 856) displayed in the first area 831 may have different visual attributes, respectively. For example, the size of one object (e.g., an icon or a thumbnail) among the second objects displayed in the first area 831 may be different from the size of another object (e.g., an icon or a thumbnail). For example, the electronic device 101 may configure the sizes of the second objects to be different from each other based on the positions of the second objects. The electronic device 101 may display the second objects such that the sizes of the second objects are to be gradually smaller from the uppermost stage (e.g., sequentially from the uppermost column) downward. In addition, the electronic device 101 may display the second objects such that the sizes of the second objects are gradually smaller from the central area toward the peripheral area. As another example, the electronic device 101 may configure the sizes of the objects to be larger in the order of priorities of the applications corresponding to the second objects from the highest priority. For example, the order of priorities may be configured such that an application which has been most recently controlled by a user interaction (or the highest activity stack) and is being executed in a background mode has the highest priority. For example, the order of priorities may be configured such that the application most closely related to (e.g., most frequently used together with) an application that was being executed in the foreground mode prior to the recent application has the highest priority.

Hereinafter, the display positions of the at least one second object (e.g., the icons 851, 852, and 853 and thumbnails 854, 855, and 856) are further described.

According to various embodiments, the electronic device 101 may display the execution screen of a first application (e.g., a recent application) in which the at least one second object (e.g., the icons 851, 852, and 853 and the thumbnails 854, 855, and 856) are arranged in columns and rows in the first area 831 based on the angle between the housings 835 and 836 corresponding to the second angle range. For example, the electronic device 101 may arrange different types of objects (e.g., icons and thumbnails) related to applications in sub-areas 1131 and 1132 included in the first area 831. For example, as illustrated in 803 in FIG. 8, the first area 831 may include a first sub-area 1131 associated with the first housing 835 and a second sub-area 1132 associated with the second housing 836. The first sub-area 1131 may be a display area corresponding to the first housing 835 in the first area 831, and the second sub-area 1132 may be a display area corresponding to the second housing 836 in the first area 831. The execution screen may include one icon and one thumbnail corresponding to one application among a plurality of applications executed in the background mode in a specific row of the first area 831, and the one icon may be located in a column corresponding to the first sub-area 1131, and the one thumbnail may be disposed in a column corresponding to the second sub-area 1132. Icons and thumbnails for the remaining applications may also be arranged in rows and columns of the first area 831 as described above.

According to various embodiments, the electronic device 101 may arrange the second objects (e.g., the icons 851, 852, and 853 and the thumbnails 854, 855, and 856) displayed in the first area 831 based on information about applications executed in the background mode corresponding to the second objects (e.g., the icons 851, 852, and 853 and thumbnails 854, 855, and 856). For example, the electronic device 101 may determine a display order of the objects based on information on the order of priorities of applications executed in the background mode, and may select the second objects (e.g., the icons 851, 852, and 853 and the thumbnails 854, 855, and 856) in the determined order of priorities. The electronic device 101 may arrange objects (e.g., icons and/or thumbnails) corresponding to applications in the order of priorities from the highest priority, downward from the uppermost position (e.g., sequentially from the uppermost column). Alternatively or additionally, the electronic device 101 may arrange the second objects from the center area (or the middle of the display) of the first area 831 to the peripheral area of the first area 831 in the order of priorities from the highest priority. In addition, the electronic device 101 may display a predetermined number of second objects in the first area 831, and may display the remaining objects when the first area 831 is scrolled. In this case, the electronic device 101 may select the predetermined number of second objects in the order of priorities from the highest priority and display the second objects in the first area 831.

Hereinafter, examples of the operation of changing the execution screen based on a fact that the electronic device 101 corresponds to a second angle range are further described.

For example, based on the folding angle corresponding to the second angle range (e.g., the folding angle being included in the second angle range), the electronic device 101 may display the execution screen of a first application of at least one second object (e.g., the icons 851, 852, and 853 and thumbnails 854, 855, and 856) in a layout (e.g., the first area 831) stored in advance to correspond to the second angle range. For example, the electronic device 101 may store a layout of execution screens of the first application configured to be displayed corresponding to a plurality of predetermined angle ranges, respectively. As an example, the electronic device 101 stores the execution screens of the layout illustrated in 802 of FIG. 8 in response to the folding angle being in the first angle range (e.g., 180 degrees), and may store the execution screens of a layout in which a plurality of objects are arranged in the first area 831 in response to the folding angle being in the second angle range (e.g., 120 degrees to 160 degrees). The electronic device 101 may identify an execution screen of the layout corresponding to the second angle range among execution screens of a plurality of layouts based on the folding angle corresponding to the second angle range, and may display the identified execution screen. The electronic device 101 may switch the execution screen corresponding to the first angle range to an execution screen corresponding to the identified second angle range, and display the execution screen corresponding to the identified second angle range. In this case, the electronic device 101 may provide a dynamic switching effect while switching the execution screen to another execution screen and displaying the another screen. For example, as illustrated in 1101 of FIG. 11A, the folding angle may be changed while the electronic device 101 displays the execution screen of the layout corresponding to the first angle range and may reach the second angle range. After the folding angle reaches the second angle range, the electronic device 101 may display a blurred screen (or a screen configured to be displayed by a specific color, or a screen including an animation effect) as illustrated in 1102 and 1103 of FIG. 11A, and thereafter, the electronic device 101 may display an execution screen corresponding to the second angle range in which icons 851, 852, and 853 are arranged in the first sub-area 1131 and the thumbnails 854, 855 and 856 are arranged in the second sub-area 1132.

In addition, for example, based on the folding angle corresponding to the second angle range, the electronic device 101 may dynamically transform and display a plurality of objects included in the execution screen of the first application. For example, the electronic device 101 may adjust and display the shapes and/or positions of the plurality of objects. For example, the electronic device 101 may adjust the sizes of (e.g., resize) the icons 821, 822, and 823 as illustrated in 1113 of FIG. 11B and may arrange the icons 851, 852, and 853 having the adjusted sizes in the first sub-area 1131. In addition, the electronic device 101 may adjust the sizes of (e.g., resize) the thumbnails 824, 825, and 826 and may display the thumbnails 854, 855, and 856 having the adjusted size in the second sub-area 1132. Without being limited thereto, the transformed icons 851, 852, and 853 may be arranged in the second sub-area 1132, and the transformed thumbnails 854, 855, and 856 may be displayed in the first sub-area 1131. As illustrated in 1112 and 1113 of FIG. 11B, the electronic device 101 may gradually transform each object (e.g., changing the position and size of each object), and may display each resultant object in the first area 831.

Although it has been described above that both the thumbnails and the icons are displayed in the first area 831, the disclosure is not limited to thereto, and the electronic device 101 may display one of thumbnails or icons in the first area 831 based on the angle corresponding to the second angle range.

According to various embodiments, the electronic device 101 may receive a selection of at least one of at least one second object in operation 704. For example, the electronic device 101 may receive a selection of an object (an icon or a thumbnail) 834 disposed in a specific row among the objects (e.g., the icons 851, 852, and 853 and thumbnails 854, 855, and 856) displayed in the first area 831, as illustrated in 803 of FIG. 8. For example, the electronic device 101 may receive a selection of a specific object through a plurality of touch areas for selecting a plurality of objects configured in the remaining second area different from the first area 831. An operation of configuring a plurality of touch areas for selection of objects of the electronic device 101 in the second area and an operation of receiving a selection of an object through a touch area are described with reference to FIGS. 16 to 18. The electronic device 101 may identify and/or select, based on the selection of an object, an application (e.g., a second application to be described later) executed in a background mode corresponding to the object. For example, as illustrated in FIG. 9, the recent application 910 may identify that an object is selected (operation 915), and may transmit information indicating an application corresponding to the selected object to the processor 120.

According to various embodiments, when the folding angle is changed in operation 705, the electronic device 101 may display the execution screen of the second application while executing the second application corresponding to the first object selected in operation 706 in the foreground mode. As the relative positions of the housings (e.g., the first housing 835 and the second housing 836) of the electronic device 101 are changed according to the pivoting of the hinge (or the housings are rotated about the hinge), for example, as illustrated in 804 of FIG. 8, the angle (or the folding angle) between the housings (e.g., first housing 835 and second housing 836) may be changed from a second angle (e.g., 130 degrees) to a first angle (e.g., 180 degrees). As illustrated in FIG. 9, the processor 120 (e.g., the state control manager 635 of the window manager 636) of the electronic device 101 may acquire values detected by the sensors as the angle between the housings is changed, and may identify the folding state based on the values. The processor (e.g., the state control manager 635 of the window manager 636) may transmit information on the folding angle to a second application 920 selected based on the folding angle corresponding to (e.g., is included in or reaches) the first angle range. The second application 920 may identify that the second application 920 is selected (operation 921), identifies that the folding angle corresponds to a predetermined first angle range (e.g., 180 degrees) (operation 923), and may switch the background mode to the foreground mode (operation 925). Based on the switching of the second application 920 to the foreground mode, the electronic device 101 may display the execution screen 841 of the second application 920, which is switched to the foreground module, on the display, as illustrated in 804 of FIG. 8.

A user interface (UI) in which objects (e.g., icons 851, 852, and 853 and thumbnails 854, 855, and 856) are displayed near the folding area is merely exemplary, and a person ordinarily skilled in the art will appreciate that there is no limit to the positions at which the items 851, 852, and 853 and the thumbnails 854, 855, and 856 are displayed and/or the positions of a corresponding touch area. For example, the objects (e.g., the icons 851, 852, and 853 and the thumbnails 854, 855, and 856) may be displayed in an area adjacent to side edges of the display module, and a touch area may be configured in the central area of the display module.

Hereinafter, another example of the operation of the electronic device 101 according to various embodiments is described with reference to FIGS. 12 through 15.

According to various embodiments, in the case of displaying a plurality of objects (e.g., the icons 1311 and the thumbnails 1312 of FIG. 13) in the first area 831 based on the folding angle being in the second angle range, the electronic device 101 may configure a plurality of touch areas for selecting the plurality of objects (e.g., the icons 1311 and the thumbnails 1312) in a second area 1300 different from the first area 831. The electronic device 101 may configure the plurality of touch areas at positions that can be easily touched by the user while the user holds the electronic device 101, thereby improving the user's convenience of using the recent application.

Figure 12:
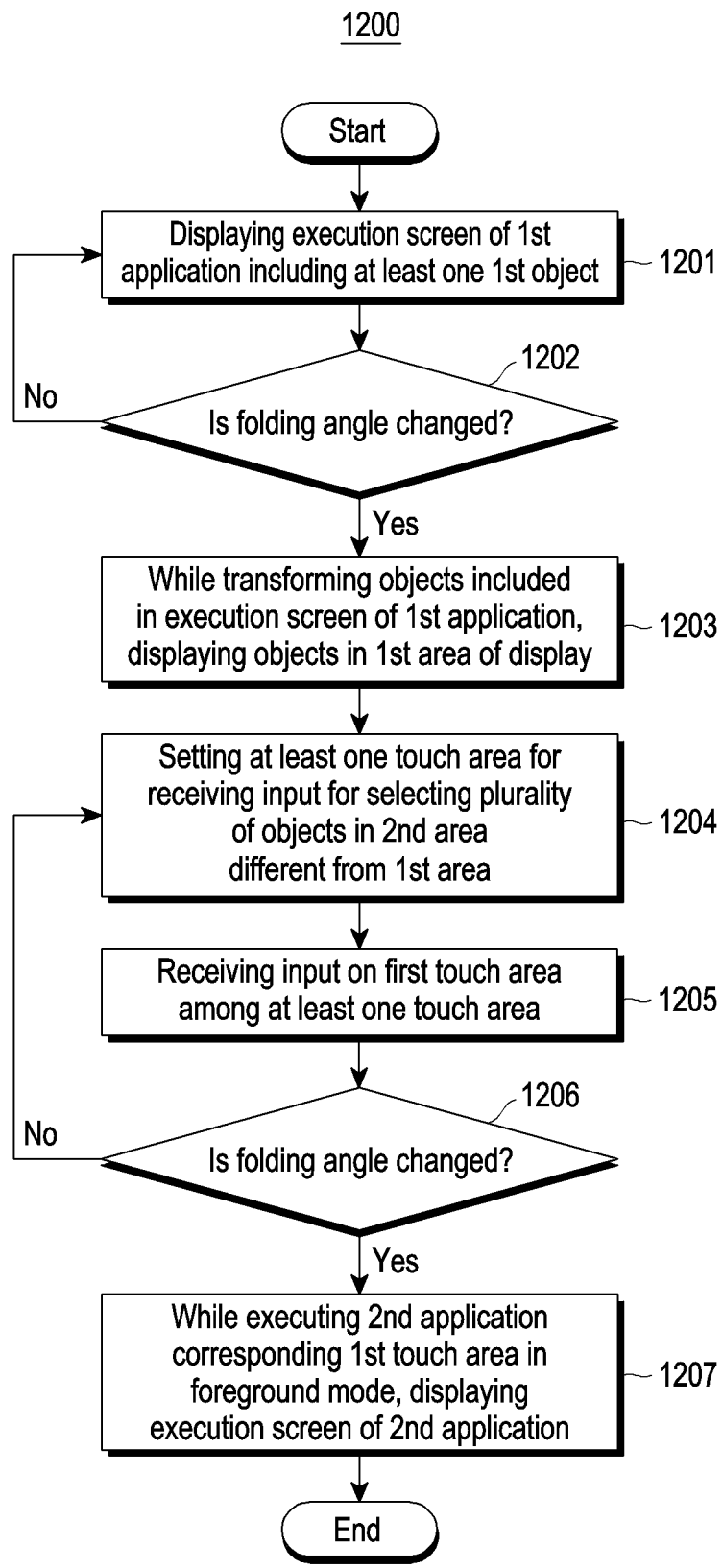
FIG. 12 is a flowchart for describing another example of operations of an electronic device, according to various embodiments.

FIG. 12 is a flowchart 1200 for describing other examples of operations of the electronic device 101 according to various embodiments. According to various embodiments, the operations illustrated in FIG. 12 are not limited to the illustrated order, and may be performed in various orders. In addition, according to various embodiments, a greater or smaller number of operations compared to the operations illustrated in FIG. 12 may be performed. Hereinafter, the operations of FIG. 12 are described with reference to FIGS. 13 to 15.

Figure 13:
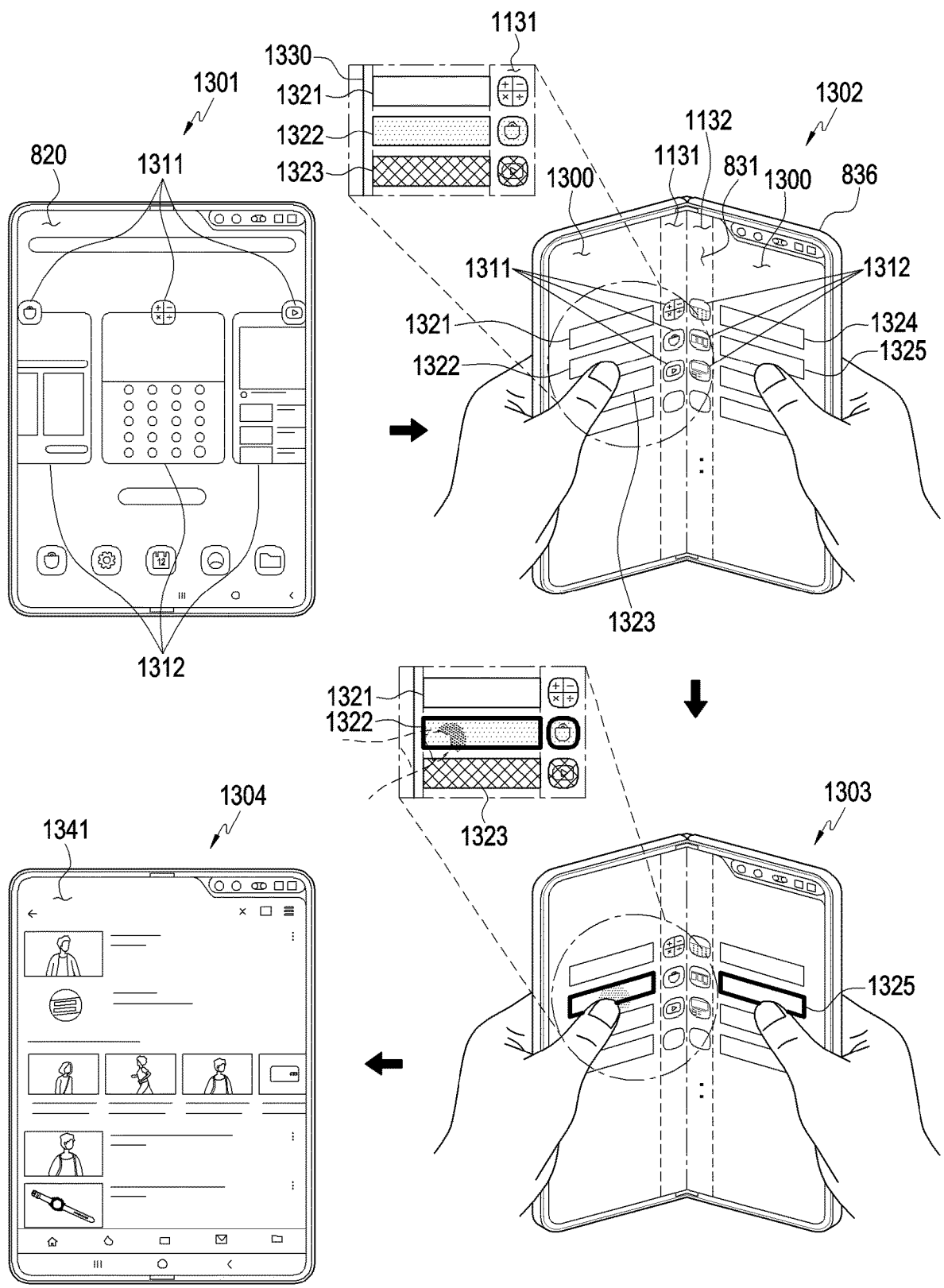
FIG. 13 is a view for describing an example of an operation of implementing a plurality of touch areas in a second area of an electronic device, according to various embodiments.
Figure 14:
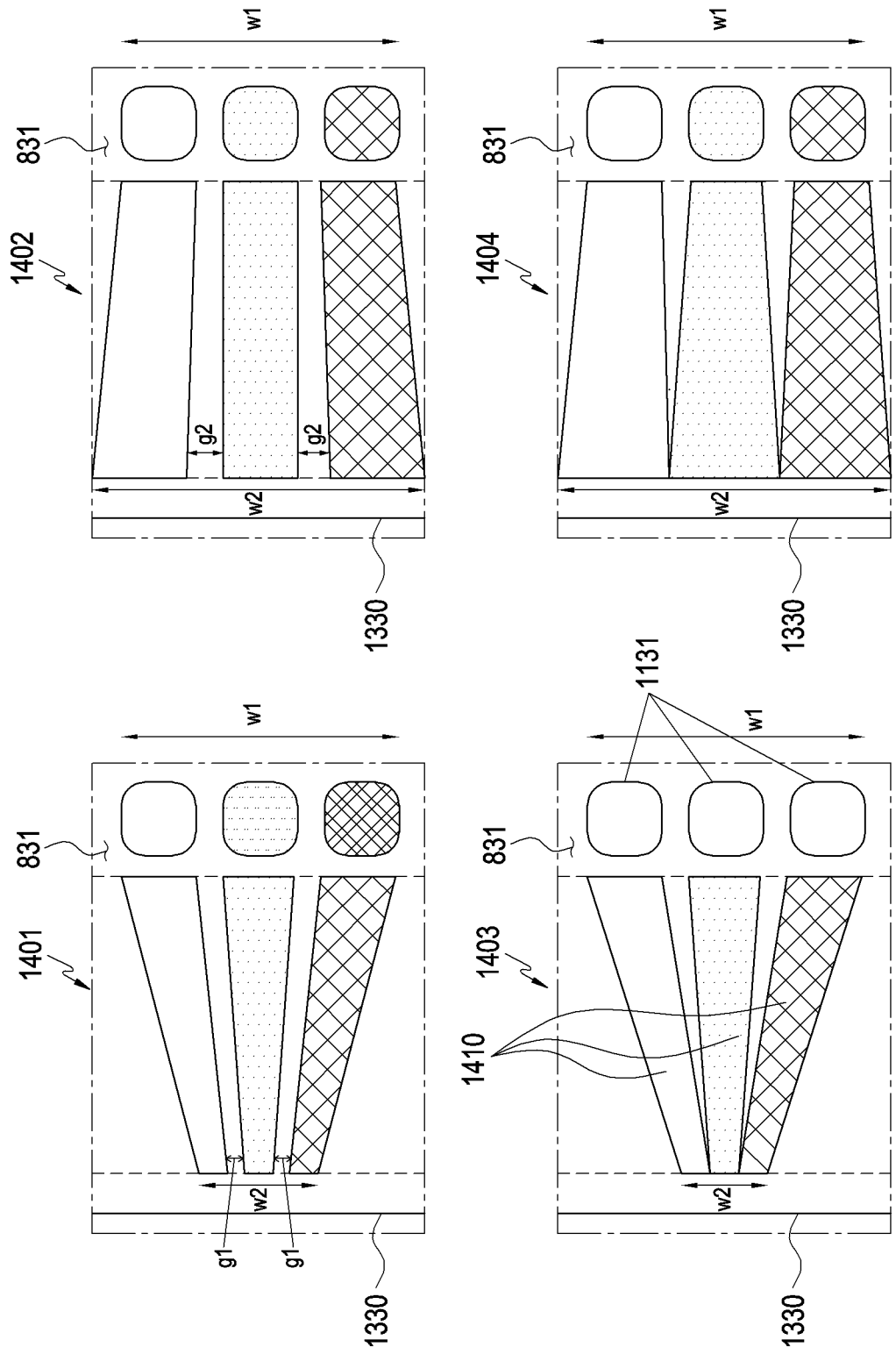
FIG. 14 is a view for describing examples of shapes of touch areas, according to various embodiments.
Figure 15:
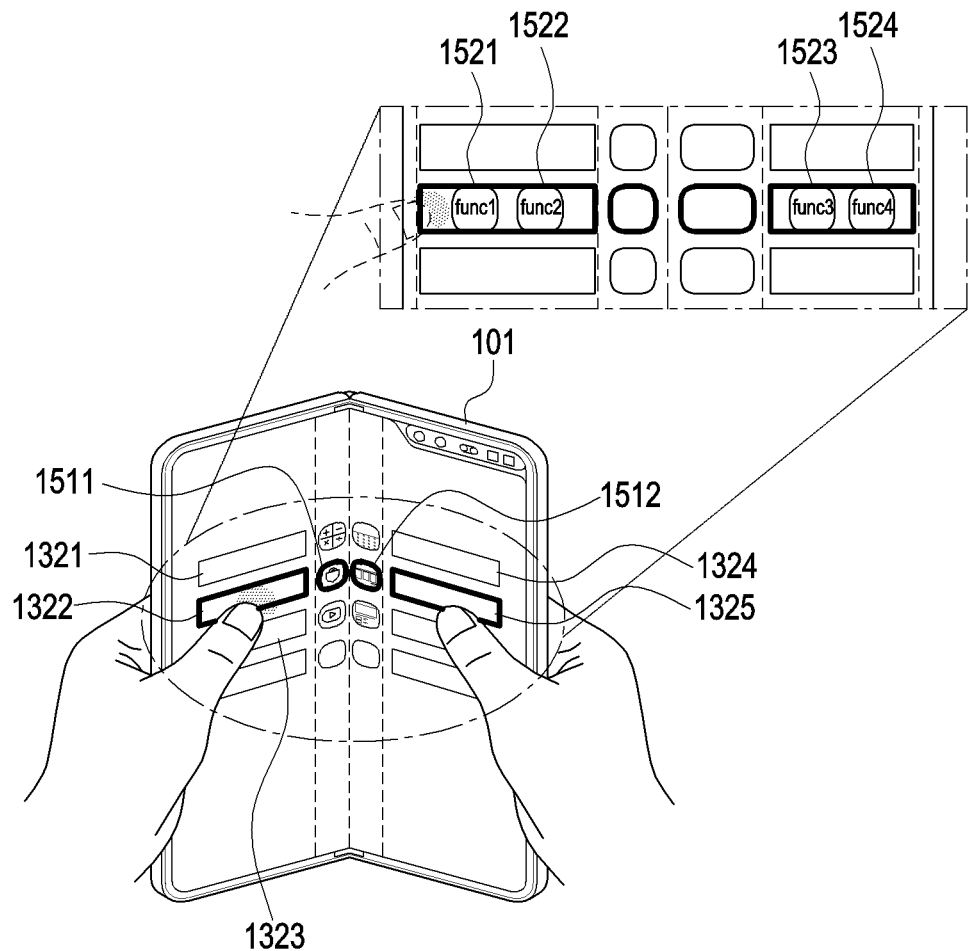
FIG. 15 is a view for describing an example of an operation of providing, when an object of an electronic device is elected, information associated with an application corresponding to the selected object, according to various embodiments.

FIG. 13 is a view for describing an example of an operation of implementing a plurality of touch areas in a second area 1300 of an electronic device 101 according to various embodiments. FIG. 14 is a view for describing examples of shapes of touch areas according to various embodiments. FIG. 15 is a view for describing an example of an operation of providing, when an object of an electronic device 101 according to various embodiments is selected, information associated with an application corresponding to the selected object.

According to various embodiments, the electronic device 101 may display the execution screen of a first application including at least one first object in operation 1201. For example, based on the angle (or the folding angle) between the housings (e.g., 835 and 836) corresponding to a first angle range (e.g., 180 degrees) (e.g., in an open state) as illustrated in 1301 of FIG. 13, the electronic device may display the execution screen 820 of the recent application including at least one first object (e.g., the icons 1311 and the thumbnails 1312). Since the operation of displaying the execution screen 820 of the recent application in the electronic device 101 may be performed like the above-described operation 701 of the electronic device 101, a redundant description is omitted.

According to various embodiments, when the change of the folding angle is identified in operation 1202, the electronic device 101 may display, in operation 1203, at least one second object different from the at least one first object in the first area 831 of the display. For example, based on the angle (or the folding angle) between the housings (e.g., 835 and 836) corresponding to the second angle range (e.g., 120 degrees to 160 degrees) as illustrated in 1302 of FIG. 13, the electronic device 101 may display, in the first area 831, the execution screen of the recent application in which a plurality of objects (e.g., the icons 1311 and the thumbnails 1312) are arranged. The plurality of objects (e.g., at least one second object) displayed in the first area 831 have visual attributes (e.g., size) different from those of the plurality of previously displayed objects (e.g., at least one first object), but are described with reference to the same reference numerals 1311 and 1312 for convenience of description. Since operations 1202 and 1203 of the electronic device 101 may be performed in the same manner as operations 702 and 703 of the electronic device 101 described above, a redundant description thereof is omitted.

According to various embodiments, in operation 1204, the electronic device 101 may configure at least one touch area for receiving an input for selecting the at least one second object (e.g., the icons 1311 and the thumbnails 1312) in second areas 1300 different from the first area 831. As illustrated in 1302 of FIG. 13, the electronic device 101 may configure touch areas (e.g., 1321, 1322, 1323, 1321, 1322, 1323, 1324, and 1325), which correspond to objects, respectively, in the second area 1300, which is a remaining area other than the first area 831. The first area 831 may be disposed between the second areas 1300. For example, a plurality of objects (e.g., the icons 1311 and the thumbnails 1312) may be disposed between a plurality of touch areas for selecting the plurality of objects (e.g., the icons 1311 and thumbnails 1312). Hereinafter, positions at which the touch areas (e.g., 1321, 1322, 1323, 1324, and 1325) are configured and visual attributes (e.g., at least one of shape, size, and color) of the touch areas are further described.

Hereinafter, examples of positions at which the touch areas (e.g., 1321, 1322, 1323, 1324, and 1325) are configured are described.

For example, the electronic device 101 may configure a touch area at a position associated with each of the objects in the second area 1300. As an example, referring to 1302 of FIG. 13, the electronic device 101 may configure a first touch area 1321 at a position adjacent to the first icon in a lateral direction of the housing (e.g., leftward) from the first icon, which is disposed in a first column of the first sub-area 1131 of the second area 1300, and may configure a second touch area 1324 at a position adjacent to the second icon in a lateral direction of the second housing 836 (e.g., rightward) from the first thumbnail disposed in a first column of the second sub area 1132. The above-mentioned adjacent positions may include a position that is spaced apart from the objects (e.g., the icons and the thumbnails) by a predetermined distance, and a position that is in contact with the objects (or a position that is not spaced apart from the objects).

In addition, for example, the electronic device 101 may configure the touch areas (e.g., 1321, 1322, 1323, 1324, and 1325) such that the touch areas (e.g., 1321, 1322, 1323, 1324, and 1325) are spaced apart from side surface 1330 of the housings (or the side surface of the display) by a predetermined distance, as illustrated in 1302 of FIG. 13. For example, the touch area corresponding to the first icon may be spaced apart from the side surface of the first housing 835 by a predetermined distance, and the touch area corresponding to the first thumbnail may be spaced apart from the side surface 1330 of the second housing 836 by the predetermined distance. By configuring the touch areas at positions spaced apart by the predetermined distance, when the user holds the electronic device 101, it may be possible to prevent an unintended input from being received on the touch areas by the user's hand which holds the electronic device 101. The predetermined distance from the side surface 1330 of the housings may be configured based on the angle (or the folding angle) between the housings (e.g., 835 and 836). For example, in some embodiments of the electronic device 101, the smaller the folding angle, the larger the predetermined distance may be configured. In the electronic device 101, by adjusting the predetermined distance for each folding angle, it may be possible to effectively prevent, for each folding angle, a touch input from being unintentionally made when the user holds the electronic device 101. Alternatively or additionally, without being limited thereto, the disclosure may be implemented such that the predetermined distance is not present.

For example, as illustrated in 1302 of FIG. 13, in the electronic device 101, the touch areas (e.g., 1321, 1322, 1323, 1324, and 1325) may be configured such that respective touch areas (e.g., 1321, 1322, 1323, 1324, and 1325) are spaced apart from each other by a predetermined distance. In the electronic device 101, by configuring the touch areas (e.g., 1321, 1322, 1323, 1324, and 1325) to be spaced apart from each other, it may be possible to prevent a touch area from being erroneously selected by the user. The distance between respective touch areas (e.g., 1321, 1322, 1323, 1324, and 1325) may be configured based on the display positions and/or the order of priorities of the objects. For example, as the display position of an object is closer to at the uppermost end (e.g., at the uppermost row) or the center area, a distance by which another touch area is spaced apart from the touch area corresponding to the object may increase. For example, as the priority of an object is higher, a distance by which another touch area is separated from the touch area corresponding to the object may be increased. By adjusting the spacing distance between the touch areas (e.g., 1321, 1322, 1323, 1324, and 1325) in the electronic device 101, it may be possible to allow the user to accurately select a touch area corresponding to a desired object. In some embodiments of the electronic device 101, as the number of objects increases, the spacing distance between the touch areas (e.g., 1321, 1322, 1323, 1324, and 1325) may be configured to be narrower (e.g., reduced).

Hereinafter, visual attributes (e.g., at least one of size, shape, or color) of the touch areas (e.g., 1321, 1322, 1323, 1324, and 1325) are described. According to various embodiments, the touch areas (e.g., 1321, 1322, 1323, 1324, and 1325) configured in the electronic device 101 may have various types of visual attributes. The visual attributes may include at least one of size, shape, and color. For example, as illustrated in 1302 of FIG. 13, in the electronic device 101, the touch areas may be configured in a rectangular shape or a band shape. Without being limited to those illustrated in the figure, in the electronic device 101, the touch areas may be configured in various types of shapes, such as a circle, an ellipse, and a triangle that satisfy the above-described positions (e.g., a position adjacent to an object and/or a position spaced apart from the side of the housings). Hereinafter, various examples of shapes of the touch areas (e.g., 1321, 1322, 1323, 1324, and 1325) are further described.

According to various embodiments, in the electronic device 101, a width w1 of a row in which objects are arranged and a width w2 of a row of the touch areas 1410 corresponding to the objects may be configured to be different from each other. For example, in the electronic device 101, as illustrated in 1401 of FIG. 14, the width w2 of the row of the touch areas 1410 may be configured to be narrower than the width w1 of the row of the objects (e.g., the icons 1311). In the electronic device 101, the width of each of the touch areas 1410 may be configured to gradually decrease in a direction from the first area 831 toward the side surface 1330 of the housing. In addition, for example, in the electronic device 101, as illustrated in 1402 of FIG. 14, the width w2 of the row of the touch areas 1410 may be configured to be wider than the width w1 of the row of the objects (e.g., the icons 1311). In the electronic device 101, the width of each of the touch areas 1410 may be configured to gradually increase in a direction from the first area 831 toward the side surface 1330 of the housing. As illustrated in 1401 and 1402 of FIG. 14, respective touch areas 1410 may be implemented to be spaced apart (g1, g2) from each other. Alternatively or additionally, as illustrated in 1403 and 1404 of FIG. 14, respective touch areas 1410 may be implemented to be in contact with each other at terminal ends (e.g., portions adjacent to the side surface 1330 of the housing).

According to various embodiments, in the electronic device 101, it may be possible to configure visual attributes of the touch areas (e.g., 1321, 1322, 1323, 1324, and 1325) based on information corresponding to the objects (e.g., 1311 and 1312). For example, as illustrated in 1302 of FIG. 13, in the electronic device 101, the colors of the touch areas (e.g., 1321, 1322, 1323, 1324, and 1325) corresponding to the objects may be configured based on the colors associated with the objects. As an example, the electronic device 101 may identify information on the color of at least one of an icon or a thumbnail, and may display the color of the touch areas (e.g., 1321, 1322, 1323, 1324, and 1325) corresponding to the icon and the thumbnail) with the identified color. The information on the color may include information on the most frequently used color (or representative color) among the colors included in the objects (e.g., the icons and/or the thumbnails), and information on the color corresponding to an average value of the values of a plurality of colors (e.g., the values of RGB and HSV color models) included in the objects (e.g., the icons and/or thumbnails). As another example, the electronic device 101 may identify information on the color of at least one of the icons or the thumbnails, and may display a pattern of a specific pattern (e.g., dots) based on the color in the touch areas (e.g., 1321, 1322, 1323, 1324, and 1325). As the colors of the touch areas are configured by the colors corresponding to the objects, the touch areas (e.g., 1321, 1322, 1323, 1324, and 1325) may be visually distinguished from each other, and thus the touch areas (e.g., 1321, 1322, 1323, 1324, and 1325) may be improved in discrimination.

According to various embodiments, in operation 1205, the electronic device 101 may receive an input on a first touch area among one or more touch areas (e.g., 1321, 1322, 1323, 1324, and 1325). When a user input is received on the touch area, the electronic device 101 may select an object corresponding to the touch area. For example, as illustrated in 1303 of FIG. 13, when a user input is received on the first touch area (e.g., 1322), the electronic device 101 may select the first object (e.g., the first icon and/or the first thumbnail). The electronic device 101 may identify an application executed in a background mode corresponding to the selected object (e.g., the first icon and/or the first thumbnail). In addition, when a touch area associated with the touch area touched by the user is touched again, the electronic device 101 may deselect the object. For example, when the first touch area is touched and then touched again, the electronic device 101 may deselect the first object, or when the second touch area (e.g., 1322) is touched after the first touch area (e.g., 1322) is touched, the electronic device 101 may deselect the first object. The electronic device 101 may perform multi-touch for selecting a plurality of objects (e.g., the icons 1311 and the thumbnails 1312) through a plurality of touch areas (e.g., 1321, 1322, 1323, 1324, and 1325), which are described with reference to FIGS. 16 to 18.

According to various embodiments, the electronic device 101 may ignore an input unintended by a user on the touch areas. For example, the electronic device 101 may determine whether a user input is a valid input based on the attribute of the user input received on the first area 831 and/or the second area 1300. The attribute of the input may include at least one of an area of the input, a sensitivity of the input, and a holding time of the input. For example, when the area of the user input is larger than a preconfigured area, the electronic device 101 may determine the user input as an invalid input. For example, the electronic device 101 may receive an input by the user's palm on the first area 831 and/or the second area 1300. The electronic device 101 may identify the input by the palm as being larger than a preconfigured area, and ignore the input by the palm as an invalid input. The preconfigured area serving as a reference for determining whether or not the user inputs may be a preconfigured value in the electronic device 101. In addition, for example, when the sensitivity of a user input is less than a preconfigured value, the electronic device 101 may determine the user input as an invalid input. For example, when the holding time of a user input is less than a preconfigured value, the electronic device 101 may determine the user input as an invalid input.

According to various embodiments, the electronic device 101 may display, in the second area 1300, information related to an application corresponding to a touched touch area. For example, as illustrated in FIG. 15, the electronic device 101 may display information (e.g., 1521, 1522, 1523, and 154) associated with the applications corresponding to the objects (e.g., an icon 1511 and/or a thumbnail 1512) selected from the touched touch areas (e.g., 1321, 1322, 1323, and 1524). As illustrated in FIG. 15, information related to an application may be displayed in the selected touch area (e.g., 1322), or may be displayed in an area other than the selected touch area. The information related to the application may include various kinds of information that may be acquired from an application, which is being executed in the background, and icons for executing functions, which are capable of being provided by the application. As an example, when the application is a message application, icons for providing a function of calling a recently received message and a function of calling a screen for writing a message may be displayed.

According to various embodiments, when the folding angle is identified as being changed in operation 1406, in operation 1407, while executing a second application corresponding to the first touch area in a foreground mode, the electronic device 101 may display the execution screen of the second application. For example, based on the angle (or the folding angle) between the housings (e.g., 835, 836) corresponding to (e.g., is included in or reaches) a first angle range (e.g., 180 degrees) as illustrated in 1304 of FIG. 13, the electronic device 101 may execute the application, which corresponds to the selected object and is executed in the background, in a foreground mode. The electronic device 101 may display the execution screen 1341 of the application executed in the foreground mode. Since operations 1206 and 1207 of the electronic device 101 may be performed in the same manner as operations 705 and 706 of the electronic device 101 described above, a redundant description thereof is omitted.

According to various embodiments, based on a user input received on a plurality of touch areas for selecting a plurality of objects, the electronic device 101 may select two or more objects and may identify two or more applications corresponding to the selected two or more objects.

Figure 16:
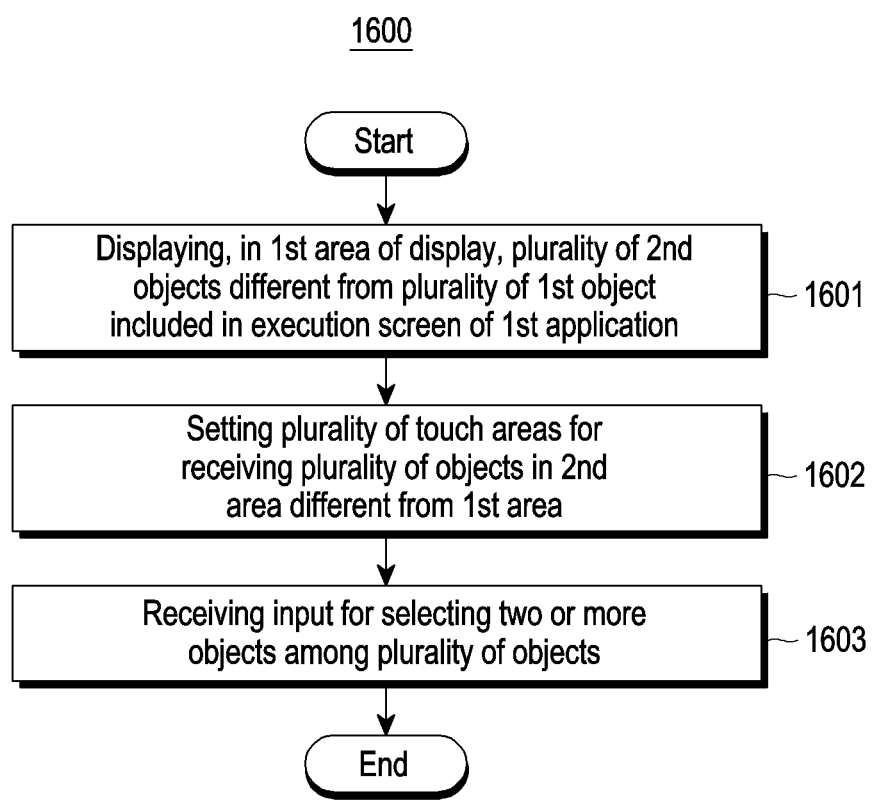
FIG. 16 is a flowchart for describing other examples of operations of an electronic device, according to various embodiments.

FIG. 16 is a flowchart 1600 for describing other examples of operations of the electronic device 101 according to various embodiments. According to various embodiments, the operations illustrated in FIG. 16 are not limited to the illustrated order, and may be performed in various orders. In addition, according to various embodiments, a greater or smaller number of operations compared to the operations illustrated in FIG. 16 may be performed. Hereinafter, FIG. 16 is described with reference to FIGS. 17 and 18.

Figure 17:
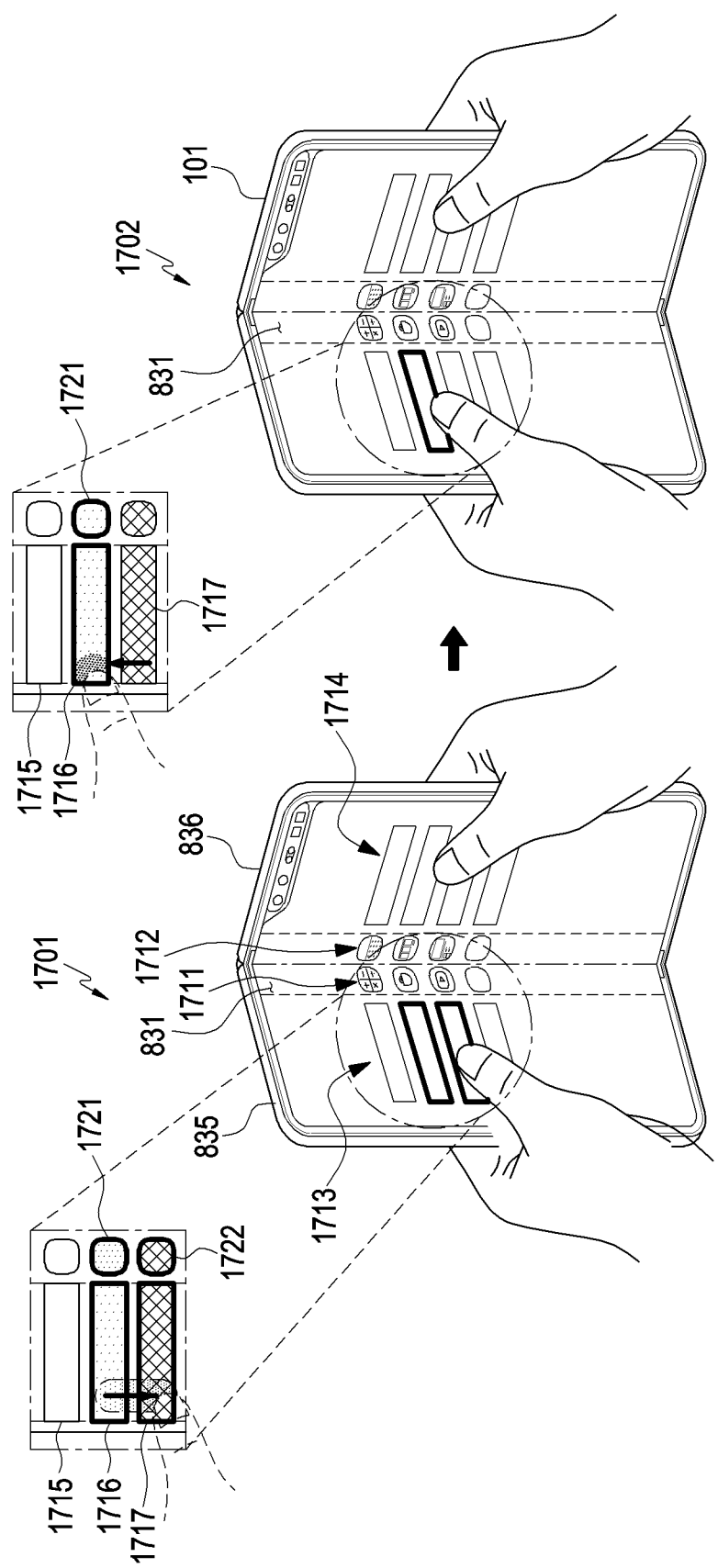
FIG. 17 is a view for describing an example of an operation of selecting a plurality of touch areas of an electronic device based on a user input, according to various embodiments.

FIG. 17 is a view for describing an example of an operation of selecting a plurality of touch areas based on a user input of the electronic device 101 according to various embodiments. FIG. 18 is a view for describing another example of an operation of selecting a plurality of touch areas based on a user input of the electronic device 101 according to various embodiments.

According to various embodiments, in operation 1601, the electronic device 101 may display, in a first area 831 of the display, a plurality of second objects different from a plurality of first objects included in the execution screen of a first application, and in operation 1602, the electronic device 101 may configure, in a second area 1300 different from the first area 831, a plurality of touch areas for receiving an input for selecting the plurality of second objects. For example, as illustrated in 1701 of FIG. 17 and 1801 of FIG. 18, based on the angle (or the folding angle) between the housings (e.g., 835 and 836) being changed from the first angle range to the second angle range, the electronic device 101 may display, in the first area 831, a plurality of objects (e.g., icons 1711 and thumbnails 1712), which are different from a plurality of objects of a recent application in visual attributes (e.g., size). The electronic device 101 may configure a plurality of touch areas (e.g., 1713, 1714, 1811, 1821) for selecting a plurality of objects (e.g., icons 1711 and thumbnails 1712) in the second area 1300 other than the first area 831. Since operations 1601 and 1602 of the electronic device 101 may be performed in the same manner as operations 1201 and 1204 of the electronic device 101 described above, a redundant description thereof is omitted.

According to various embodiments, the electronic device 101 may receive an input for selecting two or more objects among the plurality of second objects in operation 1603. For example, the electronic device 101 may receive, on the first area 831, an input for selecting a first object (e.g., the first icon and/or the first thumbnail) corresponding to the first application and an input for selecting a second object (e.g., the second icon and/or the second thumbnail) corresponding to the second application. Hereinafter, examples of an operation of receiving an input for selecting two or more objects through a plurality of touch areas (e.g., 1713 and 1714) configured in the second area 1300 of the electronic device 101 are described.

According to various embodiments, the electronic device 101 may select two or more objects corresponding to touch areas selected according to a user input.

For example, as illustrated in FIG. 17, the electronic device 101 may select two or more objects based on a drag input received on a plurality of touch areas. As illustrated in 1701 of FIG. 17, when receiving a user input (e.g., a user's touch) on a first touch area (e.g., 1716) among a plurality of touch areas (e.g., 1715, 1716, and 1717), the electronic device 101 may select a first object (e.g., the first icon 1721) corresponding to the first touch area (e.g., 1716). The user input (e.g., a user's touch) received on the first touch area (e.g., 1716) may be moved in the state of being maintained. The electronic device 101 identifies touch areas (e.g., a second touch area (e.g., 1717) in 1701 of FIG. 17) that are touched according to the movement of the user input (e.g., the user's touch), and may select an object (e.g., a second icon 1722) corresponding to the identified touch area.

For example, as illustrated in 1801 of FIG. 18, the electronic device 101 may select two or more objects based on the selection of touch areas 1811 and 1821 displayed in the areas corresponding to different housings (e.g., 835 and 836). As illustrated in 1801 of FIG. 18, when receiving a user input received from a first touch area (e.g., 1812) configured in the area corresponding to the first housing 835 in the second area 1300, the electronic device 101 may select a first object (e.g., a first icon 1813 and/or a first thumbnail 1823) corresponding to the first touch area (e.g., 1812), and when receiving a user input from a second touch area (e.g., 1822) configured in the area corresponding to the second housing 836 in the second area 1300, the electronic device 101 may select a second object (e.g., a second icon 1814 and/or a second thumbnail 1823) corresponding to the second touch area (e.g., 1822). As described above, since the electronic device 101 performs an operation of selecting a plurality of objects through the touch areas configured in the different housings (e.g., 835 and 836), the electronic device 101 may allow the user to easily select a plurality of objects in the state of holding the electronic device 101.

According to various embodiments, the electronic device 101 may deselect at least some of objects selected according to a user input.

For example, the electronic device 101 may identify a touch area re-touched according to the movement of the user input (e.g., the user's touch), or may identify a touch area in which the movement of the touch in a different direction (e.g., in the opposite direction) and may deselect an object corresponding to the identified touch area. For example, as illustrated in 1702 of FIG. 17, when the second touch area (e.g., 1717) is touched due to the movement of the touch in a first direction (e.g., downward) and then the touch moves in a direction different from (e.g., opposite to) the first direction on the second touch area (e.g., 1717), the electronic device 101 may deselect an object (e.g., the second icon 1722) corresponding to the second touch area (e.g., 1717). In this case, when the touch area corresponding to the position at which the touch movement started is re-touched, the electronic device 101 may maintain the selection of the object corresponding to the touch area. For example, as illustrated in 1702 of FIG. 17, even when the first touch area (e.g., 1716) is re-touched due to the movement of the touch in the second direction, the electronic device 101 may maintain the selection of an object (e.g., the first icon 1721) corresponding to the first touch area (e.g., 1716).

For example, in response to the selection of touch areas configured in different areas (e.g., a portion of the second area 1300 corresponding to the first housing 835 and a portion of the second area 1300 corresponding to the second housing 836) corresponding to specific objects, the electronic device 101 may deselect the objects. For example, as illustrated in 1902 of FIG. 19 when a user touch is received on a third touch area (e.g., 1815) corresponding to the second object, the electronic device 101 may deselect the second object (e.g., a third thumbnail 1824 and/or the second thumbnail 1823) selected as the user touch is received on the second touch area (e.g., 1822).

According to various embodiments, the electronic device 101 may change visual attributes (e.g., at least one of shape, size, or color) in response to the change of the angle (or the folding angle) between the housings (e.g., 835 and 836).

Figure 19:
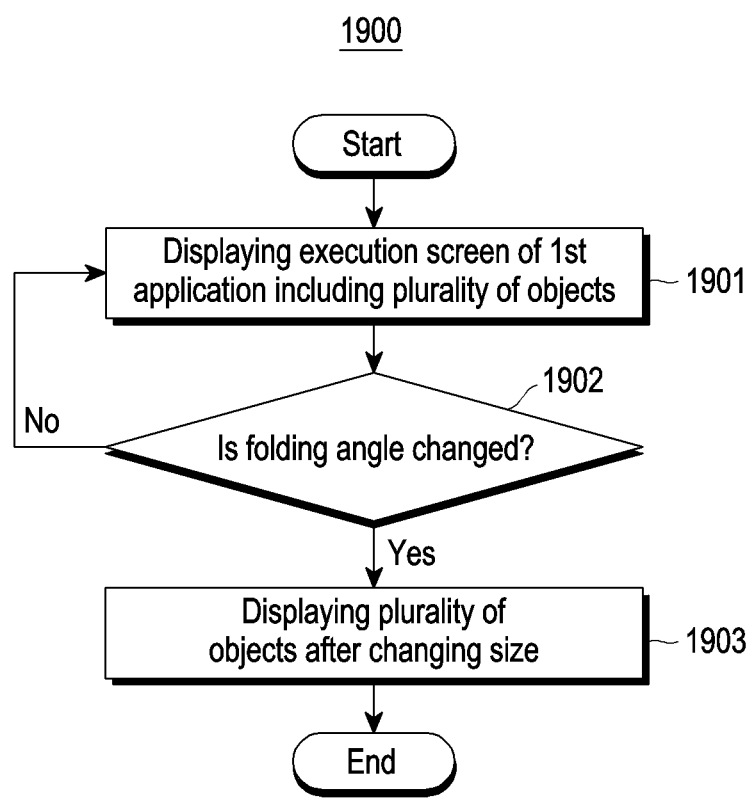
FIG. 19 is a flowchart for describing another example of operations of an electronic device, according to various embodiments.

FIG. 19 is a flowchart 1900 for describing other examples of operations of the electronic device 101 according to various embodiments. According to various embodiments, the operations illustrated in FIG. 19 are not limited to the illustrated order, and may be performed in various orders. In addition, according to various embodiments, a greater or smaller number of operations compared to the operations illustrated in FIG. 19 may be performed. Hereinafter, FIG. 19 is described with reference to FIGS. 20 and 21.

Figure 20:
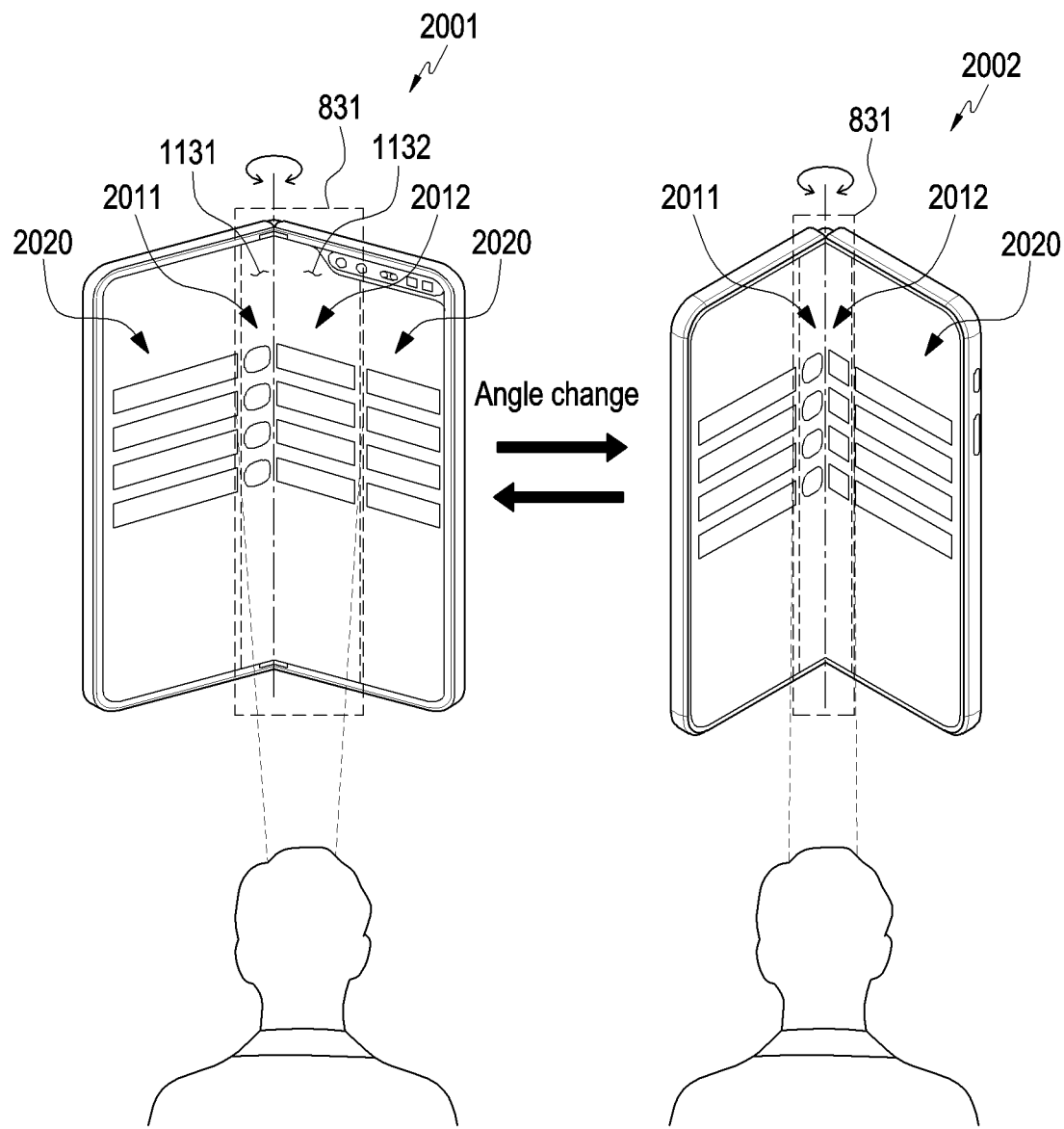
FIG. 20 is a view for describing an example of an operation of changing the size of an object in response to a change of the folding angle of an electronic device, according to various embodiments.
Figure 21:
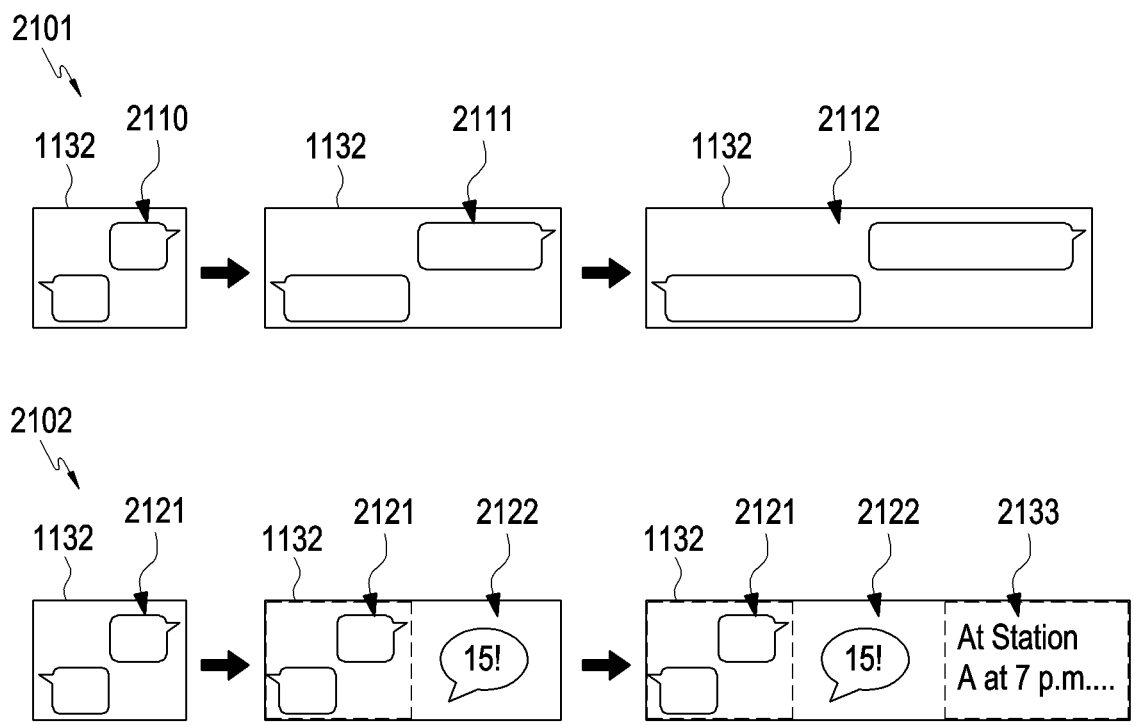
FIG. 21 is a view for describing an example of changing the size of an object, according to various embodiments.

FIG. 20 is a view for describing an example of an operation of changing the size of an object in response to a change of the folding angle of an electronic device 101 according to various embodiments. FIG. 21 is a view for describing an example of changing the size of an object according to various embodiments.

According to various embodiments, in operation 1901, the electronic device 101 may display, in the first area 831 of the display, a plurality of objects included in the execution screen of a first application, and in operation 1902, the electronic device 101 may configure, in a second area 2020, different from the first area 831, a plurality of touch areas for receiving an input for selecting the plurality of objects. For example, as illustrated in 2001 of FIG. 20, based on the angle (or the folding angle) between the housings (e.g., 835 and 836) being changed from the first angle range to the second angle range, the electronic device 101 may display, in the first area 831, a plurality of objects (e.g., icons 2011 and thumbnails 2012), which are different from a plurality of objects included in the execution screen of a recent application in visual attributes (e.g., size). The electronic device 101 may configure a plurality of touch areas (e.g., second areas 2020) for selecting a plurality of objects (e.g., the icons 2011 arranged in the first sub-area 1131 and the thumbnails 2012 arranged in the second sub-area 1132) in the second area 2020 other than the first area 831. Since operations 1901 and 1902 of the electronic device 101 may be performed in the same manner as operations 1301 and 1304 of the electronic device 101 described above, a redundant description thereof is omitted.

According to various embodiments, when the folding angle is changed in operation 1903, the electronic device 101 may change the sizes of the plurality of objects and display the size-changed objects in operation 1904. For example, when the folding angle is changed in the state in which the folding angle is included in the second angle range, the electronic device 101 may dynamically change the sizes of the plurality of objects displayed in the first area 831. When the folding angle is changed and reaches the first angle range, the electronic device 101 may switch the execution screen of the recent application and may display an execution screen in a specific layout (e.g., a carousel form). As an example, as illustrated in 2001 and 2002 of FIG. 20, when the folding angle decreases, the electronic device 101 may gradually decrease the sizes of the objects (e.g., thumbnails 2012), and when the folding angle increases, the electronic device 101 may gradually increase the sizes of the objects (e.g., thumbnails 2012). As an example, as illustrated in 2101 of FIG. 21, when displaying thumbnails of a message application, the electronic device 101 may resize the thumbnails (e.g., increases the size of the thumbnails) of the message application as the folding angle changes and display the resized thumbnails. The electronic device 101 may change the area of the first area (e.g., 1132) in response to the change of the folding angle, and may change the sizes of the objects to correspond to the changed area of the first area (e.g., 1132) (e.g., 2110, 2111, and 2112). Although FIG. 20 illustrates that only the sizes of the thumbnails 2012 are changed, but the disclosure is not limited thereto, and the sizes of the icons 2011 may also be changed. While changing the sizes of the objects, the electronic device 101 may change the sizes of the plurality of touch areas (e.g., 2020) corresponding to the objects to correspond to the changed sizes of the objects. For example, as illustrated in 2002 of FIG. 20, when the sizes of the objects decrease as the folding angle decreases, the electronic device 101 may increase the areas of touch areas (e.g., 2020) corresponding to the objects. When the sizes of the objects increase as the folding angle increase, the electronic device 101 may decrease the areas of the touch areas (e.g., 2020) corresponding to the objects. Without being limited thereto, when the folding angle is decreased, the sizes of the objects may be increased, and when the folding angle is increased, the sizes of the objects may be decreased. Hereinafter, other examples of operations for changing the sizes of objects are described.

According to various embodiments, as the folding angle is changed, the electronic device 101 may change the area of the first area (e.g., 1132) and may display various kinds of information in an area other than the area in which the objects (e.g., icons and/or thumbnails) are displayed in the first area 831 having the changed area. For example, as illustrated in 2102 of FIG. 21, when the area of the first area (e.g., 1132) is increased as the folding angle is increased, the electronic device 101 may display, in an area (e.g., 2122 or 2133) of the area-increased first area (e.g., 1132) other than the area 2121 in which the thumbnails are displayed, information on an application associated with the thumbnails. The size of an area 2121 in which an object (e.g., an icon and/or a thumbnail) is displayed may be fixed on the first area (e.g., 1132), and as the area of the first area 1132 is increased, the electronic device 101 may identify the remaining areas (e.g., 2122 and 2133) other than the area 2121 in which the objects are displayed, on the first area (e.g., 1132). Information on applications displayed in the areas 2122 and 2133 other than the area 2121 in which the thumbnails are displayed may include information which is capable of being provided by the applications. For example, as illustrated in 2102 of FIG. 21, a message application may provide information on the number of messages currently received from other devices and information on the contents of the received messages. In some embodiments, the electronic device 101 may display various kinds of information related to services provided by various other applications in an area other than the area in which the thumbnails are displayed. For example, when the thumbnails displayed in the first area (e.g., 1132) correspond to various applications (e.g., a gallery app), in response to the increase of the size of the first area, the electronic device 101 may acquire the various kinds of information associated with the services provided by the various other applications (e.g., information on the number of stored images) and may display the acquired information.

According to various embodiments, the electronic device 101 may identify information on a position associated with a user, and change the positions of objects 2310 based on the position associated with the user.

Figure 22:
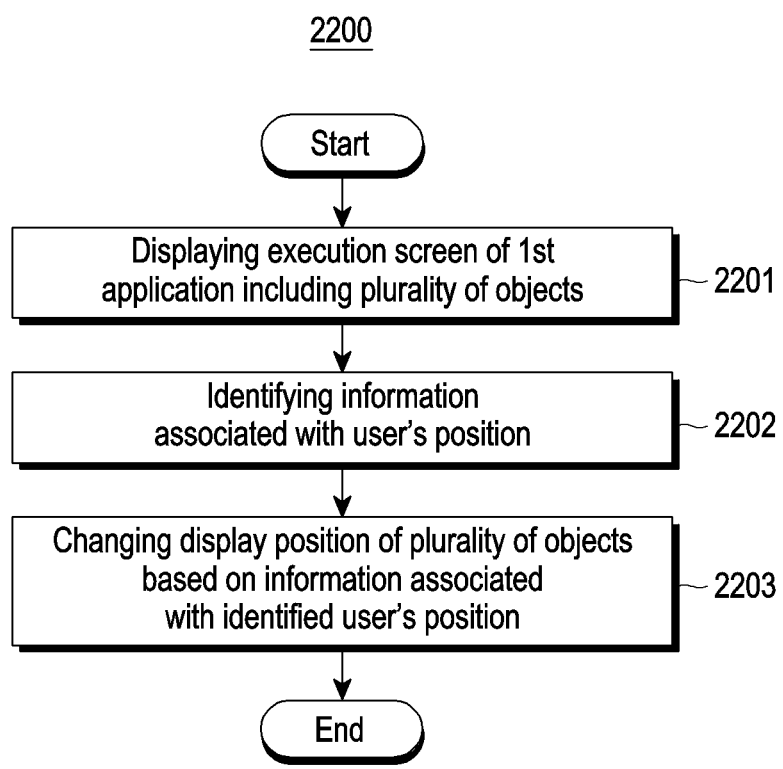
FIG. 22 is a flowchart for describing another example of operations of an electronic device, according to various embodiments.

FIG. 22 is a flowchart 2200 for describing other examples of operations of the electronic device 101 according to various embodiments. According to various embodiments, the operations illustrated in FIG. 22 are not limited to the illustrated order, and may be performed in various orders. In addition, according to various embodiments, a greater or smaller number of operations compared to the operations illustrated in FIG. 22 may be performed. Hereinafter, the operations of FIG. 22 are described with reference to FIGS. 23 to 24.

Figure 23:
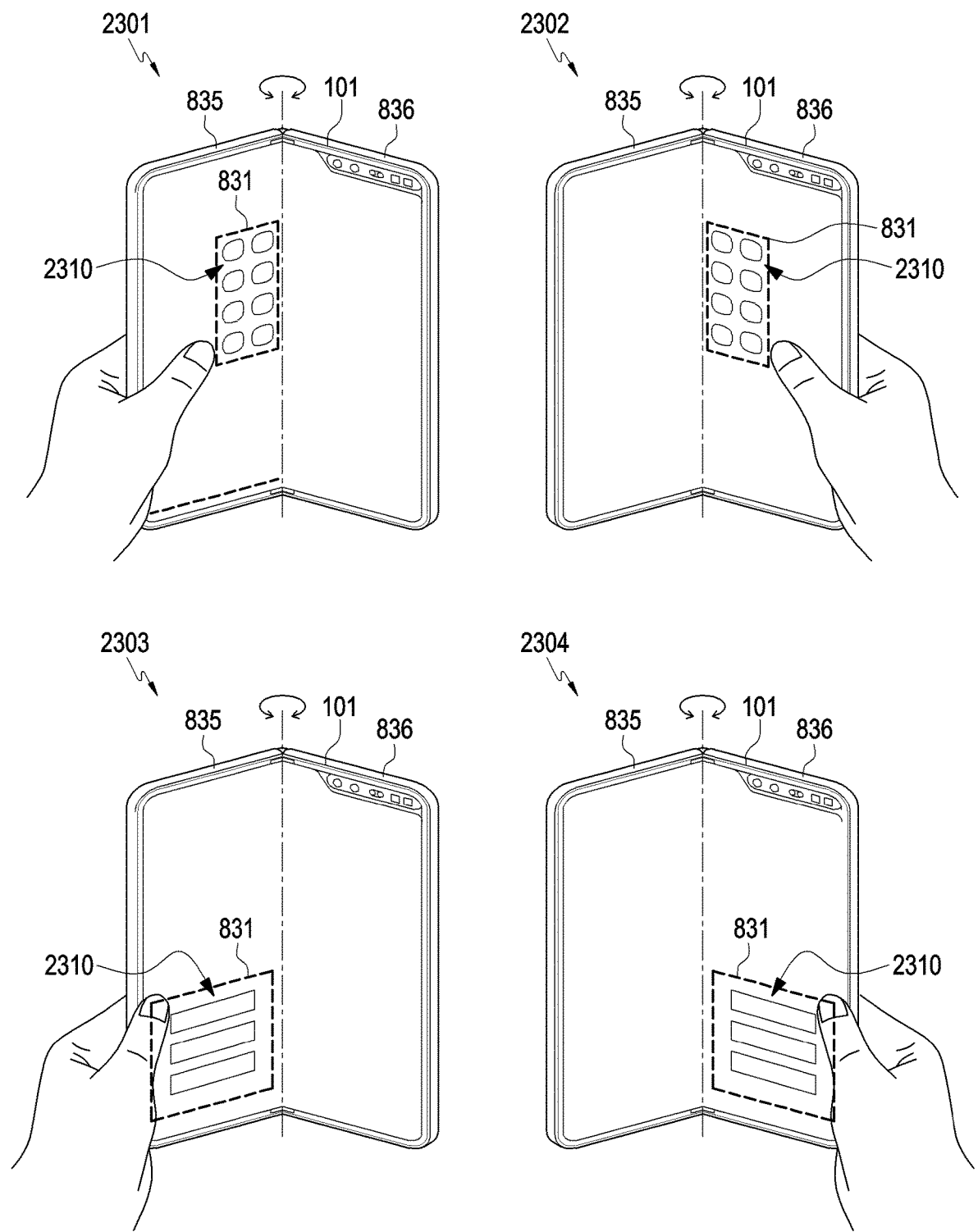
FIG. 23 is a view for describing an example of an operation of changing the position of an object of an electronic device based on the position of a user input, according to various embodiments.
Figure 24:
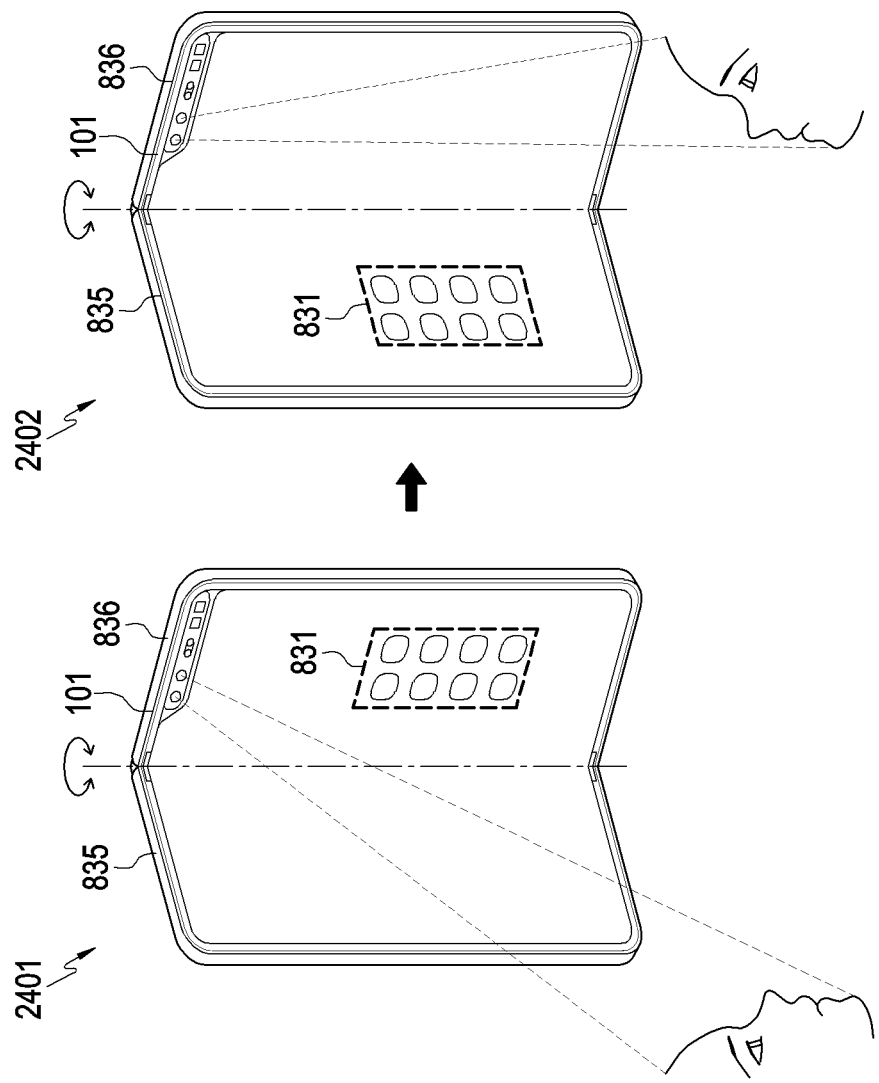
FIG. 24 is a view for describing an example of an operation of changing the position of an object of an electronic device based on the position of a line of sight of a user, according to various embodiments.

FIG. 23 is a view for describing an example of an operation of changing the position of an object of an electronic device 101 according to various embodiments based on the position of a user input. FIG. 24 is a view for describing an example of an operation of changing the position of an object of an electronic device 101 according to various embodiments based on the position of a line of sight of a user.

According to various embodiments, in operation 2201, the electronic device 101 may display, in the first area 831 of the display, a plurality of objects included in the execution screen of a first application, and in operation 2202, the electronic device 101 may configure, in a second area different from the first area 831, a plurality of touch areas for receiving an input for selecting the plurality of objects. For example, as illustrated in 2301 of FIG. 23, based on the angle (or the folding angle) between the housings (e.g., 835 and 836) being changed from the first angle range to the second angle range, the electronic device 101 may display a plurality of objects 2310 (e.g., icons and thumbnails) of a recent application in a first area 831 corresponding to the hinge. The electronic device 101 may configure a plurality of touch areas for selecting the plurality of objects 2310 in a second area other than the first area 831. Since operations 2201 and 2202 of the electronic device 101 may be performed in the same manner as operations 1301 to 1304 of the electronic device 101 described above, a redundant description is omitted.

According to various embodiments, in operation 2203, the electronic device 101 may identify information associated with to the user's position, and in operation 2204, the electronic device 101 may change the display positions of the plurality of objects 2310 based on the information associated with the identified user's position. For example, the information associated with the position of the user may include the position of the user's touch and the position of a line of sight of the user. Hereinafter, examples of operations of changing the display positions of the plurality of objects 2310 of the electronic device based on information associated with the position of the user.

First, an operation of changing the display positions of objects 2310 based on the position of a user input is described.

According to various embodiments, the electronic device 101 may determine whether or not conditions for moving the positions of the plurality of objects 2310 are satisfied, and when the conditions are satisfied, the electronic device 101 may move the positions of the plurality of objects 2310. For example, the conditions being satisfied may include a case in which the attributes of a received touch (e.g., at least one of sensitivity or holding time) satisfy preconfigured values. As an example, when the sensitivity and holding time of a received user's touch exceed preconfigured values, the electronic device 101 may change the positions of the plurality of objects 2310 based on the position of the user's touch.

According to various embodiments, the electronic device 101 may change the display positions of the objects 2310 based on the position at which a user input (e.g., a touch) is received. The electronic device 101 may identify an area of the display corresponding to the position at which a user input is received, and move the first area 831 in which the objects 2310 are displayed to the identified area of the display. For example, as illustrated in 2301 and 2302 of FIG. 23, the electronic device 101 may move the first area 831 in which the plurality of objects 2310 are displayed to a position associated with (e.g., adjacent to) the position at which a user input (e.g., a touch) is received. The objects 2310 may be displayed in the first area 831 of which the position has been moved. The electronic device 101 may move and display the positions of the objects 2310 to positions spaced apart by a predetermined distance from the position at which a user's touch is received. Accordingly, the electronic device 101 may prevent the moved and displayed objects 2310 from being covered the user's hand.

According to various embodiments, based on the position at which a user input is received, the electronic device 101 changes the size of the moved first area 831, and may change the number of objects 2310 displayed in the size-changed first area 831. When the moved first area 831 is identified as being out of the display based on the movement of the first area 831, the electronic device 101 may change the size of the first area 831. For example, as illustrated in 2203 and 2204 of FIG. 23, the electronic device 101 may receive a user input in the lower area of the display corresponding to each of the housings 835 and 836. When the first area is moved to the lower area of the display in which the user input is received, the electronic device may identify that the moved first area is out of the display. The electronic device 101 may perform an operation of comparing the position of the area of the display with the position of the first area to change the size (e.g., reduce the size) of the first area such that the first area is not out of the display. As illustrated in 2303 and 2304 of FIG. 23, the electronic device 101 may reduce the number of objects 2310 such that the plurality of objects 2310 are displayed in the first area of the changed size. The electronic device may select a plurality of objects 2310 to be displayed among the plurality of objects displayed before the first area 831 is moved, based on the order of priorities of the plurality of objects. For example, the electronic device may select a predetermined number of objects 2310 displayable in the size-changed first area 831 in the order of the priorities from the highest priority. The electronic device may allow the remaining unselected objects to be displayed when the plurality of objects 2310 are scrolled.

According to various embodiments, the electronic device may change the display size of the moved objects 2310. For example, as illustrated in 2303 and 2304 of FIG. 23, the electronic device may increase the size of the objects 2310 to cause the objects 2310 to be displayed in the increased size.

Hereinafter, an example of an operation of changing the display positions of the objects 2310 based on the position a line of sight of the user is described.

According to various embodiments, the electronic device 101 may move the display positions of the objects 2310 based on the position of a line of sight of the user, as illustrated in FIG. 24. The electronic device 101 may photograph at least a portion of the user's body (e.g., face, shoulder, and torso) by using a provided camera. The electronic device 101 may calculate at least one of a rotation degree or two-dimensional coordinates of the user's body from a captured image of the at least a portion of the user's body. Based on at least one of the calculated rotation degree or the two-dimensional coordinates of the user's body, the electronic device 101 may identify an area facing the user among the areas of the display corresponding to the two housings (e.g., 835 and 836), and may move/display the plurality of objects 2310 to/in the identified area. For example, as illustrated in 2401 of FIG. 24, when the user is identified as facing the area of the display corresponding to the second housing 836, the electronic device 101 may move/display the plurality of objects 2310 to/in the area of the display corresponding to the second housing 836. In addition. for example, as illustrated in 2402 of FIG. 24, when the user is identified as facing the area of the display corresponding to the first housing 835, the electronic device 101 may move/display the plurality of objects 2310 to/in the area of the display corresponding to the first housing 835.

According to various embodiments, while moving the plurality of objects 2310, the electronic device 101 may adjust the positions configured for the plurality of touch areas corresponding to the plurality of objects 2310 according to the movement of the plurality of objects 2310. For example, when the first area 831 is moved, the electronic device 101 may move/display the plurality of touch areas to/at positions adjacent to the first area 831.

According to various embodiments, when two or more objects are selected, the electronic device 101 may configure displaying forms of the execution screens of the applications corresponding to the two or more objects based on the change pattern of the folding angle between the housings (e.g., 835 and 836). The displaying form may include a multi-window form, a pop-up window form, and a form in which multi-windows and pop-up windows are combined.

Figure 25:
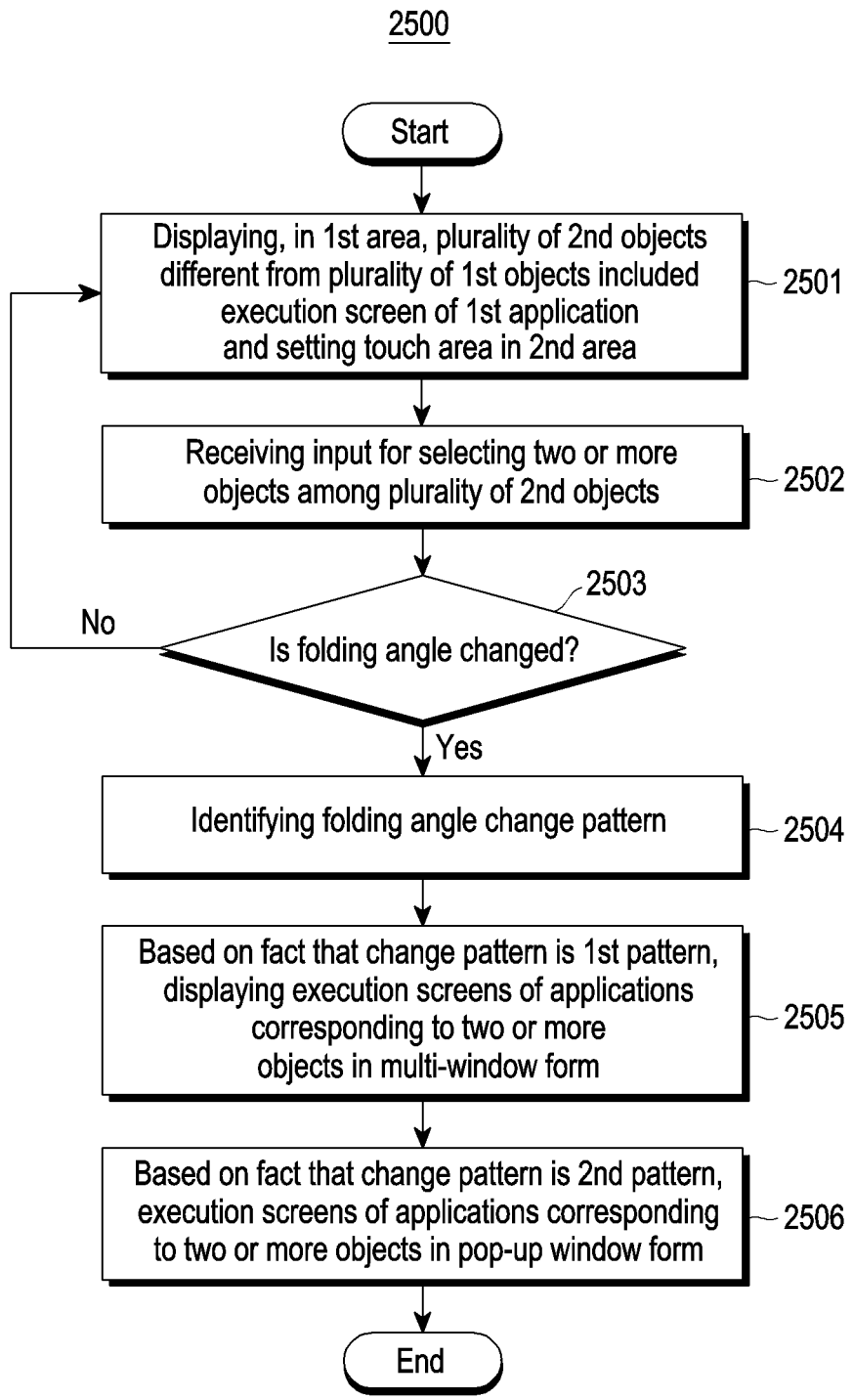
FIG. 25 is a flowchart for describing another example of operations of an electronic device, according to various embodiments.

FIG. 25 is a flowchart 2500 for describing other examples of operations of the electronic device 101 according to various embodiments. According to various embodiments, the operations illustrated in FIG. 25 are not limited to the illustrated order, and may be performed in various orders. In addition, according to various embodiments, a greater or smaller number of operations compared to the operations illustrated in FIG. 25 may be performed. Hereinafter, FIG. 25 is described with reference to FIGS. 26 through 28.

Figure 26:
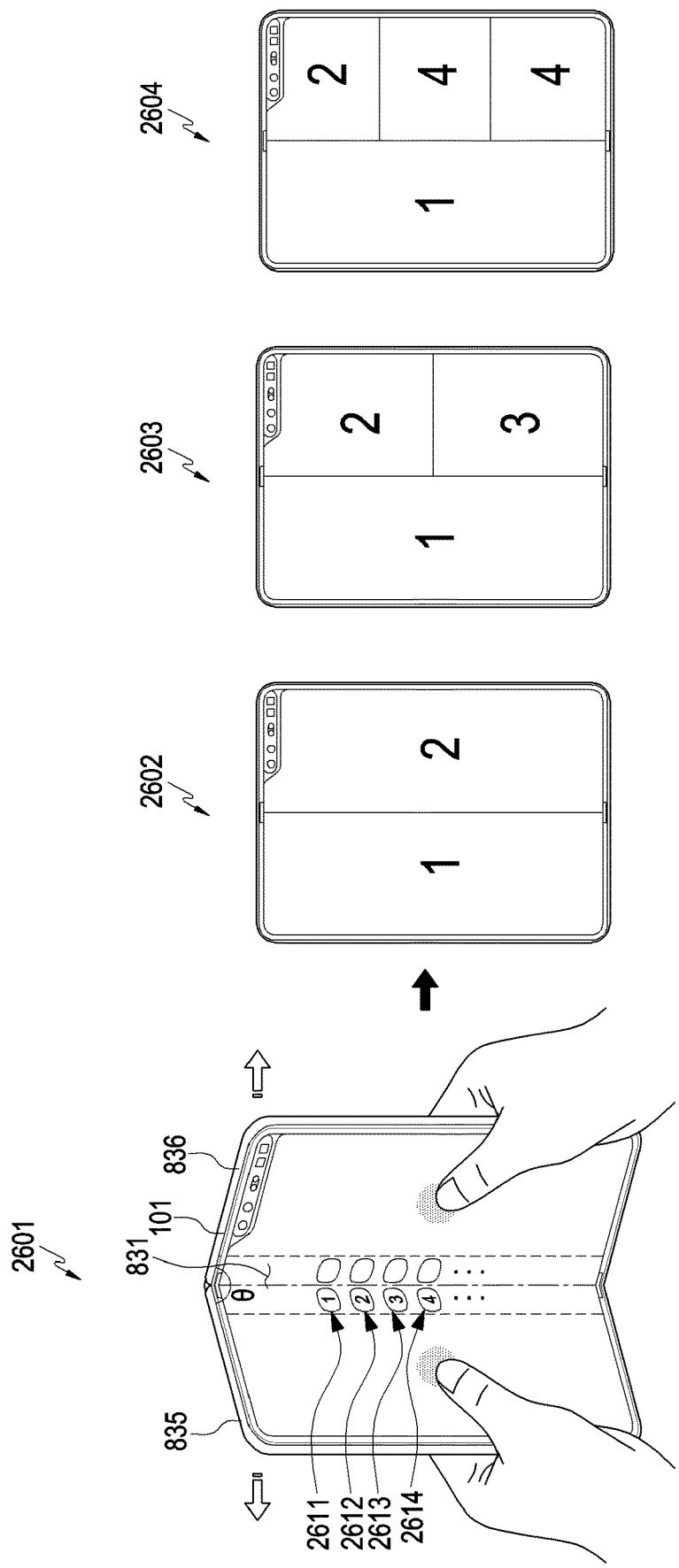
FIG. 26 is a view for describing an example of an operation of displaying screens of a plurality of applications of an electronic device in a multi-window form, according to various embodiments.
Figure 27:
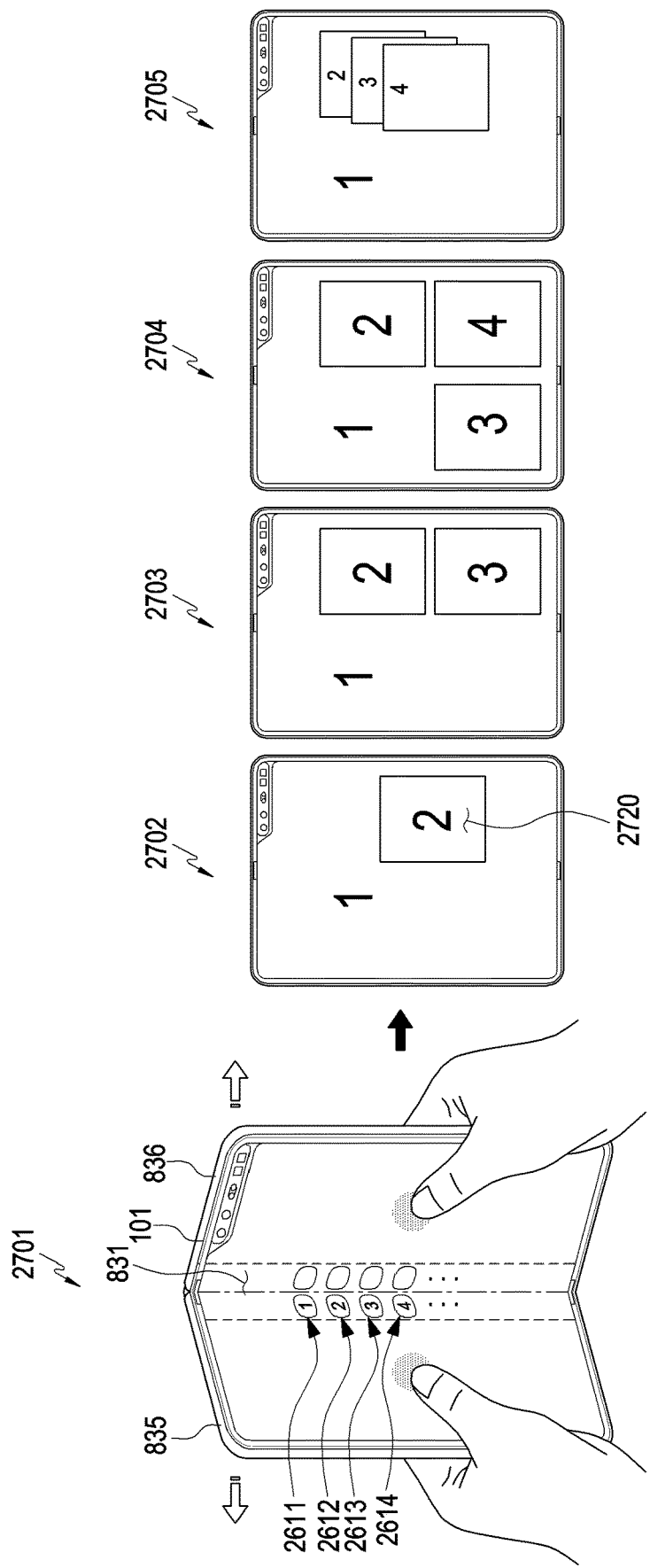
FIG. 27 is a view for describing an example of an operation of displaying screens of a plurality of applications of an electronic device in a pop-up window form, according to various embodiments.
Figure 28:
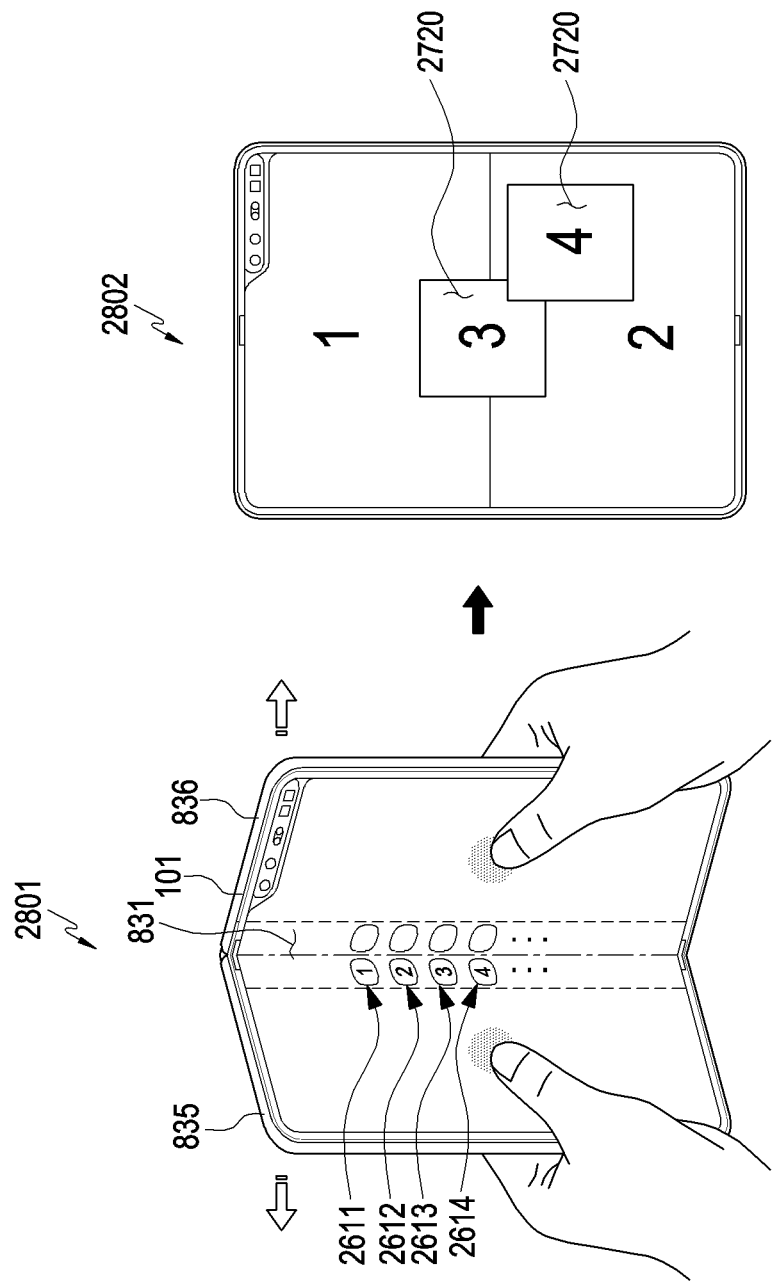
FIG. 28 is a view for describing an example of an operation of displaying screens of a plurality of applications of an electronic device in a form in which multi-windows and pop-up windows are combined, according to various embodiments.

FIG. 26 is a view for describing an example of an operation of displaying screens of a plurality of applications of an electronic device 101 according to various embodiments in a multi-window form. FIG. 27 is a view for describing an example of an operation of displaying screens of a plurality of applications of an electronic device 101 according to various embodiments in a pop-up window form. FIG. 28 is a view for describing an example of an operation of displaying screens of a plurality of applications of an electronic device 101 according to various embodiments in a form in which multi-windows and pop-up windows are combined.

According to various embodiments, in operation 2501, the electronic device 101 may display, in a first area 831, a plurality of second objects which are different from a plurality of first objects included in the execution screen of a first application, and may configure touch areas in a second area. For example, as illustrated in 2601 of FIG. 26, 2701 of FIG. 27, and 2801 of FIG. 28, based on the angle (or the folding angle) between the housings (e.g., 835 and 836) being changed from the first angle range to the second angle range, the electronic device 101 may display a plurality of objects (e.g., icons and thumbnails) of a recent application in the first area 831 corresponding to the hinge. The electronic device 101 may configure a plurality of touch areas for selecting the plurality of objects 2611, 2612, 2613, and 2614 in a second area other than the first area 831. Since operation 2501 of the electronic device 101 may be performed like the above-described operations 1201 to 1204 of the electronic device 101, a redundant description is omitted.

According to various embodiments, the electronic device 101 may receive an input for selecting two or more objects among the plurality of objects in operation 2502. For example, based on a user input being received on two or more touch areas among the plurality of touch areas configured in the second areas, the electronic device 101 may select two or more objects corresponding to the touched two or more touch areas among the plurality of objects 2611, 2612, 2613, and 2614. Since operation 2502 of the electronic device 101 may be performed like the above-described operation 1703 of the electronic device 101, a redundant description is omitted.

According to various embodiments, when the folding angle is identified as being changed in operation 2503, the electronic device 101 may identify the change pattern of the folding angle θ in operation 2504. The change pattern of the folding angle θ may include change trends of the folding angle θ, such as a trend in which the folding angle increases and a trend in which the folding angle decreases after increasing. As described above, the displaying form may include a multi-window form, a pop-up window form, and a form in which multi-windows and pop-up windows are combined. Based on the identified change pattern of the folding angle θ, the electronic device 101 may determine a displaying form of execution screens of applications corresponding to two or more objects. Hereinafter, examples of operations of displaying execution screens based on the change pattern of the folding angle θ of the electronic device 101 are described. The operations of the electronic device 101 described below are merely examples, and the displaying forms of execution screens may be determined based on various change patterns of the folding angle.

According to various embodiments, in operation 2505, based on the change pattern being a first pattern, the electronic device 101 may display the execution screens of applications corresponding to two or more objects in a multi-window form. For example, when the change pattern of the folding angle θ is a pattern indicating an increasing trend (e.g., increasing from 130 degrees to 180 degrees), the electronic device 101 may display the execution screens of applications corresponding to the selected two or more objects in divided screens (e.g., displaying the execution screen in a multi-window form). For example, as illustrated in 2601 of FIG. 26, after two or more objects are selected in the state in which the folding angle θ between the housings (e.g., 835 and 836) is a second angle, the folding angle θ may be changed to a first angle range. For example, the folding angle between the housings (e.g., 835 and 836) may increase from the second angle and change to a folding angle included in the first angle range. The electronic device 101 may identify a value received from a sensor while the folding angle increases, and based on the value, the electronic device 101 may identify that the folding angle increases from the second angle and identify that the change pattern of the folding angle exhibits a trend in which the angle increases. Based on the identified change pattern, the electronic device 101 may display execution screens of applications in multi-window forms as illustrated in 2602, 2603, and 2604 of FIG. 26. In order to ensure that the execution screens of applications do not overlap each other, the electronic device 101 may divide the display into as many areas as the number of the applications and may display the execution screens of the applications in respective divided areas of the display. For example, when two objects are selected as illustrated in 2602 of FIG. 26, the electronic device 101 may divide the display into two areas, and may display an execute screen of an application corresponding to each of the objects in each of the two divided areas. For example, when three objects are selected as illustrated in 2603 of FIG. 26, the electronic device 101 may divide the display into three areas, and may display the execution screens of three applications. In addition, when five objects are selected as illustrated in 2604 of FIG. 26, the electronic device 101 may divide the display into five areas to display five execution screens. The divided areas of a display illustrated in FIG. 26 are merely examples, and respective areas may be configured to have sizes different from the illustrated sizes. The electronic device 101 may configure the size of one area among a plurality of areas to be larger than the size of the other areas (e.g., configures the size of one area to be the largest), and may display the execution screen of an application in the one area based on the order of priorities of the applications. For example, the electronic device 101 may display the execution screen of the application having the highest priority in the one area having the largest size among the divided areas. For example, the order of priorities may be configured such that an application that has been most recently controlled by a user interaction (or the highest activity stack) and is being executed in a background mode has the highest priority. For example, the order of priorities may be configured such that an application corresponding to a touch area touched earlier by a user input has a higher priority.

According to various embodiments, in operation 2506, based on the change pattern being a second pattern, the electronic device 101 may display the execution screens of applications corresponding to two or more objects in a pop-up window form. For example, when the change pattern of the folding angle is a pattern exhibiting a trend in which the folding angle decreases and then increases, the electronic device 101 may display some of the execution screens of the applications corresponding to the selected two or more objects in a pop-up window form. For example, the third angle range (e.g., 90 degrees to 120 degrees) may be a smaller angle range than the second angle range (e.g., 120 degrees to 160 degrees). In the state in which the angle between the housings (e.g., 835 and 836) is included in the second angle range, as the relative positions of the housings (e.g., 835 and 836) are changed according to the pivoting of the hinge (or the rotating of the housings about the hinge), the angle may be included in the third angle range. After the angle is included in the third angle range (e.g., 90 degrees to 120 degrees), as the relative positions of the housings (e.g., 835 and 836) are changed again according to the pivoting of the hinge, the angle may increase and may be included in the first angle range (e.g., 180 degrees). Based on values identified from a sensor while the angle is being changed, the electronic device 101 may identify that the angle change pattern exhibits a trend in which the angle decreases and then increases again. As illustrated in 2702, 2703, 2704, and 2705 of FIG. 27, based on the identified angle change pattern, while displaying the execution screen of an application among the execution screens of applications corresponding to the selected two or more objects, the electronic device 101 may display the execution screens of the remaining applications in the pop-up windows 2720. Based on the order of priorities of the applications, while displaying the execution screen of an application having the highest priority, the electronic device 101 may display the execution screens of the other remaining applications in the pop-up windows 2720. A redundant description of the order of priorities is omitted.

According to various embodiments, as illustrated in 2802 of FIG. 28, the electronic device 101 may display execution screens of a plurality of applications in a form in which multi-windows and pop-up windows are combined. For example, when the change pattern of the folding angle is a pattern in which an angle increasing trend and an angle decreasing trend are repeated, the electronic device 101 may display the execution screens of a plurality of applications in a form in which a multi-window form and a pop-up window form are combined. In some embodiments, the electronic device 101 may determine the number of execution screens displayed in the divided screens and the number of execution screens displayed in the pop-up windows based on the number of inflection points of angle changes identified as the folding angle increasing trend and the folding angle decreasing are repeated. For example, in the case where a trend in which the folding angle decreases and the increases while the folding angle is changed from the above-described change pattern is identified twice, the electronic device 101 may display the execution screens of two applications corresponding to two objects among the selected objects in divided screens, and may display the execution screens of the applications corresponding to the remaining objects in pop-up windows. In this case, based on the order of priorities of the applications (e.g., from the highest priority) corresponding to the selected objects, (e.g., from the highest priority), the electronic device 101 may select the applications to be displayed in the divided screens.

As described above, the angle change patterns corresponding to the above-described displaying forms (e.g., a multi-window form, a pop-up window form, and a form in which a multi-window and a pop-up window are combined) are merely examples, and may be implemented in various angle change patterns. For example, when an angle change pattern exhibits a trend in which the angle decreases and then increases, the electronic device 101 may display the execution screens of a plurality of applications in a pop-up window pattern. For example, when an angle change pattern exhibits a trend in which the angle increases, the electronic device 101 may display the execution screens of a plurality of applications in a multi-window form.

The above-described operations of displaying the execution screens of applications corresponding to a plurality of selected objects by the electronic device 101 may also be applicable to various other types of electronic devices 101.

According to various embodiments, an electronic device 101 (e.g., the electronic device 101 in FIG. 30), which is implemented such that the relative positions of the housings (e.g., 835 and 836) are changed according to the pivoting of the hinge up and down, may perform an operation of displaying the execution screens of applications corresponding to a plurality of objects.

Figure 29:
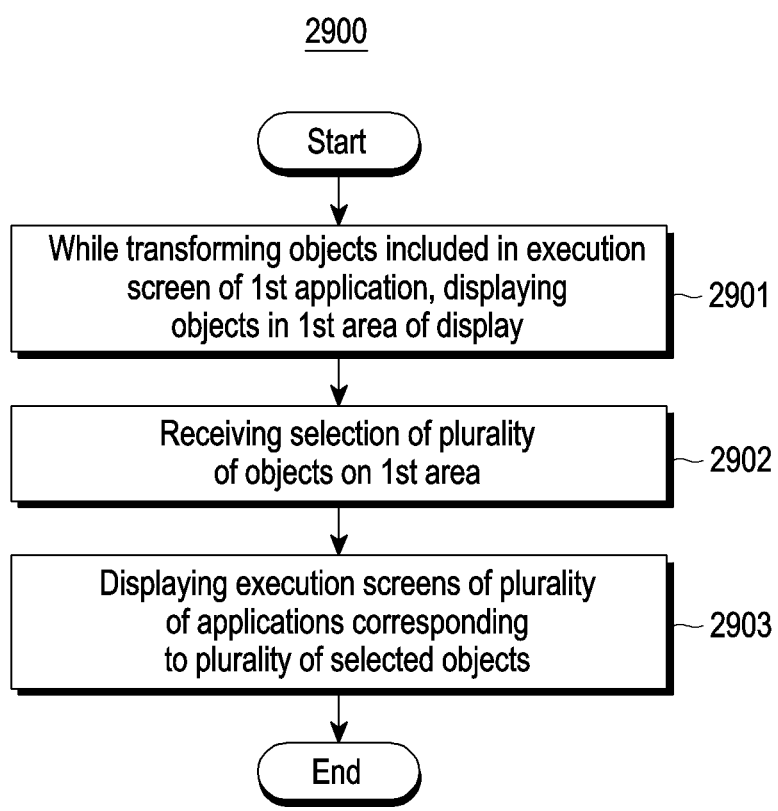
FIG. 29 is a flowchart for describing examples of operations of an electronic device implemented such that housings are rotated up and down, according to various embodiments.

FIG. 29 is a flowchart 2900 for describing examples of operations of an electronic device 101, which is implemented such that the relative positions of the housings are changed up and down according to the pivoting of the hinge according to various embodiments of the disclosure. According to various embodiments, the operations illustrated in FIG. 29 are not limited to the illustrated order, and may be performed in various orders. In addition, according to various embodiments, a greater or smaller number of operations compared to the operations illustrated in FIG. 29 may be performed. Hereinafter, the operations of FIG. 29 are described with reference to FIG. 30.

Figure 30:
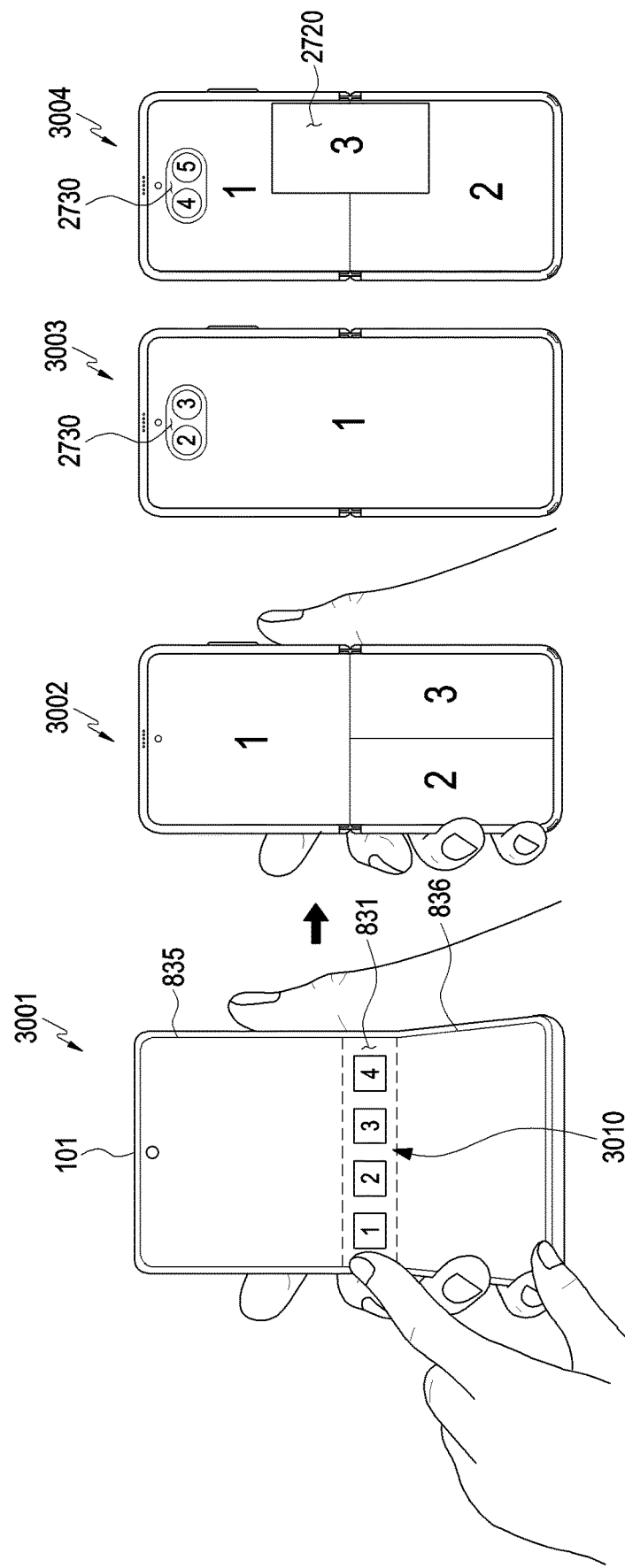
FIG. 30 is a view for describing examples of operations of an electronic device implemented such that housings are rotated up and down, according to various embodiments.

FIG. 30 is a view for describing examples of operations of an electronic device 101, which is implemented such that the relative positions of the housings are changed up and down according to the pivoting of the hinge according to various embodiments.

According to various embodiments, in operation 2901, the electronic device 101 of FIG. 30 may display, in a first area, a plurality of second objects different from a plurality of first objects included in the execution screen of the first application. For example, as illustrated in 3001 of FIG. 30, when the relative positions of the first housing 835 and the second housing 836 are changed according to the pivoting of the hinge and thus the angle between the housings is included in the second angle range, the electronic device 101 may display, in the first area 831, objects 3010 (e.g., icons and thumbnails) having visual attributes (e.g., size) different from those of the objects included in the first application (e.g., a recent application). The first area 831 may be an area corresponding to the hinge of the electronic device 101 (e.g., the area of a display that is bent according to the change of relative positions of the housings according to the pivoting of the hinge). Since operation 2901 of the electronic device 101 may be performed like the above-described operation 701 of the electronic device 101, a redundant description is omitted.

According to various embodiments, in operation 2902, the electronic device 101 of FIG. 30 may receive a selection of a plurality of objects on the first area. For example, the electronic device 101 may receive a user input for selecting at least one of a plurality of objects displayed on the first area. In the case where the electronic device 101 implemented such that the relative positions of the housings (e.g., the first housing 835 and the second housing 836) are changed up and down according to the pivoting of the hinge, a user may easily hold the electronic device 101 with one hand. Accordingly, the electronic device 101 may not perform an operation of configuring a plurality of touch areas in an area other than the first area 831, and may receive a user input on the objects 3010 displayed on the first area 831.

According to various embodiments, when the electronic device 101 is rotated (e.g., rotated clockwise or counterclockwise), the electronic device 101 may also rotate and display the plurality of objects 3010 displayed in the first area, and may configure a plurality of touch areas for selecting the plurality of objects 3010 in the second area other than the first area. Since the operation of configuring a plurality of touch areas in the electronic device 101 may be performed like the above-described operation 1204 of the electronic device 101, a redundant description is omitted.

According to various embodiments, the electronic device 101 of FIG. 30 may display the execution screens of a plurality of applications corresponding to a plurality of objects selected in operation 2903. For example, as illustrated in 3002, 3003, and 3004 of FIG. 30, the electronic device 101 may display the execution screens of a plurality of applications in a multi-window displaying form 3002, a pop-up window displaying form 3003, or a form in which multi-widows and pop-up windows are combined 3004. As described with reference to FIGS. 27 to 28, the electronic device 101 may identify the display form based on an angle change pattern and may display the execution screens of a plurality of applications based on the identified displaying form. Accordingly, a redundant description is omitted. When the electronic device 101 displays the execution screens of applications in a pop-up display form, the electronic device 101 may display the execution screens of the applications in the pop-up window as 2720 in FIG. 30 or may display pop-up windows including icons for calling the execution screens of the applications as 2730 in FIG. 30.

Hereinafter, embodiments in which the above-described operations of the electronic device 101 are applied to electronic devices 101 having various form factors is described.

According to various embodiments, in an electronic device 101 of a type in which a plurality of areas are formed in a flexible display as well, the execution screen of the first application (e.g., a recent application) may be changed based on the folding angles between the plurality of housings provided in the electronic device 101. For example, an electronic device 101 of a type in which three areas are formed in a flexible display (e.g., a Z fold type) may identify a plurality of angles (or folding angles) between the housings 3211, 3212, and 3213, and, based on the plurality of angles, the electronic device 101 may change the display positions of objects 3221 included in the execution screen of the first application (e.g., a recent application). In addition, the electronic device 101 may display the execution screen of an application which corresponds to an object selected based on the plurality of angles and is executed in a background mode. Hereinafter, the electronic device 101 of a type in which three areas are formed in a flexible display (e.g., a Z-fold type) is described as an example, but the following descriptions may also be applicable to an electronic device of a type in which more areas are formed.

Figure 31:
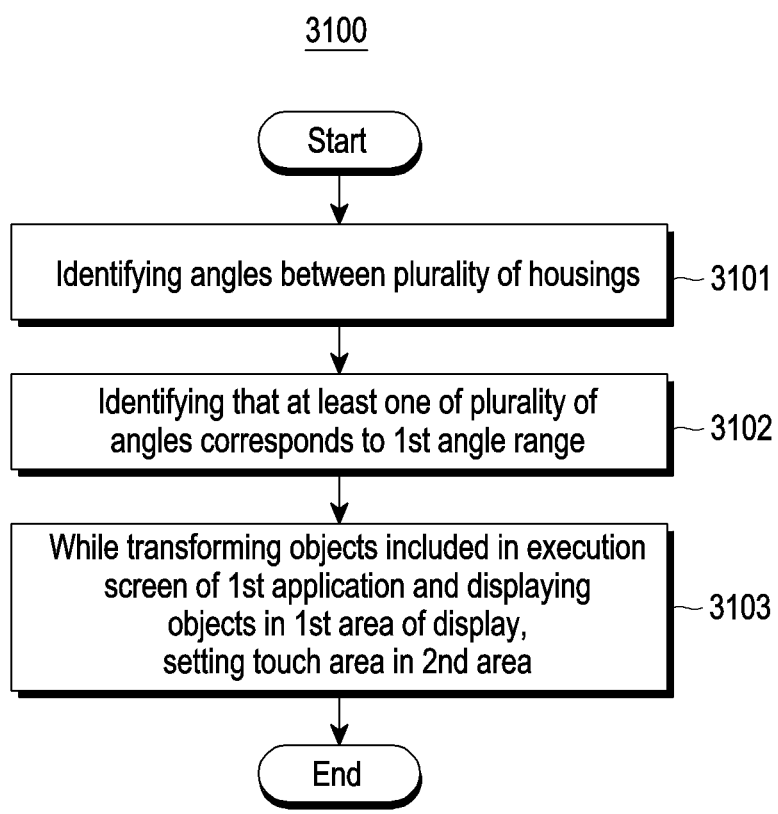
FIG. 31 is a flowchart for describing another example of operations of an electronic device, according to various embodiments.

FIG. 31 is a flowchart 3100 for describing other examples of operations of the electronic device 101 according to various embodiments. According to various embodiments, the operations illustrated in FIG. 31 are not limited to the illustrated order, and may be performed in various orders, a greater or smaller number of operations compared to the operations illustrated in FIG. 31 may be performed. Hereinafter, FIG. 31 is described with reference to FIGS. 32 and 33.

Figure 32:
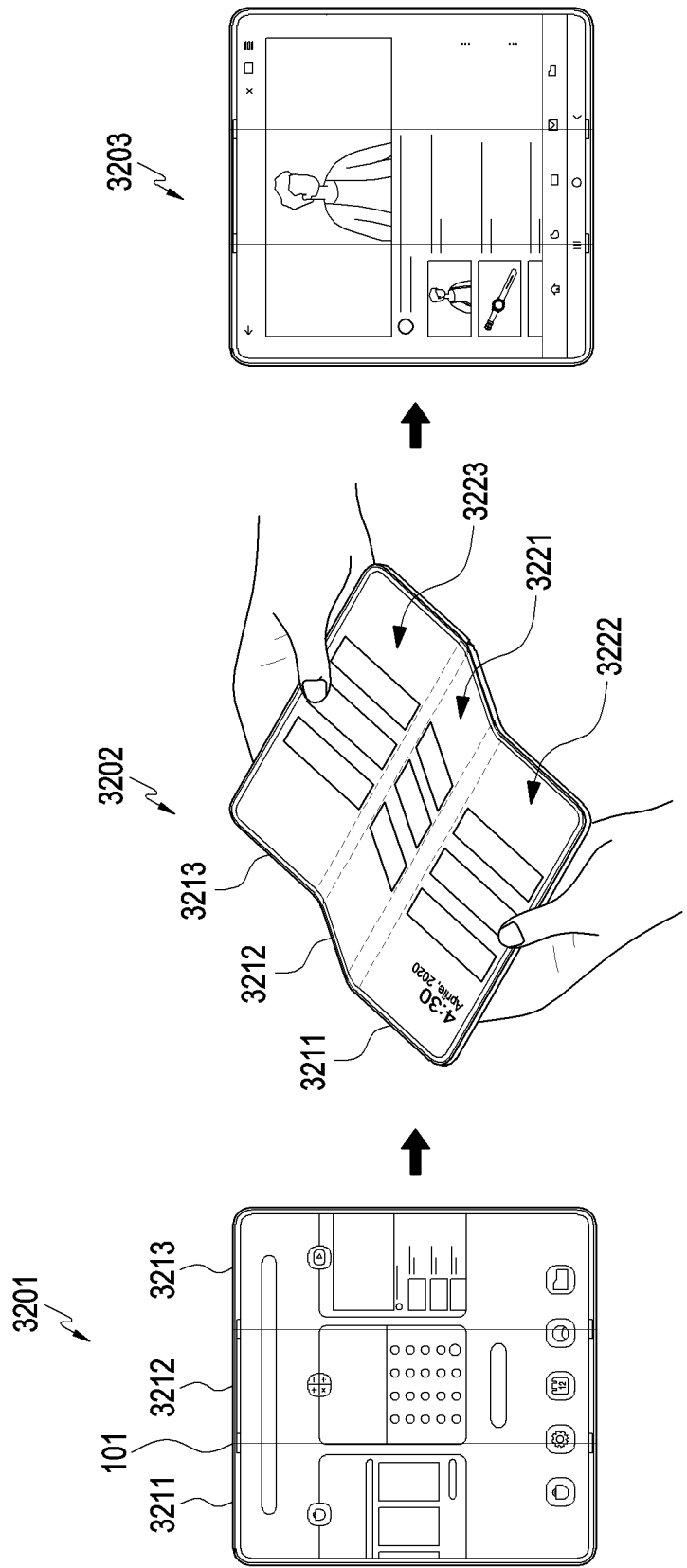
FIG. 32 is a view for describing an example of an operation of an electronic device in a type in which three areas are formed in a flexible display, according to various embodiments.
Figure 33:
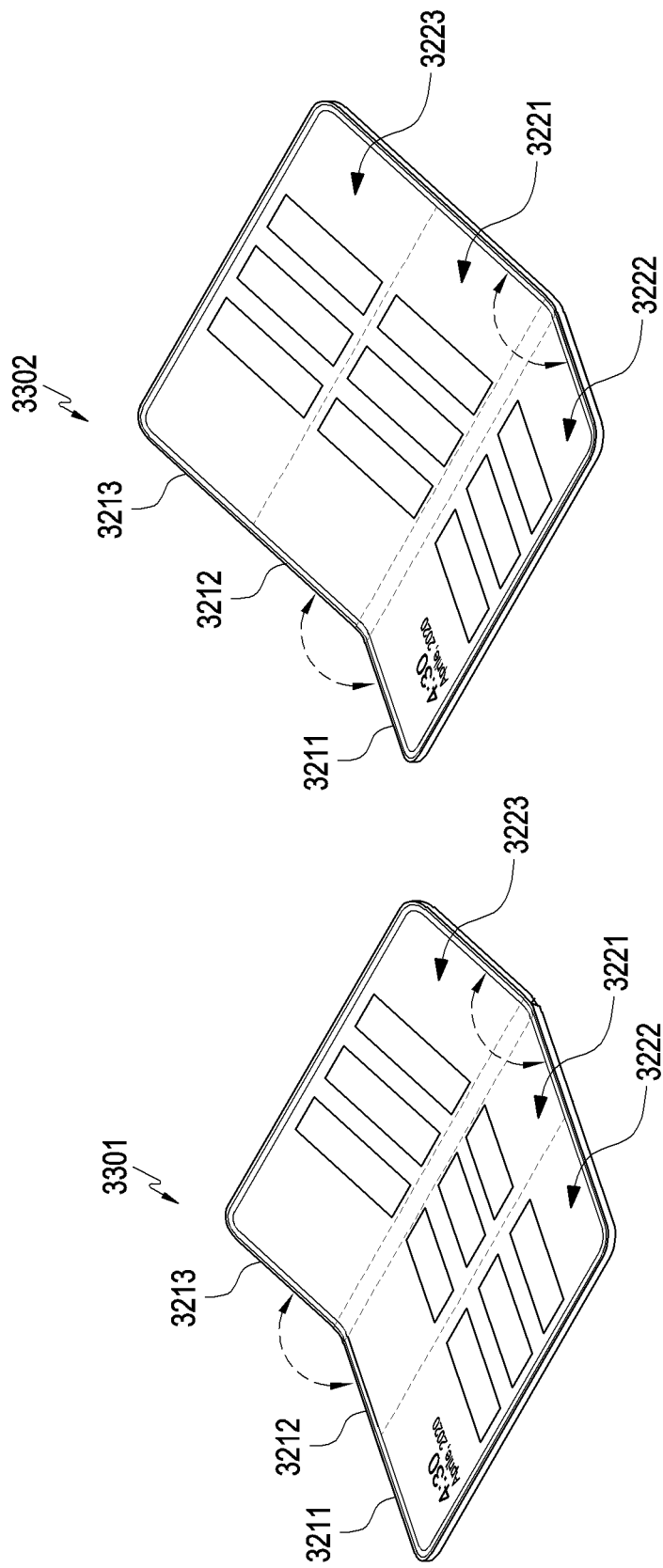
FIG. 33 is a view for describing another example of an operation of an electronic device of a type in which three areas are formed in a flexible display, according to various embodiments.

FIG. 32 is a view for describing an example of an operation of an electronic device 101 in a type in which three areas are formed (e.g., a Z-fold type) in a flexible display according to various embodiments. FIG. 33 is a view for describing another example of an operation of an electronic device 101 of a type in which three areas are formed (e.g., a Z-fold type) in a flexible display according to various embodiments.

According to various embodiments, in operation 3101, an electronic device 101 may display the execution screen of a first application including a plurality of first objects. For example, as illustrated in 3201 of FIG. 32, the electronic device 101 may display the execution screen of a recent application including a plurality of first objects (e.g., icons and/or thumbnails). Operation 3101 of the electronic device 101 may be performed like the above-described operation 801 of the electronic device 101 in which two areas are formed in the flexible display, a redundant description is omitted.

According to various embodiments, in operation 3102, the electronic device 101 may identify angles between the plurality of housings 3211, 3212, and 3213. For example, the relative positions of the plurality of housings 3211, 3212, and 3213 may be changed according to the pivoting of hinges to each of which two adjacent housings included in the electronic device 101 are connected. Among the plurality of housings 3211, 3212, and 3213, as the relative positions of adjacent housings (e.g., the first housing 3211 and the second housing 3212 or the second housing 3212 and the third housing 3213) are changed according to the pivoting of a hinge, respective housings may form a folding angle relative to each other. For example, as the relative positions of the housings 3211, 3212, and 3213 are changed according to the pivoting of the hinges as illustrated in 3202 of FIG. 32, a first folding angle between the first housing 3211 and the second housing 3212 may be formed as a first angle, and a second folding angle between the second housing 3212 and the third housing 3213 may be formed as a second angle. Based on values identified from a sensor as the relative positions of the three housings 3211, 3212, and 3213 are changed according to the pivoting of the hinges, the electronic device 101 may identify the above-mentioned angles (e.g., the first angle and the second angle). The sensor may be provided in each of the first housing 3211 and the third housing 3213. For example, the first sensor may be provided in the first housing 3211 to identify a value when the relative position of the first housing 3211 or the second housing 3212 is changed (or rotated), and the second sensor may be provided in the third housing 3213 to identify a value when the relative position of the second housing 3212 or the third housing 3213 is changed (or rotated).

According to various embodiments, in operation 3103, the electronic device 101 may determine whether the identified angles satisfy conditions for switching the execution screen of the first application. For example, when the conditions are satisfied, it may include a case in which a plurality of identified angles are included in a predetermined angle range. For example, in order to determine whether the conditions are satisfied, the electronic device 101 may determine whether the angles are included in predetermined different angle ranges, respectively. As an example, as illustrated in 3201 of FIG. 32, when the folding angle between the first housing 3211 and the second housing 3212 is included in a second angle range (e.g., 210 to 240 degrees) and the folding angle between the second housing 3212 and the third housing 3213 is included in a third angle range (e.g., 120 to 160 angles), and when the folding angle between the second housing 3212 and the third housing 3213 is included in the third angle range (e.g., 120 degrees to 160 degrees), the electronic device 101 may initiate an operation of switching the execution screen of a recent application (e.g., changing the sizes and/or positions of a plurality of objects 3221). For example, in order to determine whether the conditions are satisfied, the electronic device 101 may determine whether at least one of the angles is included in a predetermined angle range. For example, the electronic device 101 may determine whether the second angle between the second housing 3212 and the third housing 3213 is included in the third angle range (e.g., 120 degrees to 160 degrees) as illustrated in 3301 of FIG. 33 or whether the first angle between the first housing 3211 and the second housing 3212 is included in the third angle range (e.g., 120 degrees to 160 degrees) as illustrated in 3302 of FIG. 33. When at least one of the first angle or the second angle is included in the third angle range, the electronic device 101 may initiate an operation of switching the execution screen of the recent application (e.g., changing the positions of the plurality of objects 3221).

According to various embodiments, when the conditions are identified as being satisfied in operation 3104, in operation 3105, the electronic device 101 may configure touch areas (e.g., 3222 and 3223) in a second area while displaying, in a first area of the display, at least one second object (e.g., 3221) different from at least one first object. Hereinafter, the first area in which the second object is displayed and the second area in which the touch areas are configured are described.

According to various embodiments, the electronic device 101 may display a plurality of objects 3221 in the first area of the display corresponding to one housing, and may display touch areas in second areas of the display corresponding to remaining housings 3211, 3212, and 3213. As an example, as illustrated in 3202 of FIGS. 32 and 3301 and 3302 of FIG. 33, the electronic device 101 may identify the area of the display, which corresponds to the second housing 3212 located between the first housing 3211 and the third housing 3213, as the first area and may display a plurality of objects 3221 in the first area. The electronic device may identify the remaining areas of the display, which correspond to the first housing 3211 and the third housing 3213, respectively, as the second area, and may configure a plurality of touch areas 3222 and 3223 in each of the areas. In this case, the electronic device 101 may change the sizes of the objects (e.g., icons and/or thumbnails) 3221 to correspond to the size of the first area and then display the objects (e.g., icons and/or thumbnails) in the first area. The first area corresponding to the second housing 3212 may include sub-areas, and may include different types of objects (e.g., icons and thumbnails) in respective sub-areas. Since the operation of changing the sizes of the objects 3221 in the electronic device 101 has been described above, a redundant description thereof is omitted. In addition, since the operation of configuring a plurality of touch areas in the electronic device 101 has been described above, a redundant description thereof is omitted.

According to various embodiments, when the above-mentioned two or more objects are selected in the electronic device 101 of the type in which three areas are formed in a flexible display (e.g., Z-fold type), based on a folding angle change pattern, the electronic device 101 may display the execution screens of applications corresponding to the two or more object like the above-described displaying forms of an electronic device 101 (e.g., a multi-window form, a pop-up window form, or a form in which the multi-window form and the pop-up window form are combined). A redundant description is omitted.

According to various embodiments, an electronic device 101 including a structure in which a roller (e.g., 451) is provided and a flexible display is exposed to the outside according to the rotation of the roller (e.g., 451) (hereinafter, referred to as a rollable electronic device 101) may switch the execution of a first application (e.g., a recent application) based on the area of the exposed area of the flexible display.

Figure 34:
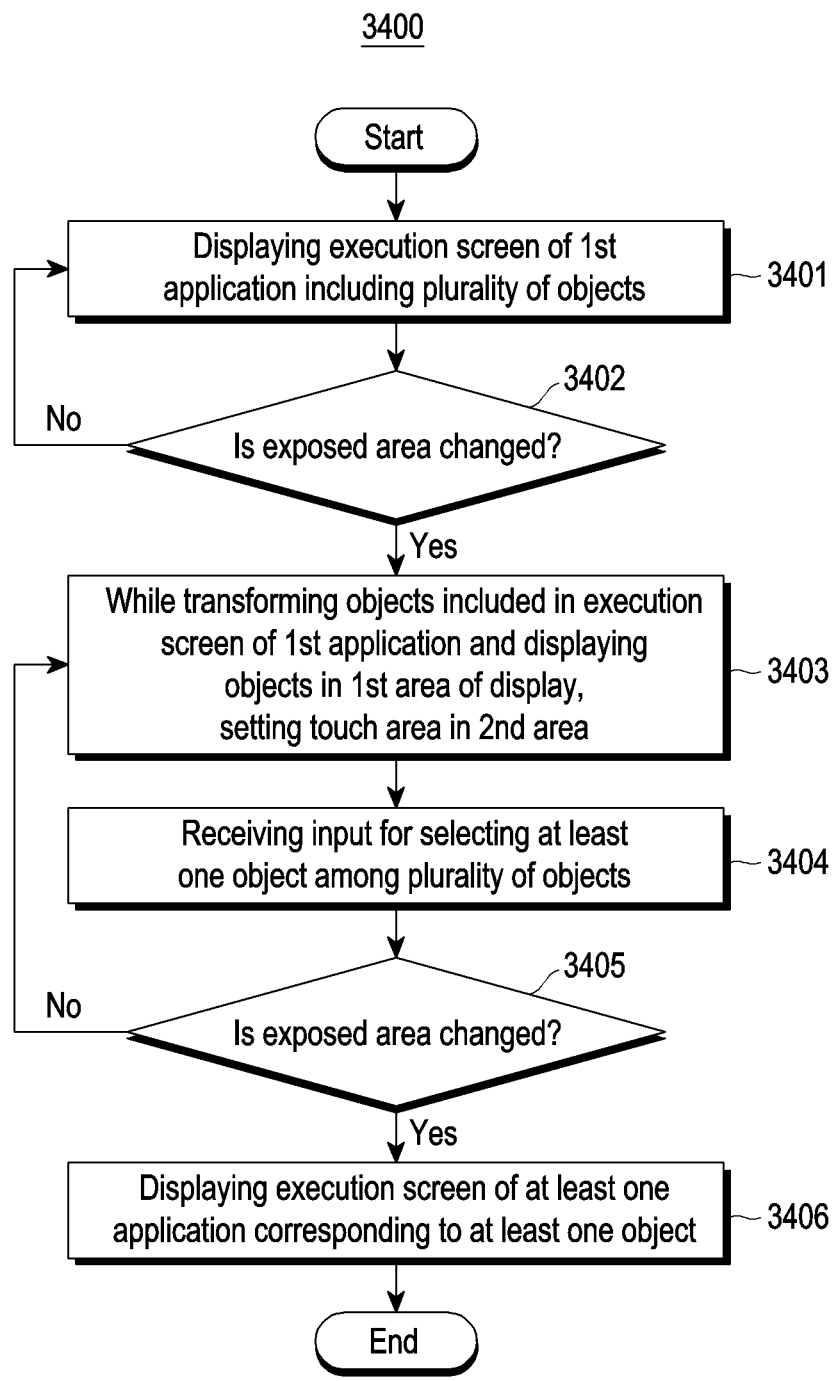
FIG. 34 is a flowchart for describing another example of operations of an electronic device, according to various embodiments.

FIG. 34 is a flowchart 3400 for describing other examples of operations of the electronic device 101 according to various embodiments. According to various embodiments, the operations illustrated in FIG. 34 are not limited to the illustrated order, and may be performed in various orders. In addition, according to various embodiments, a greater or smaller number of operations compared to the operations illustrated in FIG. 34 may be performed. Hereinafter, the operations of FIG. 34 are described with reference to FIG. 35.

Figure 35:
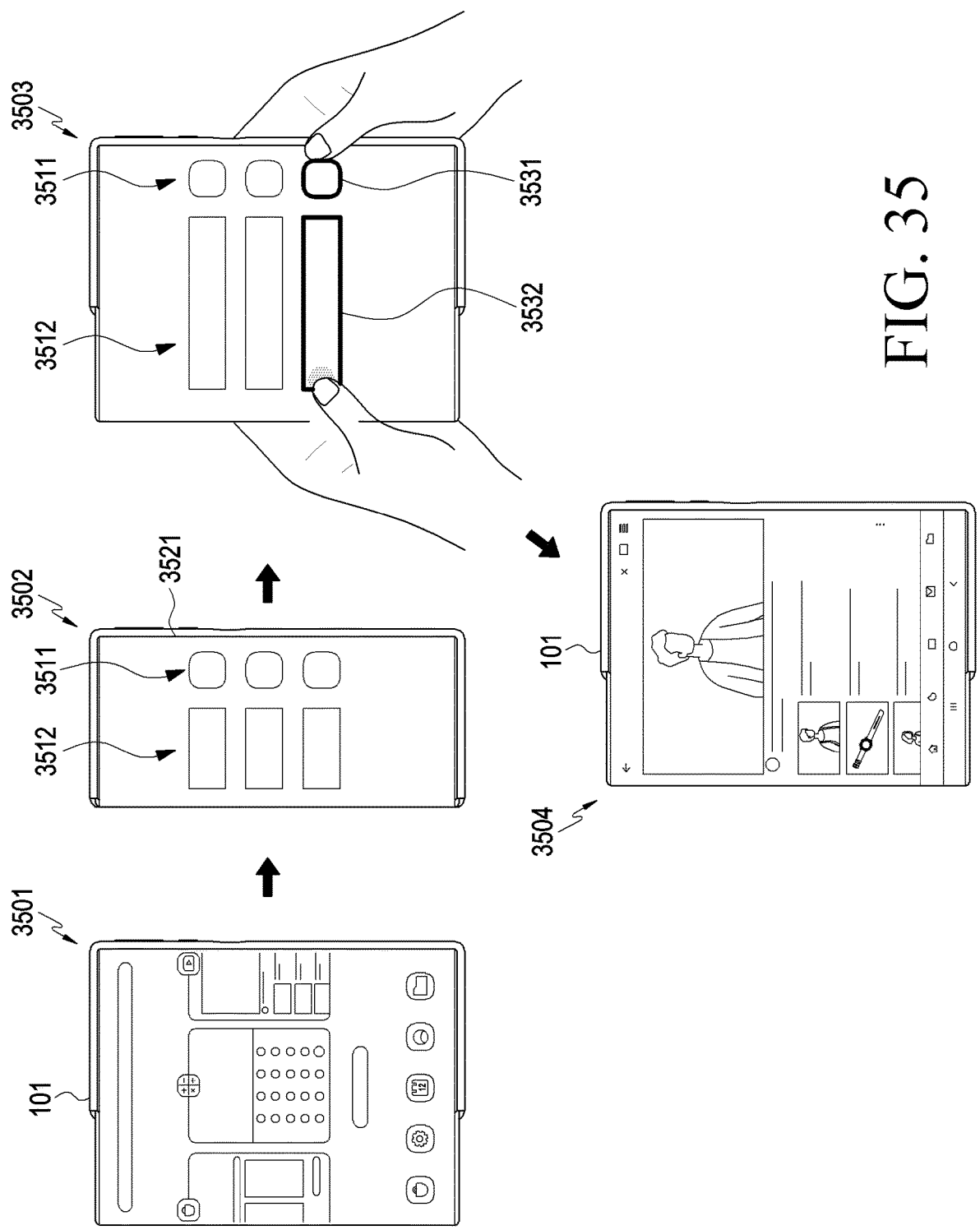
FIG. 35 is a view for describing an example of an operation of switching the execution screen of a first application based on an exposed area of a flexible display of a rollable electronic device, according to various embodiments.

FIG. 35 is a view for describing an example of an operation of switching the execution screen of the first application based on the exposed area of the flexible display of the rollable electronic device 101 according to various embodiments.

According to various embodiments, in operation 3401, the rollable electronic device 101 may display the execution screen of the first application including a plurality of objects. For example, as a structure (e.g., a first structure) slides according to the rotation of the roller as illustrated in 3501 of FIG. 35, the rollable electronic device 101 may display the execution screen of the recent application including a plurality of objects (e.g., icons and/or thumb nails) in the state in which a partial area 3510 of the display is exposed. Since the operation of displaying the execution screen of the recent application in the rollable electronic device 101 may be performed like the above-described operation 701 of the electronic device 101, a redundant description is omitted.

According to various embodiments, in operation 3402, the rollable electronic device 101 may identify that the exposed area of the display is changed, and in operation 3403, the rollable electronic device 101 may configure the touch areas in the second area while transforming objects included in the execution screen of the first application and the objects in the first area of the display. For example, in the rollable electronic device 101, as the structure (e.g., the first structure (e.g., 401)) slides according to the rotation of the roller, a partial area of the display may be inserted into the inside of the rollable electronic device 101 (e.g., the second structure (e.g., 402)). Based on a value identified from a sensor based on a partial area 3510 of the display, the rollable electronic device 101 may identify that the partial area of the display is inserted into the inside. Based on a partial area of the display being inserted into the inside, the rollable electronic device 101 may display, in the first area of the exposed area of the display, a plurality of objects 3511 different (e.g., different in visual attributes) from a plurality of objects (e.g., icons and/or thumbnails) included in the execution screen of the recent application. As illustrated in 3502 of FIG. 35, only objects of a single type (e.g., icons or thumbnails) may be displayed in the first area, or without being limited thereto, different types of objects (e.g., icons and thumbnails) may be displayed together in the first area, as described above. The rollable electronic device 101 may configure a plurality of touch areas for selecting a plurality of objects 3512, in the second area other than the first area. As illustrated in 3502 of FIG. 35, the plurality of touch areas 3512 may be displayed at positions adjacent to a side portion 3522 of the display, and the plurality of objects 3511 may be disposed at positions adjacent to the side surface 3521 of the electronic device into which the display is introduced. Alternatively or additionally, without being limited thereto, the plurality of touch areas 3512 may be displayed at positions adjacent to the side surface 3521 of the electronic device into which the display is introduced, and the plurality of objects 3511 may be displayed at positions adjacent to the side portion 5322 of the display. Since the operation of displaying the plurality of objects 3511 and the operation of configuring the plurality of touch areas 3512 in the rollable electronic device 101 may be performed like the above-described operations of the electronic device 101, a redundant description is omitted.

According to various embodiments, in operation 3404, the rollable electronic device 101 may receive an input for selecting at least one object among the plurality of objects 3511. For example, as illustrated in 3503 of FIG. 35, the rollable electronic device 101 may receive a user input on at least one touch area among the plurality of touch areas 3512, and may select at least one touch area (e.g., 3531) corresponding to the at least one touch area (e.g., 3532).

According to various embodiments, in operation 3405, the rollable electronic device 101 may identify that the exposed area of the display is changed, and in operation 3406, the rollable electronic device 101 may display the execution screen of at least one application corresponding to at least one object. For example, as illustrated in 3503 of FIG. 35, the rollable electronic device 101 may identify that a partial area 3510 of the display is exposed to the outside in the state in which one object (e.g., 3531) is selected, and as illustrated in 3054 of FIG. 35, the rollable electronic device 101 may display the execution screen of an application corresponding to the selected one object.

According to various embodiments, when the two or more objects 3511 are selected, the rollable electronic device 101 may display the execution screens of applications corresponding to the two or more objects 3511 as in the above-described displaying forms (e.g., a multi-window form, a pop-up window form, or a form in which the multi-window form and the pop-up window form are combined) of the electronic device 101. For example, the rollable electronic device 101 may identify the area change pattern of the display and may display the execution screens of applications in a displaying form corresponding to the identified area change pattern. As an example, the rollable electronic device 101 may display the execution screens of the applications in the multi-window form based on a change pattern of a trend in which the area of the display increases. As another example, the rollable electronic device 101 may display the execution screens of the applications in the pop-up window form based on a change pattern of a trend in which the area of the display increases, decreases, and then increases again. The area change pattern of the display is merely an example, and may be configured according to various change trends.

Figure 37:
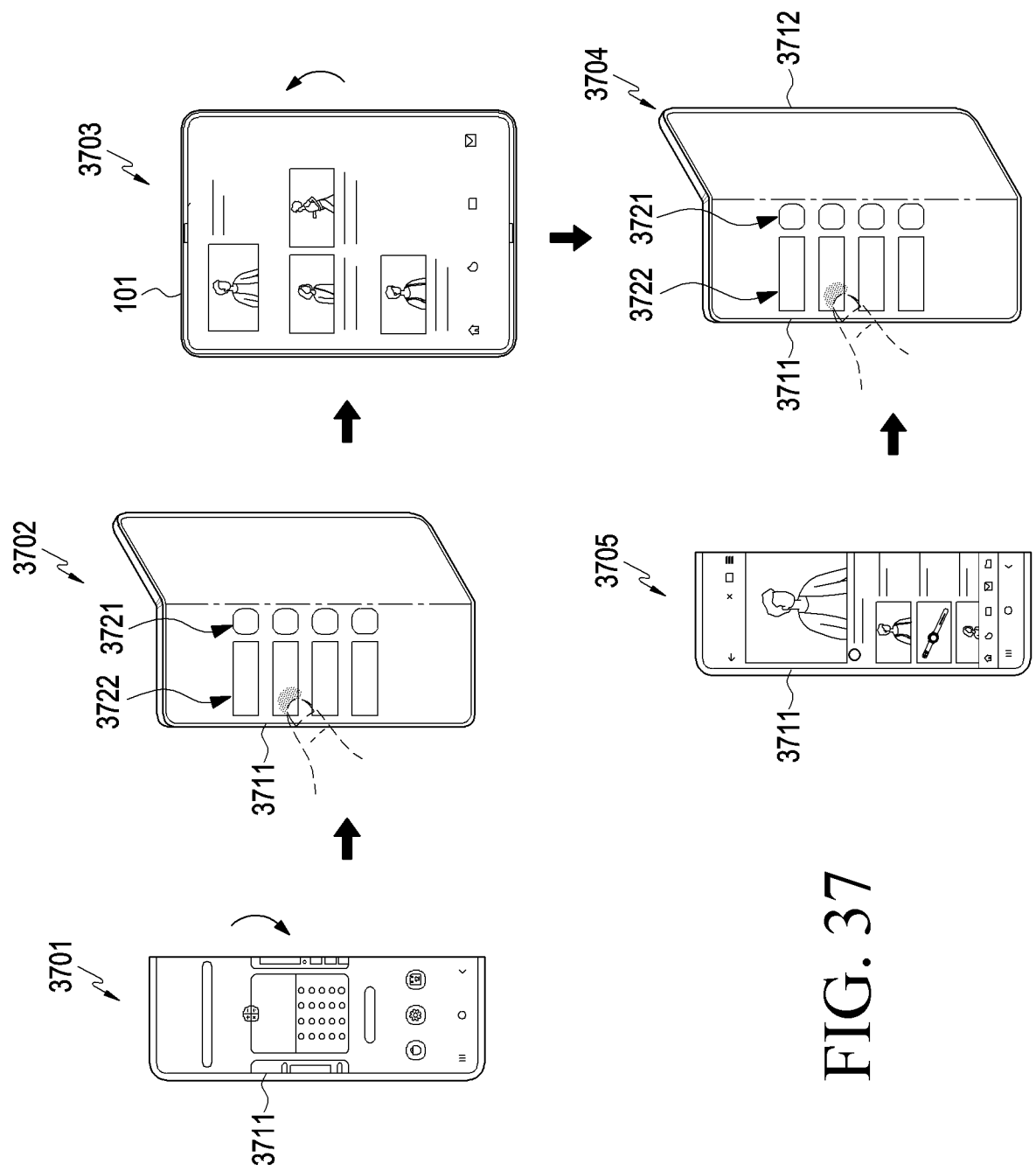
FIG. 37 is a view for describing an example of an operation of switching the execution screen of a first application of an out-folding electronic device, according to various embodiments.

According to various embodiments, an out-folding electronic device 101 (e.g., an electronic device 101 having displays that are exposed to the outside (or respective surfaces of the displays are disposed opposite to each other) in the state in which the housings are in contact with each other as illustrated in 3701 of FIG. 37) may switch the execution screen of the first application (e.g., a recent application) based on the angle between the housings. In-folding electronic device 101 may be defined as an electronic device 101 in which displays are in contact with (or face each other) in the state in which housings are in contact with each other, unlike the out-folding electronic device 101.

Figure 36:
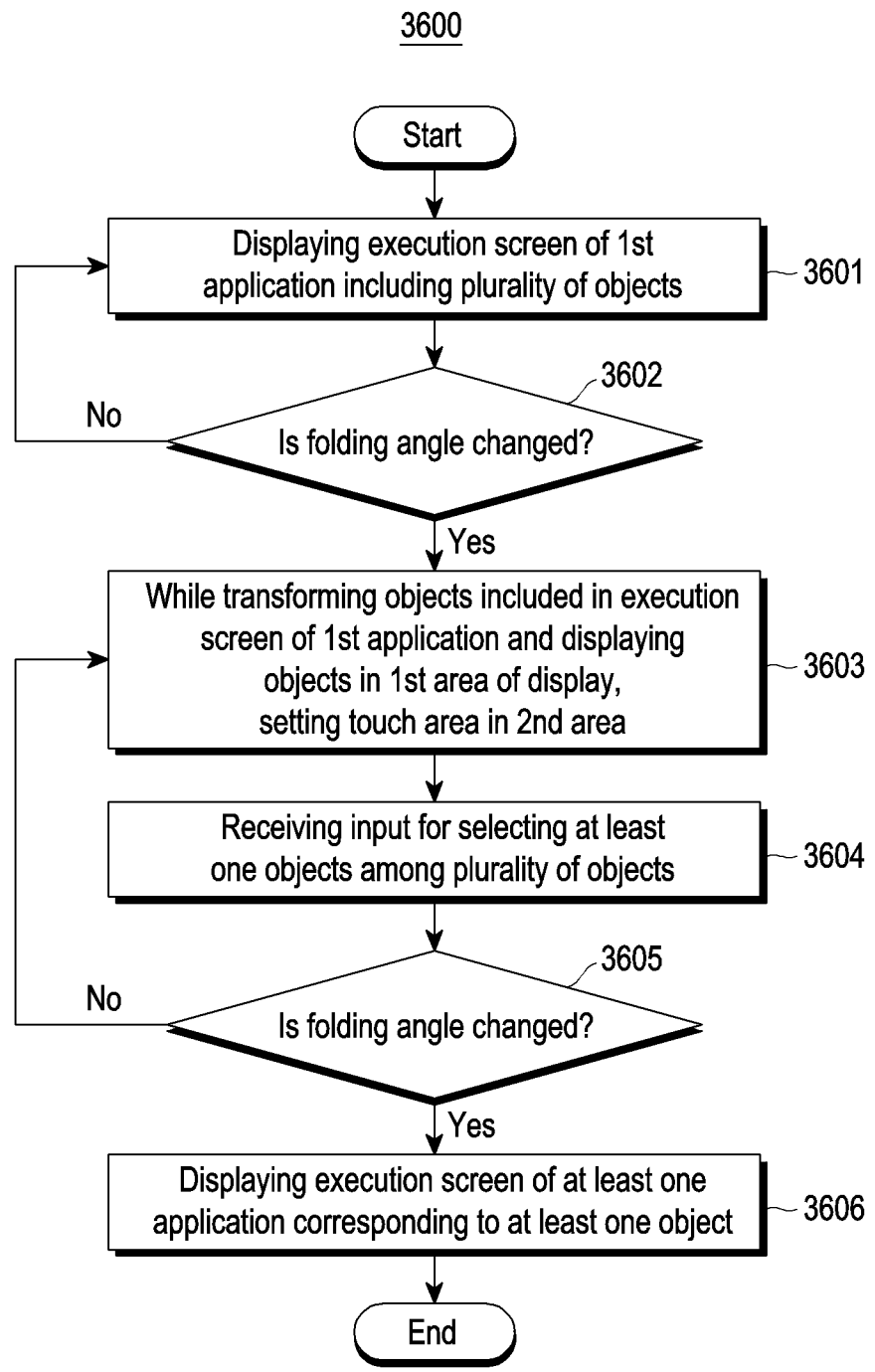
FIG. 36 is a flowchart for describing another example of operations of an electronic device, according to various embodiments.

FIG. 36 is a flowchart 3600 for describing other examples of operations of the electronic device 101 according to various embodiments. According to various embodiments, the operations illustrated in FIG. 36 are not limited to the illustrated order, and may be performed in various orders. In addition, according to various embodiments, a greater or smaller number of operations compared to the operations illustrated in FIG. 36 may be performed. A description is made with reference to FIG. 37.

FIG. 37 is a view for describing an example of an operation of switching the execution screen of a first application (e.g., a recent application) of an out-folding electronic device 101 according to various embodiments.

According to various embodiments, in operation 3601, the out-folding electronic device 101 may display the execution screen of a first application including a plurality of first objects. For example, based on the angle between the housings being in a first angle range (e.g., 0 degrees) as illustrated in 3701 of FIG. 37, the out-folding electronic device 101 may display the execution screen of the first application (e.g., the recent application) in the area of the display corresponding to one housing (e.g., the first housing 3711). Since operation 3601 of displaying the execution screen of the recent application in the out-folding electronic device 101 may be performed like the above-described operation 801 of the electronic device 101, a redundant description is omitted.

According to various embodiments, in operation 3602, the out-folding electronic device 101 may identify that the folding angle is changed, and in operation 3603, the out-folding electronic device 101 may configure touch areas in the second area while displaying, in the first area of the display, a plurality of second objects 3721 different from a plurality of first objects included in the execution screen of the first application. For example, as illustrated in 3702 of FIG. 37, the position of the second housing 3712, which is in contact with the rear surface of the first housing 3711 of the out-folding electronic device 101, may be changed toward the first housing 3711 according to the pivoting of the hinge. As the angle between the first housing 3711 and the second housing 3712 is changed, the out-folding electronic device 101 may identify the angle between the first housing 3711 and the second housing 3712 based on a value identified from a sensor. The out-folding electronic device 101 may change the execution screen of the recent application based on the identified angle corresponding to a second angle range (e.g., 120 degrees to 160 degrees). The out-folding electronic device 101 may change the sizes of the plurality of objects 3721 (e.g., icons and/or thumbnails) and may display the objects in the first area of the display corresponding to the hinge, and the out-folding electronic device 101 may configure a plurality of touch areas 3722 in a second area other than the first area. The first area may be an area adjacent to the hinge of the electronic device 101. As illustrated in 3702 of FIG. 37, only objects of a single type (e.g., icons or thumbnails) may be displayed in the first area, or without being limited thereto, different types of objects (e.g., icons and thumbnails) may be displayed together in the first area, as described above. In addition, as illustrated in 3702 of FIG. 37, objects may be displayed and touch areas are displayed in an area of the display corresponding to one housing (e.g., the first housing 3711). Alternatively or additionally, without being limited thereto, objects may be displayed and touch areas may be configured in the two housings (e.g., the first housing 3711 and the second housing 3712). The description of the in-folding type electronic device 101 may be applicable to this case.

According to various embodiments, in operation 3604, the out-folding electronic device 101 may receive an input for selecting at least one object among the plurality of objects 3721. The electronic device 101 may receive a user input via the plurality of touch areas 3722 configured in the second area of the display corresponding to the first housing 3711 as illustrated in 3702 of FIG. 37, and may select an object corresponding to a touch area touched by the user input.

According to various embodiments, in operation 3605, the out-folding electronic device 101 may identify that the folding angle is changed, and in operation 3606, the out-folding electronic device 101 may display the execution screen of at least one application corresponding to at least one object. As illustrated in 3703 of FIG. 37, based on the changed folding angle corresponding to a third angle (e.g., 180 degrees), the electronic device 101 may execute an application corresponding to the selected object in a foreground mode, and may display the execution screen of the application. When the folding angle is changed and corresponds to the third angle range in the state in which the touch area is touched by the user input, the electronic device 101 may display the execution screen of the application corresponding to the object corresponding to the touch area.

According to various embodiments, as illustrated in 3704 and 3705 of FIG. 37, based on the folding angle corresponding to the second angle range again, the out-folding electronic device 101 may display the plurality of objects 3721 in the first area, and may display the plurality of touch areas 3722 in the second area. When one of the plurality of touch areas 3722 is selected, the out-folding electronic device 101 may identify the application corresponding to the selected touch area. Based on the folding angle being changed to correspond to the first angle range, the electronic device 101 may display the execution screen of the identified application in the area of the display corresponding to a housing (e.g., the first housing 3711 and/or the second housing 3712). For example, when the touch area is selected in the second area of the display corresponding to a housing (e.g., the first housing 3711), the electronic device 101 may display the execution screen of the area of the display corresponding to the housing (e.g., the first housing 3711). Without being limited thereto, when a touch area associated with one housing is selected, the out-folding electronic device 101 may display the touch area in the area of the display corresponding to the other housing.

According to various embodiments, when the two or more objects 3721 are selected, the out-folding electronic device 101 may display the execution screens of applications corresponding to the two or more objects 3721 as in the above-described displaying forms (e.g., a multi-window form, a pop-up window form, or a form in which the multi-window form and the pop-up window form are combined) of the electronic device 101. For example, the out-folding electronic device 101 may identify the folding angle change pattern and may display the execution screens of applications in a displaying form corresponding to the identified folding angle change pattern. As an example, the rollable electronic device 101 may display the execution screens of the applications in the multi-window form based on a change pattern of a trend in which the folding angle decreases. As another example, the rollable electronic device 101 may display the execution screens of the applications in the pop-up window form based on a change pattern of a trend in which the folding angle increases and the decreases. The folding angle change pattern is merely an example, and may be configured according to various change trends.

According to various embodiments, when the folding angle is changed, the electronic device may display, in the first area 831, contents included in the execution screen of various types of applications on the first area 831, and may configure, in the second area, the touch areas (e.g., touch areas 4222 of FIG. 39) for selecting the contents.

Figure 38:
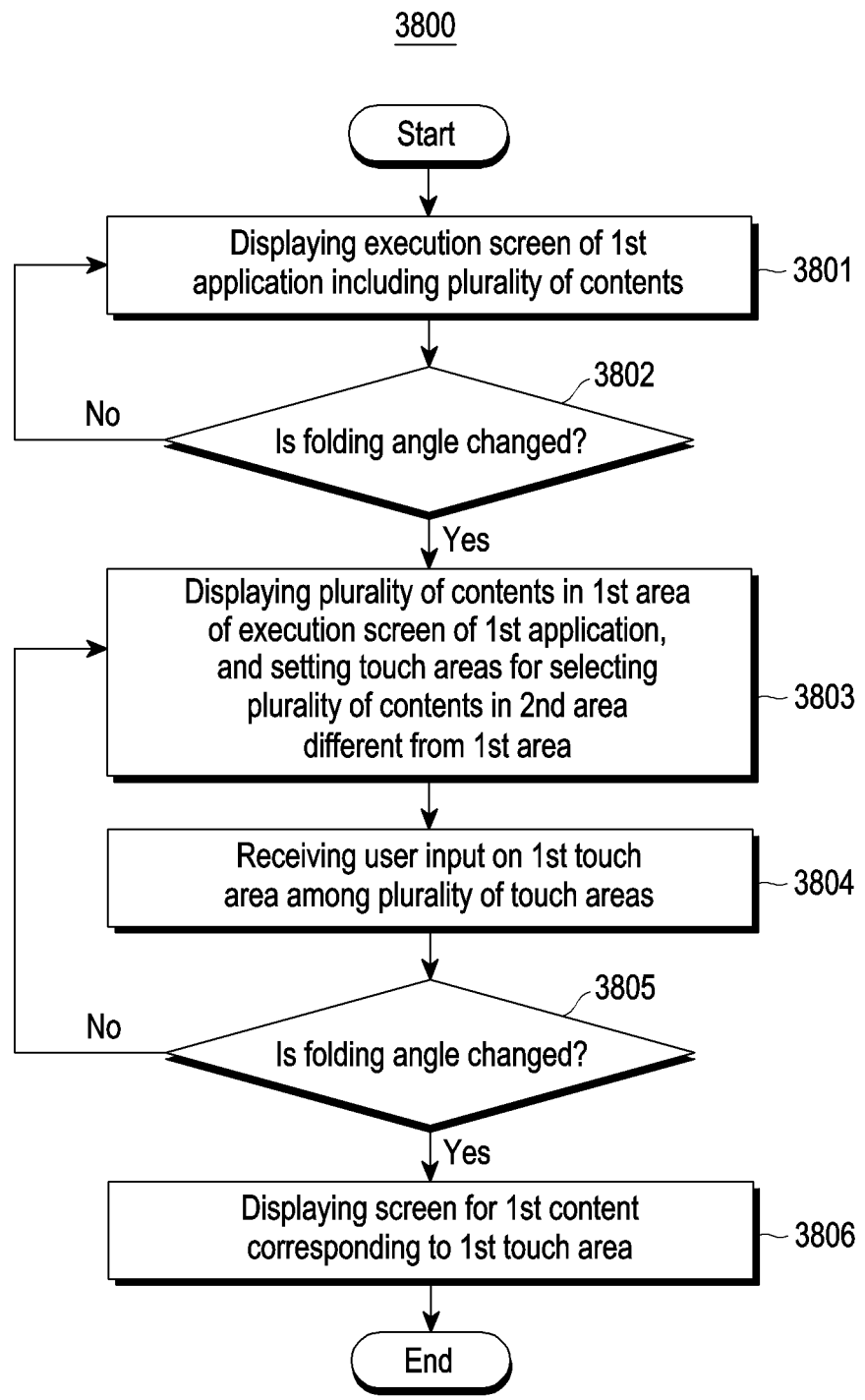
FIG. 38 is a flowchart for describing another example of operations of an electronic device, according to various embodiments.

FIG. 38 is a flowchart 3800 for describing other examples of operations of the electronic device 101 according to various embodiments. According to various embodiments, the operations illustrated in FIG. 38 are not limited to the illustrated order, and may be performed in various orders. In addition, according to various embodiments, a greater or smaller number of operations compared to the operations illustrated in FIG. 38 may be performed. Hereinafter, the operations of FIG. 38 are described with reference to FIG. 39.

Figure 39:
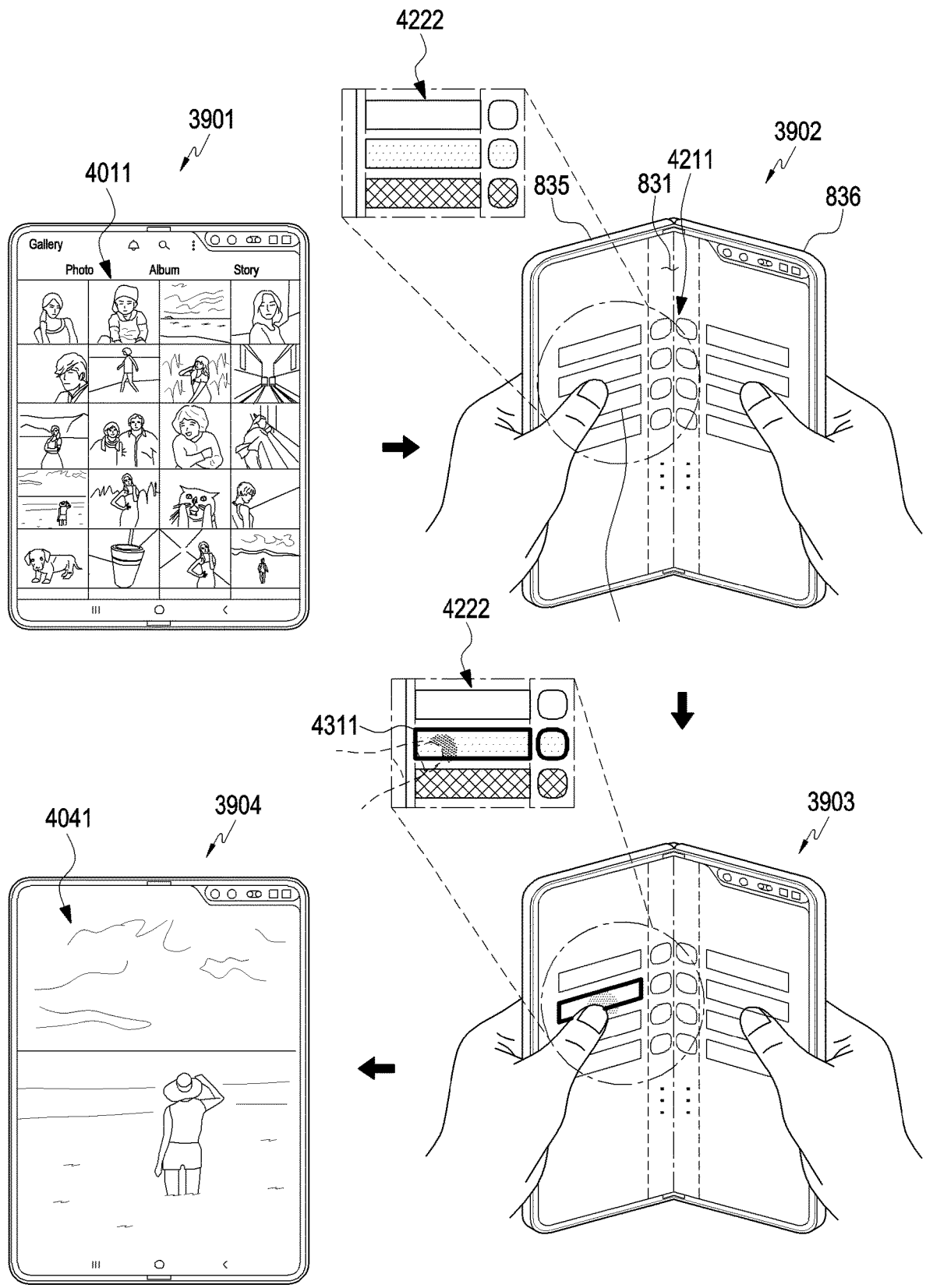
FIG. 39 is a view for describing examples of operations of displaying contents included in the execution screen of an application of an electronic device in a first area and configuring a plurality of touch areas for selecting contents in a second area, according to various embodiments.

FIG. 39 is a view for describing examples of operations of displaying contents included in the execution screen of an application of an electronic device according to various embodiments in a first area 831 and configuring a plurality of touch areas 4222 for selecting contents in a second area.

According to various embodiments, in operation 3801, the electronic device may display the execution screen of the first application including a plurality of contents. For example, as illustrated in 3901 of FIG. 39, based on the angle (or the folding angle) between the housings 835 and 836 corresponding to a first angle range (e.g., 180 degrees), the electronic device may display the execution screen 4011 of a specific application (e.g., a gallery application). For example, the execution screen of the gallery application may include a plurality of thumbnails 4211 corresponding to a plurality of images captured by the electronic device. Without being limited to those illustrated in FIG. 39, the first application may be an application including various types of contents (e.g., a web application and a call application).

According to various embodiments, when the folding angle is changed in operation 3802, the electronic device may display a plurality of contents in the execution screen 4011 of the first application in operation 3803 and may configure touch areas 4222 for selecting the plurality of contents in a second area different from the first area 831. For example, as illustrated in 3902 of FIG. 39, based on the angle (or the folding angle) between the housings 835 and 836 corresponding to a second angle range (e.g., 120 to 160 degrees), the electronic device may display the execution screen of a gallery application in which the thumbnails 4211 are arranged in the first area 831. The electronic device may adjust the visual attributes (e.g., size) of the thumbnails 4211 to correspond to the area of the first area 831, and may display, in the first area 831, the thumbnails 4211 having the adjusted visual attributes (e.g., size). In addition, as illustrated in 3902 of FIG. 39, the electronic device may configure touch areas 4222 for selecting respective thumbnails 4211 in a second area, which is a remaining area other than the first area 831. Since operation 3802 of the electronic device may be performed like the above-described operations 802 and 803 of the electronic device and the above-described operation 1304 of the electronic device, a redundant description is omitted.

According to various embodiments, in operation 3804, the electronic device may receive an input on the first touch area 4311 among the plurality of touch areas 4222. For example, when a user input is received on the first touch area 4311, the electronic device may select a content corresponding to the first touch area 4311. For example, when a user input is received on the first touch area 4311 as illustrated in 3903 of FIG. 39, the electronic device may select the first content (e.g., a first thumbnail). In addition, the electronic device may receive an input for selecting a plurality of contents through a plurality of touch areas 4222.

According to various embodiments, when the folding angle is changed in operation 3805, the electronic device may display a screen for a content corresponding to the first touch area 4311 in operation 3806. For example, as illustrated in 3904 of FIG. 39, based on the angle (or the folding angle) between the housings 835 and 836 corresponding to a first angle range (e.g., 180 degrees), the electronic device may display the selected content in the entire screen 4041 of the display. For example, when at least two or more contents are selected, the electronic device may display two or more selected contents in a specific displaying form (e.g., a multi-window form, a pop-up window form, or a form in which the multi-window form and the pop-up window form are combined) based on a folding angle change pattern. Since the operation of displaying two or more contents in the electronic device may be performed as described above with reference to FIGS. 26 to 30, a redundant description is omitted.

According to various embodiments, a foldable electronic device 101 is provided that includes a hinge, a first housing (e.g., 835 in FIG. 8) having a portion connected to the hinge, a second housing (e.g., 836 in FIG. 8) having a portion connected to the hinge, a flexible display disposed on the first housing (e.g., 835 in FIG. 8) and the second housing (e.g., 836 in FIG. 8), and at least one processor (e.g., 120 in FIG. 1), wherein the at least one processor (e.g., 120 in FIG. 1) is configured to display, based on identifying an execution command of a first application (e.g., a recent application or the DTM 644 in FIG. 7) in a state in which an angle between the first housing (e.g., 835 in FIG. 8) and the second housing (e.g., 836 in FIG. 8) corresponds to a first angle range, the execution screen of the first application (e.g., a recent application or the DTM 644 in FIG. 7) including at least one first object associated with at least one application, which is being executed, on the flexible display, to display, based on a fact that the angle between the first housing (e.g., 835 in FIG. 8) and the second housing (e.g., 836 in FIG. 8) corresponding to a second angle range, at least one second object different from the at least one first object associated with the at least one application, which is being executed, in a first area (e.g., 831 in FIG. 8) of the flexible display, to configure at least one touch area for selecting the at least one second object in a second area (e.g., 1300 in FIG. 13) different from the first area (e.g., 831 in FIG. 8) of the flexible display, to receive an input on a first touch area among the at least one touch area, and to display, based on a fact that the angle between the first housing (e.g., 835 in FIG. 8) and the second housing (e.g., 836 in FIG. 8) corresponds to the first angle range, the execution screen of a second application corresponding to the first touch area, on the flexible display.

According to various embodiments, the foldable electronic device 101 is provided, wherein the at least one first object may include at least one of at least one icon or at least one thumbnail associated with the at least one application.

According to various embodiments, the foldable electronic device 101 is provided, wherein the at least one touch area may include a first touch area corresponding to a first icon associated with the second application and a second touch area corresponding to a first thumbnail, wherein the at least one processor (e.g., 120 of FIG. 1) may be configured to select the second application based on receiving the input on the first touch area or the second touch area, and to execute, based on a fact that the angle between the first housing (e.g., 835 in FIG. 8) and the second housing (e.g., 836 in FIG. 8) corresponds to a first angle range, the selected second application in a foreground mode, and display the execution screen of the second application executed in the foreground mode.

According to various embodiments, the foldable electronic device 101 is provided, wherein the at least one processor (e.g., 120 in FIG. 1) may be configured to acquire information related to the second application based on the receiving of the input on the first touch area, and to display the acquired information in at least a portion of the second area (e.g., 1300 in FIG. 13).

According to various embodiments, the foldable electronic device 101 is provided, wherein the at least one processor (e.g., 120 in FIG. 1) may be configured to identify a color associated with the at least one second object, and to display the identified color on the at least one touch area corresponding to the at least one second object.

According to various embodiments, the foldable electronic device 101 is provided, wherein the at least one touch area may be located to be spaced apart from an outer enclosure portion of the display.

According to various embodiments, the foldable electronic device 101 is provided, wherein the at least one processor (e.g., 120 in FIG. 1) may be configured to adjust a size of the at least one second object based on a fact that the angle between the first housing (e.g., 835 in FIG. 8) and the second housing (e.g., 836 in FIG. 8) is changed while the at least one second object is displayed.

According to various embodiments, the foldable electronic device 101 is provided, wherein the at least one processor (e.g., 120 in FIG. 1) may be configured to identify a position associated with a user, wherein the position associated with the user includes at least one of a position of a touch by the user or a position of a line of sight of the user, and to change the position of the at least one second object based on the identified position associated with the user.

According to various embodiments, the foldable electronic device 101 is provided, wherein the at least one processor (e.g., 120 in FIG. 1) may be configured to receive a first input on the first touch area, to identify a touched second touch area among the at least one touch area as the received first input is moved on the first touch area, and to select the second application corresponding to the first touch area and the third application corresponding to the second touch area.

According to various embodiments, the foldable electronic device 101 is provided, wherein the at least one processor (e.g., 120 in FIG. 1) may be configured to deselect the second application when it is identified that the second touch area is re-touched as the first input is moved after the second touch area is touched, According to various embodiments, the foldable electronic device 101 is provided, wherein the at least one processor (e.g., 120 in FIG. 1) may be configured to identify a change pattern of the angle between the first housing (e.g., 835 in FIG. 8) and the second housing (e.g., 836 in FIG. 8), and to display, based on the identified angle change pattern and the angle between the first housing (e.g., 835 in FIG. 8) and the second housing (e.g., 836 in FIG. 8) corresponding to the first angle range, the execution screen of the first application (e.g., a recent application or the DTM 644 in FIG. 7) and the execution screen of the second application.

According to various embodiments, the foldable electronic device 101 is provided, wherein the at least one processor (e.g., 120 in FIG. 1) may be configured to display, when the identified change pattern is a first pattern, the execution screen of the first application (e.g., a recent application or the DTM 644 in FIG. 7) and the execution screen of the second application such that the execution screen of the first application (e.g., a recent application or the DTM 644 in FIG. 7) and the execution screen of the second application do not overlap each other.

According to various embodiments, the foldable electronic device 101 is provided, wherein the at least one processor (e.g., 120 in FIG. 1) may be configured to display, when the identified change pattern is a second pattern, while displaying one of the execution screen of the first application (e.g., the recent application or the DTM 644 in FIG. 7) and the execution screen of the second application, a remaining one of the execution screen of the first application and the execution screen of the second application on a pop-up window.

According to various embodiments, the foldable electronic device 101 is provided, wherein the at least one processor (e.g., 120 in FIG. 1) may be configured to display, based on an order of priorities of the first application (e.g., a recent application or the DTM 644 in FIG. 7) and the second application, the execution screen of the second application on the pop-up window while displaying the execution screen of the first application (e.g., a recent application of the DTM 644 in FIG. 7).

According to various embodiments, a method of operating a foldable electronic device (e.g., electronic device 101) is provided. The method includes an operation of displaying, based on identifying an execution command of a first application (e.g., a recent application or the DTM 644 in FIG. 7) in a state in which an angle between the first housing (e.g., 835 in FIG. 8) and the second housing (e.g., 836 in FIG. 8) corresponds to a first angle range, the execution screen of the first application (e.g., a recent application or the DTM 644 in FIG. 7) including at least one first object associated with at least one application, which is being executed, on the flexible display of the foldable electronic device, an operation of displaying, based on a fact that the angle between the first housing (e.g., 835 in FIG. 8) and the second housing (e.g., 836 in FIG. 8) corresponding to a second angle range, at least one second object different from the at least one first object associated with the at least one application, which is being executed, in a first area (e.g., 831 in FIG. 8) of the flexible display, an operation of configuring at least one touch area for selecting the at least one second object in a second area (e.g., 1300 in FIG. 13) different from the first area (e.g., 831 in FIG. 8) of the flexible display, an operation of receiving an input on a first touch area among the at least one touch area, and an operation of displaying, based on a fact that the angle between the first housing (e.g., 835 in FIG. 8) and the second housing (e.g., 836 in FIG. 8) corresponds to the first angle range, the execution screen of a second application corresponding to the first touch area, on the flexible display.

According to various embodiments, the operating method is provided, wherein the at least one first object may include at least one of at least one icon or at least one thumbnail associated with the at least one application.

According to various embodiments, the operating method is provided, wherein the at least one touch area may include a first touch area corresponding to a first icon associated with the second application and a second touch area corresponding to a first thumbnail, wherein the operating method may further include an operation of selecting the second application based on receiving the input on the first touch area or the second touch area, and an operation of executing, based on a fact that the angle between the first housing (e.g., 835 in FIG. 8) and the second housing (e.g., 836 in FIG. 8) corresponding to a first angle range, the selected second application in a foreground mode, and displaying the execution screen of the second application executed in the foreground mode.

According to various embodiments, the operating method may further include an operation of acquiring information related to the second application based on the receiving of the input on the first touch area; and an operation of displaying the acquired information in at least a portion of the second area (e.g., 1300 in FIG. 13).

According to various embodiments, the operating method may further include an operation of identifying a color associated with the at least one second object, and an operation of displaying the identified color on the at least one touch area corresponding to the at least one second object.

According to various embodiments, a foldable electronic device 101 is provided. The foldable electronic device 101 includes a hinge, a first housing (e.g., 835 in FIG. 8) having a portion connected to the hinge, a second housing (e.g., 836 in FIG. 8) having a portion connected to the hinge, a flexible display disposed on the first housing (e.g., 835 in FIG. 8) and the second housing (e.g., 836 in FIG. 8), and at least one processor (e.g., 120 in FIG. 1), wherein the at least one processor (e.g., 120 in FIG. 1) is configured to display, based on a fact that an angle between the first housing (e.g., 835 in FIG. 8) and the second housing (e.g., 836 in FIG. 8) corresponds to a first angle range, the execution screen of the first application (e.g., a recent application or the DTM 644 in FIG. 7) including at least one content, on the flexible display of the foldable electronic device, to display, based on a fact that the angle between the first housing (e.g., 835 in FIG. 8) and the second housing (e.g., 836 in FIG. 8) corresponding to a second angle range, at least one content in a first area (e.g., 831 in FIG. 8) of the flexible display associated with the hinge, to configure at least one touch area for selecting the at least one content in a second area (e.g., 1300 in FIG. 13) different from the first area (e.g., 831 in FIG. 8) of the flexible display, to receive an input on a first touch area among the at least one touch area, to select a first content corresponding the first touch area among the at least one content, and to display, based on the angle between the first housing (e.g., 835 in FIG. 8) and the second housing (e.g., 836 in FIG. 8) corresponding to the first angle range, the first content in the entire area of the flexible display.

While embodiments of the disclosure have been shown and described, the disclosure is not limited to the aforementioned specific embodiments, and it is apparent that various modifications can may be made by those having ordinary skill in the art to which the disclosure belongs, without departing from the spirit and scope of the disclosure as claimed by the appended claims. Further, it is intended that such modifications are not to be interpreted independently from the technical idea or prospect of the disclosure.

What is claimed is:

1. A foldable electronic device comprising:
   a hinge;
   a first housing having a first portion coupled to the hinge;
   a second housing having a second portion coupled to the hinge;
   a flexible display disposed in the first housing and the second housing; and
   at least one processor configured to:
      based on identifying an execution command of a first application in a state in which an angle between the first housing and the second housing corresponds to a first angle range, display, on the flexible display, an execution screen of the first application comprising at least one first object associated with at least one application being executed,
      based on the angle between the first housing and the second housing corresponding to a second angle range, display, in a first area of the flexible display, at least one second object associated with the at least one application being executed, the at least one second object being different from the at least one first object, configure at least one touch area for selecting the at least one second object in a second area of the flexible display, the second area being different from the first area, receive an input on a first touch area among the at least one touch area, and based on the angle between the first housing and the second housing corresponding to the first angle range, display, on the flexible display, an execution screen of a second application corresponding to the first touch area.

2. The foldable electronic device of claim 1, wherein the at least one first object comprises at least one of at least one icon or at least one thumbnail associated with the at least one application.

3. The foldable electronic device of claim 2, wherein the at least one touch area comprises a second touch area corresponding to a first thumbnail and the first touch area corresponds to a first icon associated with the second application, and wherein the at least one processor is further configured to:
select the second application based on receiving the input on the first touch area or the second touch area, and based on the angle between the first housing and the second housing corresponding to the first angle range, execute the selected second application in a foreground mode, and display the execution screen of the second application being executed in the foreground mode.

4. The foldable electronic device of claim 1, wherein the at least one processor is further configured to:
obtain information related to the second application based on the receiving of the input on the first touch area, and
display the information in at least a portion of the second area.

5. The foldable electronic device of claim 1, wherein the at least one processor is further configured to:
identify a color associated with the at least one second object, and
display the color on the at least one touch area corresponding to the at least one second object.

6. The foldable electronic device of claim 5, wherein the at least one touch area is spaced apart from an outer enclosure portion of the display.

7. The foldable electronic device of claim 1, wherein the at least one processor is further configured to:
adjust a size of the at least one second object based on the angle between the first housing and the second housing being changed from the first angle range to the second angle range while the at least one second object is displayed.

8. The foldable electronic device of claim 1, wherein the at least one processor is further configured to:
identify a position associated with a user, wherein the position associated with the user comprises at least one of a position of a touch by the user or a position of a line of sight of the user, and
change the position of the at least one second object based on the position associated with the user.

9. The foldable electronic device of claim 1, wherein the at least one processor is further configured to:
receive a first input on the first touch area,
identify a touched second touch area among the at least one touch area as the received first input is moved on the first touch area, and select the second application corresponding to the first touch area and a third application corresponding to the touched second touch area.

10. The foldable electronic device of claim 9, wherein the at least one processor is further configured to:
deselect the second application based on identifying that the touched second touch area is re-touched as the first input is moved after the touched second touch area is touched.

11. The foldable electronic device of claim 9, wherein the at least one processor is further configured to:
identify a change pattern of the angle between the first housing and the second housing, and
based on the identified change pattern of the angle and the angle between the first housing and the second housing corresponding to the first angle range, display the execution screen of the first application and the execution screen of the second application.

12. The foldable electronic device of claim 11, wherein the at least one processor is further configured to:
based on the identified change pattern being a first pattern, display the execution screen of the first application and the execution screen of the second application such that the execution screen of the first application and the execution screen of the second application do not overlap each other.

13. The foldable electronic device of claim 11, wherein the at least one processor is further configured to:
based on the identified change pattern being a second pattern, while displaying one of the execution screen of the first application and the execution screen of the second application, display a remaining one of the execution screen of the first application and the execution screen of the second application on a pop-up window.

14. The foldable electronic device of claim 13, wherein the at least one processor is further configured to:
based on an order of priorities of the first application and the second application, display the execution screen of the second application on the pop-up window while displaying the execution screen of the first application.

15. A method of operating a foldable electronic device, the method comprising:
based on identifying an execution command of a first application in a state in which an angle between a first housing of the foldable electronic device and a second housing of the foldable electronic device corresponds to a first angle range, displaying, on a flexible display disposed in the first housing and the second housing, an execution screen of the first application comprising at least one first object associated with at least one application being executed;

based on the angle between the first housing and the second housing corresponding to a second angle range, displaying, in a first area of the flexible display, at least one second object associated with the at least one application being executed, the at least one second object being different from the at least one first object;

configuring at least one touch area for selecting the at least one second object in a second area of the flexible display, the second area being different from the first area;

receiving an input on a first touch area among the at least one touch area; and based on the angle between the first housing and the second housing corresponding to the first angle range, displaying, on the flexible display, an execution screen of a second application corresponding to the first touch area.

16. The method of claim 15, wherein the at least one first object comprises at least one of at least one icon or at least one thumbnail associated with the at least one application.

17. The method of claim 16, wherein the at least one touch area comprises a second touch area corresponding to a first thumbnail and the first touch area corresponds to a first icon associated with the second application, and
wherein the method further comprises:
selecting the second application based on receiving the input on the first touch area or the second touch area; and
based on the angle between the first housing and the second housing corresponding to the first angle range, executing the selected second application in a foreground mode, and displaying the execution screen of the second application being executed in the foreground mode.

18. The method of claim 15, further comprising:
obtaining information related to the second application based on the receiving of the input on the first touch area; and
displaying the information in at least a portion of the second area.

19. The method of claim 15, further comprising:
identifying a color associated with the at least one second object; and
displaying the color on the at least one touch area corresponding to the at least one second object.

20. A foldable electronic device comprising:
a hinge;
a first housing having a first portion coupled to the hinge;
a second housing having a second portion coupled to the hinge;
a flexible display disposed in the first housing and the second housing; and
at least one processor configured to:
display, based on an angle between the first housing and the second housing corresponding to a first angle range, the execution screen of a first application including at least one content on the flexible display,
display, based on the angle between the first housing and the second housing corresponding to a second angle range, at least one content in a first area of the flexible display associated with the hinge,
configure at least one touch area for selecting the at least one content in a second area different from the first area of the flexible display,
receive an input on a first touch area from among the at least one touch area,
select a first content corresponding to the first touch area, and
display, based on the angle between the first housing and the second housing corresponding to the first angle range, the first content in an entire area of the flexible display.

* * * * *